(12) United States Patent
Moss et al.

(10) Patent No.: US 12,519,418 B2
(45) Date of Patent: Jan. 6, 2026

(54) PV MODULE MOUNTING ASSEMBLY WITH CLAMP / STANDOFF ARRANGEMENT

(71) Applicant: RMH Tech LLC, Colorado Springs, CO (US)

(72) Inventors: Jonathon Moss, Grandview, TX (US); Dustin M. M. Haddock, Colorado Springs, CO (US); Mark Gies, Sudbury, MA (US)

(73) Assignee: RMH Tech LLC, Colorado Springs, CO (US)

( * ) Notice: Subject to any disclaimer, the term of this patent is extended or adjusted under 35 U.S.C. 154(b) by 291 days.

(21) Appl. No.: 18/347,812

(22) Filed: Jul. 6, 2023

(65) Prior Publication Data

US 2024/0014770 A1 Jan. 11, 2024

Related U.S. Application Data

(60) Provisional application No. 63/507,814, filed on Jun. 13, 2023, provisional application No. 63/358,778, filed on Jul. 6, 2022.

(51) Int. Cl.
*H02S 20/22* (2014.01)
(52) U.S. Cl.
CPC ................... *H02S 20/22* (2014.12)
(58) Field of Classification Search
CPC ......... Y02E 10/47; Y02E 10/50; F16B 2/065; F16B 5/0072; H02S 20/23; Y02B 10/10
See application file for complete search history.

(56) References Cited

U.S. PATENT DOCUMENTS

| | | | |
|---|---|---|---|
| 42,992 A | 5/1864 | Howe |
| 97,316 A | 11/1869 | Rogers |
| 106,580 A | 8/1870 | Hathorn |
| 189,431 A | 4/1877 | Creighton |
| 224,608 A | 2/1880 | Rendle |
| 250,580 A | 12/1881 | Rogers |
| 332,413 A | 12/1885 | List |
| 386,316 A | 7/1888 | Hawthorne |
| 405,605 A | 6/1889 | Sagendorph |

(Continued)

FOREIGN PATENT DOCUMENTS

| | | |
|---|---|---|
| AT | 13076 | 8/1903 |
| AT | 26329 | 11/1906 |

(Continued)

OTHER PUBLICATIONS

U.S. Appl. No. 14/257,747, filed Apr. 21, 2014 now U.S. Pat. No. 9,085,900.

(Continued)

*Primary Examiner* — Brian E Glessner
*Assistant Examiner* — Daniel J Kenny
(74) *Attorney, Agent, or Firm* — Sheridan Ross P.C.

(57) ABSTRACT

A mounting assembly for use in mid-grab and/or edge-grab applications may include a clamp secured to a stanchion by a clamp fastener. The mounting assembly may also include a mounting plate and a base plate that may be secured to a mounting device by the stanchion. The mounting assembly may be used, for example, to secure photovoltaic modules (or other devices or structures) of varying heights to a roof or other building surface and to provide increased lift-off resistance.

20 Claims, 21 Drawing Sheets

(56) References Cited

U.S. PATENT DOCUMENTS

| | | |
|---|---|---|
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 733,697 A | 7/1903 | Chronik |
| 756,884 A | 4/1904 | Parry |
| 831,445 A | 9/1906 | Kosmatka |
| 881,757 A | 3/1908 | Winsor |
| 884,850 A | 4/1908 | Peter |
| 927,522 A | 7/1909 | Gery |
| 933,784 A | 9/1909 | Peter |
| 939,516 A | 11/1909 | Laird |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,279,669 A | 9/1918 | Deming |
| 1,330,309 A | 2/1920 | Dixon |
| 1,399,461 A | 12/1921 | Childs |
| 1,463,065 A | 7/1923 | Sieger |
| 1,465,042 A | 8/1923 | Hruska |
| 1,477,088 A | 12/1923 | Turner |
| 1,511,529 A | 10/1924 | Standlee |
| 1,620,428 A | 3/1927 | Becker |
| 1,735,927 A | 11/1929 | Shaffer |
| 1,735,937 A | 11/1929 | Shaffer |
| 1,893,481 A | 1/1933 | Adams |
| 1,946,862 A | 2/1934 | Koch, Jr. |
| 1,957,933 A | 5/1934 | Brandl |
| 2,079,768 A | 5/1937 | Levow |
| 2,150,497 A | 3/1939 | Fernberg |
| 2,183,008 A | 12/1939 | Camp |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| 2,740,027 A | 3/1956 | Budd et al. |
| 2,808,491 A | 10/1957 | Rhee et al. |
| 2,810,173 A | 10/1957 | Bearden |
| 2,875,805 A | 3/1959 | Flora |
| 2,985,174 A | 5/1961 | Guth |
| 3,039,161 A | 6/1962 | Gagnon |
| 3,064,772 A | 11/1962 | Clay |
| 3,095,672 A | 7/1963 | Di Tullio |
| 3,112,016 A | 11/1963 | Peterson |
| 3,136,206 A | 6/1964 | Adams |
| 3,194,524 A | 7/1965 | Trumbull |
| 3,221,467 A | 12/1965 | Henkels |
| 3,231,076 A | 1/1966 | Frieman |
| 3,232,393 A | 2/1966 | Attwood |
| 3,232,573 A | 2/1966 | Berman |
| 3,242,620 A | 3/1966 | Kaiser |
| 3,247,316 A | 4/1966 | Weimer, Jr. |
| 3,269,075 A | 8/1966 | Marini et al. |
| 3,288,409 A | 11/1966 | Bethea, Jr. |
| 3,296,750 A | 1/1967 | Zaleski |
| 3,298,653 A | 1/1967 | Omholt |
| 3,301,513 A | 1/1967 | Masao |
| 3,307,235 A | 3/1967 | Hennings |
| 3,318,057 A | 5/1967 | Norsworthy |
| 3,333,799 A | 8/1967 | Peterson |
| 3,335,995 A | 8/1967 | Pickles |
| 3,341,909 A | 9/1967 | Havener |
| 3,363,864 A | 1/1968 | Olgreen |
| 3,394,524 A | 7/1968 | Howarth |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,565,380 A | 2/1971 | Langren |
| 3,572,623 A | 3/1971 | Lapp |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,715,705 A | 2/1973 | Kuo |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,810,069 A | 5/1974 | Jaconette, Jr. |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,874,052 A * | 4/1975 | Schantz ................. B29C 51/10 264/516 |
| 3,904,161 A | 9/1975 | Scott |
| 3,914,001 A | 10/1975 | Nelson et al. |
| 3,921,253 A | 11/1975 | Nelson |
| 3,960,352 A | 6/1976 | Plattner et al. |
| 3,986,746 A | 10/1976 | Chartier |
| 3,998,018 A | 12/1976 | Hodges |
| 4,001,474 A | 1/1977 | Hereth |
| 4,007,574 A | 2/1977 | Riddell |
| 4,018,538 A | 4/1977 | Smyrni et al. |
| 4,034,532 A | 7/1977 | Reinwall, Jr. |
| 4,051,289 A | 9/1977 | Adamson |
| 4,127,975 A | 12/1978 | Judkins |
| 4,130,970 A | 12/1978 | Cable |
| 4,141,182 A | 2/1979 | McMullen |
| 4,147,257 A | 4/1979 | Zippel |
| 4,162,595 A | 7/1979 | Ramos et al. |
| 4,162,755 A | 7/1979 | Bott |
| 4,189,882 A | 2/1980 | Harrison et al. |
| 4,189,891 A | 2/1980 | Johnson et al. |
| 4,200,107 A | 4/1980 | Reid |
| 4,203,646 A | 5/1980 | Desso et al. |
| 4,203,648 A | 5/1980 | Seidler |
| 4,213,282 A | 7/1980 | Heckelsberg |
| 4,215,677 A | 8/1980 | Erickson |
| 4,223,053 A | 9/1980 | Brogan |
| 4,252,458 A | 2/1981 | Keen |
| 4,261,338 A | 4/1981 | McAlister |
| 4,261,384 A | 4/1981 | Dahlbring |
| 4,263,474 A | 4/1981 | Tennant |
| 4,270,721 A | 6/1981 | Mainor, Jr. |
| 4,291,934 A | 9/1981 | Kund |
| 4,307,976 A | 12/1981 | Butler |
| 4,321,416 A | 3/1982 | Tennant |
| 4,351,140 A | 9/1982 | Simpson |
| 4,358,916 A | 11/1982 | Lacasse |
| 4,366,656 A | 1/1983 | Simpson |
| 4,393,859 A | 7/1983 | Marossy et al. |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| 4,546,586 A | 10/1985 | Knudson |
| 4,560,224 A | 12/1985 | Weisenburger |
| 4,567,706 A | 2/1986 | Wendt |

(56) References Cited

U.S. PATENT DOCUMENTS

| | | |
|---|---|---|
| 4,570,405 A | 2/1986 | Knudson |
| 4,588,240 A | 5/1986 | Ruehl et al. |
| 4,593,877 A | 6/1986 | van der Wyk |
| 4,601,600 A | 7/1986 | Karlsson |
| 4,649,684 A | 3/1987 | Petree et al. |
| 4,656,794 A | 4/1987 | Thevenin et al. |
| 4,666,116 A | 5/1987 | Lloyd |
| 4,669,808 A | 6/1987 | Owen |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,753,425 A | 6/1988 | Yang |
| 4,773,791 A | 9/1988 | Hartkorn |
| 4,782,642 A | 11/1988 | Conville |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,864,081 A | 9/1989 | Bates |
| 4,878,331 A | 11/1989 | Taylor |
| 4,895,338 A | 1/1990 | Froutzis |
| 4,901,963 A | 2/1990 | Yoder |
| 4,905,444 A | 3/1990 | Semaan |
| 4,909,011 A | 3/1990 | Freeman et al. |
| 4,949,929 A | 8/1990 | Kesselman et al. |
| 4,961,712 A | 10/1990 | Schwenk et al. |
| 4,970,833 A | 11/1990 | Porter |
| 4,987,699 A | 1/1991 | Gold |
| 4,991,368 A | 2/1991 | Amstutz |
| 4,993,959 A | 2/1991 | Randolph |
| 5,007,612 A | 4/1991 | Manfre |
| 5,019,111 A | 5/1991 | Dempsey et al. |
| 5,036,949 A | 8/1991 | Crocker et al. |
| 5,039,352 A | 8/1991 | Mueller |
| 5,092,939 A | 3/1992 | Nath et al. |
| 5,094,435 A | 3/1992 | Depperman |
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,154,385 A | 10/1992 | Lindberg et al. |
| 5,164,020 A | 11/1992 | Wagner et al. |
| 5,176,462 A | 1/1993 | Chen |
| 5,187,911 A | 2/1993 | Cotter |
| 5,209,619 A | 5/1993 | Rinderer |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,290,366 A | 3/1994 | Riermeier et al. |
| 5,307,601 A | 5/1994 | McCracken |
| 5,312,079 A | 5/1994 | Little, Jr. |
| 5,313,752 A | 5/1994 | Hatzinikolas |
| D347,701 S | 6/1994 | McCracken |
| 5,352,154 A | 10/1994 | Rotter et al. |
| 5,356,519 A | 10/1994 | Grabscheid et al. |
| 5,356,705 A | 10/1994 | Kelch et al. |
| D351,989 S | 11/1994 | Cline et al. |
| 5,363,615 A | 11/1994 | Christopher et al. |
| 5,363,624 A | 11/1994 | Cotter |
| 5,379,567 A | 1/1995 | Vahey |
| 5,390,453 A | 2/1995 | Untiedt |
| 5,391,084 A | 2/1995 | Kreitzman |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| 5,571,338 A | 11/1996 | Kadonome et al. |
| 5,596,858 A | 1/1997 | Jordan |
| 5,596,859 A | 1/1997 | Horton et al. |
| 5,598,785 A | 2/1997 | Zaguroli, Jr. |
| 5,600,971 A | 2/1997 | Suk |
| D378,343 S | 3/1997 | Macor |
| 5,609,326 A | 3/1997 | Stearns et al. |
| 5,613,328 A | 3/1997 | Alley |
| 5,640,812 A | 6/1997 | Crowley et al. |
| 5,647,178 A | 7/1997 | Cline |
| 5,651,837 A | 7/1997 | Ohtsuka et al. |
| 5,660,008 A | 8/1997 | Bevilacqua |
| 5,664,750 A | 9/1997 | Cohen |
| 5,667,181 A | 9/1997 | van Leeuwen et al. |
| D384,574 S | 10/1997 | Cox |
| 5,681,191 A | 10/1997 | Robicheau et al. |
| 5,688,131 A | 11/1997 | Byfield, Jr. |
| D387,443 S | 12/1997 | Blankenbiller |
| 5,694,721 A | 12/1997 | Haddock |
| 5,697,197 A | 12/1997 | Simpson |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,853,296 A | 12/1998 | Gunther et al. |
| 5,885,118 A | 3/1999 | Billenstein et al. |
| 5,890,340 A | 4/1999 | Kafarowski |
| 5,897,088 A | 4/1999 | Kirschner |
| 5,901,507 A | 5/1999 | Smeja et al. |
| 5,942,046 A | 8/1999 | Kahlfuss et al. |
| 5,970,586 A | 10/1999 | Demel et al. |
| 5,983,588 A | 11/1999 | Haddock |
| 5,987,714 A | 11/1999 | Smith |
| 5,994,640 A | 11/1999 | Bansemir et al. |
| 5,997,368 A | 12/1999 | Mello et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |

(56) References Cited

U.S. PATENT DOCUMENTS

| | | |
|---|---|---|
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,312,283 B1 | 11/2001 | Hio |
| 6,320,114 B1 | 11/2001 | Kuechler |
| 6,336,616 B1 | 1/2002 | Lin |
| 6,354,045 B1 | 3/2002 | Boone et al. |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,602,016 B2 | 8/2003 | Eckart et al. |
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressler |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B1 | 9/2006 | Suttle |
| 7,127,852 B1 | 10/2006 | Dressler |
| 7,191,794 B2 | 3/2007 | Hodges |
| 7,195,513 B2 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |
| 7,386,922 B1 | 6/2008 | Taylor et al. |
| 7,406,924 B1 | 8/2008 | Impey |
| 7,410,139 B1 | 8/2008 | Rorich |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| 7,513,080 B1 | 4/2009 | Showalter |
| 7,516,580 B2 | 4/2009 | Fennell, Jr. |
| 7,568,871 B2 | 8/2009 | Chopp, Jr. et al. |
| 7,574,839 B1 | 8/2009 | Simpson |
| 7,578,711 B2 | 8/2009 | Robinson |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,721,492 B2 | 5/2010 | Plaisted et al. |
| 7,731,138 B2 | 6/2010 | Wiesner et al. |
| 7,733,667 B2 | 6/2010 | Qin et al. |
| 7,758,003 B2 | 7/2010 | Pourtier et al. |
| 7,758,011 B2 | 7/2010 | Haddock |
| 7,762,027 B1 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 | 7/2011 | Kufner et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| 8,099,837 B2 | 1/2012 | Santlin et al. |
| D653,940 S | 2/2012 | Yasher |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 | 3/2013 | Kobayashi |
| 8,407,895 B2 | 4/2013 | Hartelius et al. |
| 8,413,946 B2 | 4/2013 | Hartelius et al. |
| 8,424,821 B2 | 4/2013 | Liu |
| 8,430,372 B2 | 4/2013 | Haddock |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,584,424 B2 | 11/2013 | Smith |

(56) References Cited

U.S. PATENT DOCUMENTS

| | | |
|---|---|---|
| 8,590,223 B2 | 11/2013 | Kilgore et al. |
| 8,627,617 B2 | 1/2014 | Haddock et al. |
| 8,627,632 B2 | 1/2014 | Werner et al. |
| D699,176 S | 2/2014 | Salomon et al. |
| 8,640,402 B1 | 2/2014 | Bilge |
| 8,656,649 B2 | 2/2014 | Haddock |
| 8,683,751 B2 | 4/2014 | Stearns |
| 8,695,290 B1 | 4/2014 | Kim et al. |
| 8,701,354 B2 | 4/2014 | Stearns et al. |
| 8,701,372 B2 | 4/2014 | Nuernberger et al. |
| 8,713,881 B2 | 5/2014 | DuPont et al. |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |
| 8,806,813 B2 | 8/2014 | Plaisted et al. |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,875,463 B2 | 11/2014 | Plagemann et al. |
| 8,888,431 B2 | 11/2014 | Haney |
| 8,893,441 B1 | 11/2014 | Hess, III et al. |
| 8,894,424 B2 | 11/2014 | DuPont |
| D718,703 S | 12/2014 | Rizzo |
| D718,704 S | 12/2014 | Rizzo |
| 8,904,718 B2 | 12/2014 | Schick et al. |
| 8,910,928 B2 | 12/2014 | Header |
| 8,920,586 B2 | 12/2014 | Poulakis |
| 8,925,263 B2 | 1/2015 | Haddock et al. |
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B1 | 3/2015 | Schrock |
| 9,003,728 B2 | 4/2015 | Asci |
| 9,003,733 B1 | 4/2015 | Simpson et al. |
| 9,010,042 B2 | 4/2015 | Anderson et al. |
| 9,011,034 B2 | 4/2015 | Liu |
| 9,052,123 B2 | 6/2015 | Anderson et al. |
| 9,065,191 B2 | 6/2015 | Martin et al. |
| 9,068,339 B2 | 6/2015 | Schaefer et al. |
| 9,076,899 B2 | 7/2015 | Schrock |
| 9,085,900 B2 | 7/2015 | Haddock |
| 9,086,185 B2 | 7/2015 | Haddock |
| 9,097,443 B2 | 8/2015 | Liu et al. |
| 9,127,451 B1 | 9/2015 | Boor |
| 9,134,044 B2 | 9/2015 | Stearns et al. |
| 9,147,785 B2 | 9/2015 | Haddock et al. |
| D740,113 S | 10/2015 | Olenick |
| 9,166,524 B2 | 10/2015 | West et al. |
| 9,175,878 B2 | 11/2015 | Kemmer et al. |
| 9,175,881 B2 | 11/2015 | Schrock et al. |
| 9,194,130 B1 | 11/2015 | Stanley |
| 9,194,613 B2 | 11/2015 | Nuernberger et al. |
| 9,200,456 B2 | 12/2015 | Murphy |
| 9,222,263 B2 | 12/2015 | Haddock |
| 9,223,907 B2 | 12/2015 | Chanin et al. |
| 9,273,885 B2 | 3/2016 | Rodrigues et al. |
| 9,291,369 B2 | 3/2016 | West et al. |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,447,988 B2 | 9/2016 | Stearns et al. |
| 9,473,066 B2 | 10/2016 | Stephan et al. |
| 9,479,110 B2 | 10/2016 | Patton et al. |
| 9,496,697 B1 | 11/2016 | Wentworth |
| 9,518,596 B2 | 12/2016 | West et al. |
| 9,530,916 B2 | 12/2016 | Haddock et al. |
| 9,534,390 B2 | 1/2017 | Pendley et al. |
| 9,599,280 B2 | 3/2017 | West et al. |
| 9,608,559 B2 | 3/2017 | Haddock et al. |
| 9,611,652 B2 | 4/2017 | Haddock et al. |
| 9,647,433 B2 | 5/2017 | Meine |
| 9,647,607 B2 | 5/2017 | Patton et al. |
| 9,689,411 B2 | 6/2017 | Meine et al. |
| 9,712,106 B2 | 7/2017 | Wentworth et al. |
| 9,714,670 B2 | 7/2017 | Header |
| 9,722,532 B2 | 8/2017 | Almy |
| 9,732,512 B2 | 8/2017 | Haddock |
| 9,742,173 B2 | 8/2017 | Wentworth |
| 9,755,572 B2 | 9/2017 | Wentworth et al. |
| D800,055 S | 10/2017 | Rothschild |
| 9,813,012 B2 | 11/2017 | Wentworth et al. |
| 9,813,013 B2 | 11/2017 | McPheeters et al. |
| 9,819,303 B2 | 11/2017 | Ash |
| 9,831,817 B2 | 11/2017 | Rothschild |
| 9,845,584 B1 | 12/2017 | Goldammer |
| 9,850,661 B2 | 12/2017 | Kovacs |
| 9,853,593 B2 | 12/2017 | Cinnamon et al. |
| 9,865,938 B2 | 1/2018 | Meine et al. |
| 9,876,463 B2 | 1/2018 | Jasmin |
| 9,893,676 B2 | 2/2018 | Anderson et al. |
| 9,893,677 B1 | 2/2018 | Liu |
| 9,920,958 B2 | 3/2018 | Haddock et al. |
| 9,926,706 B2 | 3/2018 | Hockman |
| 9,966,745 B2 | 5/2018 | Wentworth |
| 9,985,361 B2 | 5/2018 | Martin |
| 9,985,575 B2 | 5/2018 | Stearns et al. |
| 10,036,414 B2 | 7/2018 | Wiley et al. |
| 10,036,576 B1 | 7/2018 | Robinson |
| D827,160 S | 8/2018 | Menton |
| 10,053,856 B2 | 8/2018 | Haddock |
| 10,054,336 B2 | 8/2018 | Haddock et al. |
| D827,873 S | 9/2018 | Menton |
| D827,874 S | 9/2018 | Menton |
| 10,077,562 B2 | 9/2018 | Haddock et al. |
| 10,103,682 B2 | 10/2018 | Haddock et al. |
| 10,103,683 B2 | 10/2018 | Wentworth |
| 10,106,987 B2 | 10/2018 | Haddock et al. |
| 10,141,662 B2 | 11/2018 | Bernard et al. |
| 10,184,250 B1 * | 1/2019 | Abdel-Rahman ......... E04C 3/07 |
| 10,186,791 B2 | 1/2019 | Meine et al. |
| 10,202,991 B2 | 2/2019 | Lewis |
| 10,205,418 B2 | 2/2019 | Nayar |
| 10,211,773 B2 | 2/2019 | Jasmin et al. |
| 10,211,775 B1 | 2/2019 | Wentworth et al. |
| 10,218,305 B1 | 2/2019 | Schrock |
| 10,240,820 B2 | 3/2019 | Ash et al. |
| 10,291,176 B2 | 5/2019 | Wentworth et al. |
| 10,312,855 B2 | 6/2019 | Lester et al. |
| 10,337,764 B2 | 7/2019 | Ash et al. |
| 10,359,069 B2 | 7/2019 | Ash et al. |
| 10,385,573 B2 | 8/2019 | Van Leuven |
| 10,443,896 B2 | 10/2019 | Haddock et al. |
| 10,454,190 B1 | 10/2019 | Martin |
| 10,472,828 B2 | 11/2019 | Stearns et al. |
| 10,502,457 B2 | 12/2019 | Haddock et al. |
| 10,505,492 B2 | 12/2019 | Hudson et al. |
| 10,511,252 B2 | 12/2019 | Wentworth et al. |
| 10,530,293 B2 | 1/2020 | Legall et al. |
| 10,551,090 B2 | 2/2020 | De Vogel et al. |
| 10,594,251 B2 | 3/2020 | Stearns et al. |
| 10,622,935 B2 | 4/2020 | Liu |
| 10,634,175 B2 | 4/2020 | Haddock |
| 10,640,980 B2 | 5/2020 | Haddock |
| 10,644,643 B2 | 5/2020 | Stearns et al. |
| 10,673,151 B2 | 6/2020 | Ash et al. |
| 10,686,401 B2 | 6/2020 | Ash et al. |
| 10,731,355 B2 | 8/2020 | Haddock et al. |
| 10,749,459 B1 | 8/2020 | Liu et al. |

(56) References Cited

U.S. PATENT DOCUMENTS

| | | |
|---|---|---|
| 10,749,466 B2 | 8/2020 | Smeja |
| 10,756,668 B2 * | 8/2020 | Bamat .................... F24S 25/70 |
| 10,763,777 B2 | 9/2020 | Stearns et al. |
| 10,797,634 B1 | 10/2020 | Jasmin et al. |
| 10,816,240 B2 | 10/2020 | Robinson |
| 10,837,476 B2 | 11/2020 | Lewis |
| 10,851,826 B2 | 12/2020 | Ash et al. |
| 10,859,292 B2 | 12/2020 | Haddock et al. |
| 10,868,491 B2 | 12/2020 | Wentworth et al. |
| 10,903,785 B2 | 1/2021 | Haddock et al. |
| D909,853 S | 2/2021 | Jasmin |
| 10,931,225 B2 | 2/2021 | Yang et al. |
| 10,948,002 B2 | 3/2021 | Haddock |
| 11,009,262 B2 | 5/2021 | Ash et al. |
| 11,012,023 B2 | 5/2021 | Stearns et al. |
| D923,203 S | 6/2021 | Muther |
| D923,823 S | 6/2021 | Muther |
| 11,035,126 B2 | 6/2021 | Haddock et al. |
| 11,041,310 B1 | 6/2021 | Haddock et al. |
| 11,085,188 B2 | 8/2021 | Haddock |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 | 10/2021 | Eriksson |
| 11,139,774 B2 | 10/2021 | Wentworth et al. |
| 11,189,941 B2 | 11/2021 | Ash et al. |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,333,179 B2 | 5/2022 | Haddock |
| 11,352,793 B2 | 6/2022 | Haddock et al. |
| 11,368,005 B2 | 6/2022 | Meine et al. |
| 11,512,474 B2 | 11/2022 | Haddock et al. |
| 11,552,591 B2 | 1/2023 | Jasmin et al. |
| 11,573,033 B2 | 2/2023 | Haddock et al. |
| 11,575,343 B2 | 2/2023 | Wentworth et al. |
| 11,616,468 B2 | 3/2023 | Haddock et al. |
| D983,015 S | 4/2023 | Jasmin et al. |
| D983,016 S | 4/2023 | Jasmin et al. |
| D983,017 S | 4/2023 | Jasmin et al. |
| D983,018 S | 4/2023 | Jasmin et al. |
| D983,019 S | 4/2023 | Jasmin et al. |
| 11,621,665 B2 | 4/2023 | Jasmin et al. |
| D984,872 S | 5/2023 | Jasmin et al. |
| 11,646,692 B2 | 5/2023 | Wentworth et al. |
| 11,668,332 B2 | 6/2023 | Haddock |
| 11,739,529 B2 | 8/2023 | Haddock et al. |
| 11,750,143 B1 | 9/2023 | Jasmin et al. |
| 11,774,143 B2 | 10/2023 | Leitch et al. |
| 2002/0026765 A1 | 3/2002 | Vahey |
| 2002/0088196 A1 | 7/2002 | Haddock |
| 2002/0160635 A1 | 10/2002 | Kurrer et al. |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |
| 2005/0095062 A1 | 5/2005 | Iverson et al. |
| 2005/0102958 A1 | 5/2005 | Anderson |
| 2005/0115176 A1 | 6/2005 | Russell |
| 2005/0117997 A1 | 6/2005 | Pinzl |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamp |
| 2006/0096061 A1 | 5/2006 | Weiland et al. |
| 2006/0118163 A1 | 6/2006 | Plaisted et al. |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0095591 A1 | 4/2008 | Wu |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0223741 A1 | 9/2009 | Picard, Jr. |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0012805 A1 | 1/2010 | Taylor |
| 2010/0058701 A1 | 3/2010 | Yao et al. |
| 2010/0133040 A1 | 6/2010 | London |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0192505 A1 | 8/2010 | Schaefer et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0039458 A1 | 2/2011 | Byrne |
| 2011/0078892 A1 | 4/2011 | Hartelius et al. |
| 2011/0088340 A1 | 4/2011 | Stobbe |
| 2011/0120047 A1 | 5/2011 | Stearns et al. |
| 2011/0138585 A1 | 6/2011 | Kmita et al. |
| 2011/0154750 A1 | 6/2011 | Welter et al. |
| 2011/0174360 A1 | 7/2011 | Plaisted et al. |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1 | 9/2011 | London |
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1 | 5/2012 | Rizzo |
| 2012/0153108 A1 | 6/2012 | Schneider |
| 2012/0167364 A1 | 7/2012 | Koch et al. |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0048056 A1 | 2/2013 | Kilgore et al. |
| 2013/0089388 A1 | 4/2013 | Liu et al. |
| 2013/0091692 A1 | 4/2013 | Stanley |
| 2013/0118545 A1 | 5/2013 | Bosler et al. |

(56) References Cited

U.S. PATENT DOCUMENTS

| | | |
|---|---|---|
| 2013/0149030 A1 | 6/2013 | Merhar et al. |
| 2013/0167470 A1 | 7/2013 | Montgomery et al. |
| 2013/0168525 A1 | 7/2013 | Haddock |
| 2013/0220403 A1 | 8/2013 | Rizzo |
| 2013/0227833 A1 | 9/2013 | Rizzo |
| 2013/0263917 A1 | 10/2013 | Hamamura |
| 2013/0313043 A1 | 11/2013 | Lallier |
| 2013/0340358 A1 | 12/2013 | Danning |
| 2014/0000681 A1 | 1/2014 | Zhao et al. |
| 2014/0003861 A1 | 1/2014 | Cheung |
| 2014/0041202 A1 | 2/2014 | Schnitzer et al. |
| 2014/0069048 A1 | 3/2014 | Ally |
| 2014/0096462 A1 | 4/2014 | Haddock |
| 2014/0179133 A1 | 6/2014 | Redel |
| 2014/0220834 A1 | 8/2014 | Rizzo |
| 2014/0231605 A1 | 8/2014 | Sharpe et al. |
| 2014/0260068 A1 | 9/2014 | Pendley et al. |
| 2014/0283467 A1 | 9/2014 | Chabas et al. |
| 2014/0290718 A1 | 10/2014 | Jackson, Jr. |
| 2014/0338273 A1 | 11/2014 | Stapleton |
| 2014/0341645 A1 | 11/2014 | Liu et al. |
| 2015/0052834 A1 | 2/2015 | Gies et al. |
| 2015/0060620 A1 | 3/2015 | Smeja |
| 2015/0107168 A1 | 4/2015 | Kobayashi |
| 2015/0129517 A1 | 5/2015 | Wildes |
| 2015/0171787 A1 | 6/2015 | Genschorek |
| 2015/0200620 A1 | 7/2015 | Haddock et al. |
| 2015/0214884 A1 | 7/2015 | Rizzo |
| 2015/0249423 A1 | 9/2015 | Braunstein et al. |
| 2016/0025262 A1 | 1/2016 | Stearns et al. |
| 2016/0049901 A1 | 2/2016 | Muther et al. |
| 2016/0060869 A1 | 3/2016 | Smeja |
| 2016/0087576 A1 | 3/2016 | Johansen et al. |
| 2016/0111835 A1 | 4/2016 | Nayar |
| 2016/0111997 A1 | 4/2016 | Ganshaw et al. |
| 2016/0111998 A1 | 4/2016 | Schmid |
| 2016/0130815 A1 | 5/2016 | Menegoli |
| 2016/0160524 A1 | 6/2016 | Malins |
| 2016/0176105 A1 | 6/2016 | Stanley |
| 2016/0177984 A1 | 6/2016 | Kovacs et al. |
| 2016/0233820 A1 | 8/2016 | Redel |
| 2016/0268958 A1 | 9/2016 | Wildes et al. |
| 2017/0040928 A1 | 2/2017 | Schuit et al. |
| 2017/0067258 A1 | 3/2017 | Stearns et al. |
| 2017/0073974 A1 | 3/2017 | Kovacs |
| 2017/0107723 A1 | 4/2017 | Stearns et al. |
| 2017/0237386 A1 | 8/2017 | Stephan et al. |
| 2017/0301265 A1 | 10/2017 | Kyle et al. |
| 2017/0302221 A1 | 10/2017 | Jasmin |
| 2017/0336021 A1 | 11/2017 | Anderson |
| 2018/0013382 A1 | 1/2018 | Smeja |
| 2018/0167026 A1 | 6/2018 | Xie |
| 2019/0013772 A1 | 1/2019 | Bamat et al. |
| 2019/0049151 A1 | 2/2019 | Harris et al. |
| 2019/0106885 A1 | 4/2019 | Stearns et al. |
| 2019/0123460 A1 | 4/2019 | Ash et al. |
| 2019/0165717 A1 | 5/2019 | Haddock et al. |
| 2019/0178274 A1 | 6/2019 | Katz |
| 2019/0195252 A1 | 6/2019 | Pryor et al. |
| 2019/0226214 A1 | 7/2019 | Van Leuven |
| 2019/0273460 A1 | 9/2019 | Kovacs |
| 2019/0285224 A1 | 9/2019 | McKechnie et al. |
| 2019/0330853 A1 | 10/2019 | Van Leuven |
| 2019/0343085 A1 | 11/2019 | Donado |
| 2019/0345719 A1 | 11/2019 | Header |
| 2019/0363667 A1 | 11/2019 | Braunstein et al. |
| 2019/0372501 A1 | 12/2019 | Wada et al. |
| 2020/0144959 A1 | 5/2020 | Stearns et al. |
| 2020/0208658 A1 | 7/2020 | Roman |
| 2020/0252023 A1 | 8/2020 | Stearns et al. |
| 2020/0313604 A1 | 10/2020 | Harris et al. |
| 2020/0313611 A1 | 10/2020 | Ash et al. |
| 2020/0318349 A1 | 10/2020 | Stearns et al. |
| 2020/0321763 A1 | 10/2020 | Joshi et al. |
| 2020/0362632 A1 | 11/2020 | Fort |
| 2021/0005115 A1 | 1/2021 | Johnson |
| 2021/0028741 A1 | 1/2021 | Stearns et al. |
| 2021/0067085 A1 | 3/2021 | Stearns et al. |
| 2021/0079947 A1 | 3/2021 | Ash et al. |
| 2021/0104973 A1 | 4/2021 | Stearns et al. |
| 2021/0111546 A1 | 4/2021 | Varale |
| 2021/0159843 A1 | 5/2021 | Stearns et al. |
| 2021/0167720 A1 | 6/2021 | Stearns et al. |
| 2021/0184626 A1 | 6/2021 | Yang et al. |
| 2021/0194157 A1 | 6/2021 | Ash et al. |
| 2021/0265940 A1 | 8/2021 | Stearns et al. |
| 2021/0301541 A1 | 9/2021 | Haddock et al. |
| 2021/0310249 A1 | 10/2021 | Haddock et al. |
| 2021/0363755 A1 | 11/2021 | Haddock |
| 2021/0376781 A1 | 12/2021 | Stearns et al. |
| 2021/0376782 A1 | 12/2021 | Stearns et al. |
| 2021/0388618 A1 | 12/2021 | Stearns et al. |
| 2022/0010823 A1 | 1/2022 | Moss et al. |
| 2022/0140771 A1 | 5/2022 | Stearns et al. |
| 2022/0145634 A1 | 5/2022 | Stearns et al. |
| 2022/0149545 A1 | 5/2022 | Ash et al. |
| 2022/0178586 A1 | 6/2022 | Ash et al. |
| 2022/0275813 A1 | 9/2022 | Haddock |
| 2022/0278516 A1 | 9/2022 | Meine et al. |
| 2023/0036926 A1 | 2/2023 | Jovanovic et al. |
| 2023/0090124 A1 | 3/2023 | Haddock et al. |
| 2023/0170840 A1 | 6/2023 | Stearns et al. |
| 2023/0175737 A1 | 6/2023 | Haddock et al. |
| 2023/0198460 A1 | 6/2023 | Jasmin et al. |
| 2023/0261606 A1 | 8/2023 | Stearns et al. |

FOREIGN PATENT DOCUMENTS

| | | |
|---|---|---|
| AT | 298762 | 5/1972 |
| AU | 2005201707 | 11/2006 |
| AU | 2009101276 | 1/2010 |
| AU | 2009245849 | 6/2010 |
| AU | 2014362215 | 6/2015 |
| AU | 2017203660 | 10/2018 |
| AU | 2016294152 | 12/2018 |
| CA | 2704915 | 9/2011 |
| CH | 204783 | 5/1939 |
| CH | 388590 | 2/1965 |
| CH | 469159 | 2/1969 |
| CH | 671063 | 7/1989 |
| CN | 202025767 | 11/2011 |
| CN | 202577780 | 12/2012 |
| CN | 103774795 | 5/2014 |
| CN | 104254654 | 12/2014 |
| CN | 105208941 | 12/2015 |
| CN | 206628755 | 11/2017 |
| CN | 206717199 | 12/2017 |
| CN | 206737192 | 12/2017 |
| CN | 206849001 | 1/2018 |
| CN | 108105222 | 6/2018 |
| CO | 6511275 | 8/2012 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007018367 | 7/2008 |
| DE | 102007036206 | 2/2009 |
| DE | 202009010984 | 12/2009 |
| DE | 102008032985 | 1/2010 |
| DE | 202013002857 | 5/2013 |

(56) References Cited

FOREIGN PATENT DOCUMENTS

| | | |
|---|---|---|
| DE | 202015102936 | 9/2016 |
| DE | 202012013476 | 2/2017 |
| EP | 0481905 | 4/1992 |
| EP | 0722023 | 7/1996 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2746695 | 6/2014 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2971577 | 8/2012 |
| FR | 2997169 | 4/2014 |
| FR | 3074369 | 12/2019 |
| GB | 2149829 | 6/1985 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-097291 | 4/2006 |
| JP | 2009-052278 | 3/2009 |
| JP | 2009-179955 | 8/2009 |
| JP | 2009-185599 | 8/2009 |
| JP | 2011-069130 | 4/2011 |
| JP | 2011-185014 | 9/2011 |
| JP | 2011-236611 | 11/2011 |
| JP | 2012-144903 | 8/2012 |
| JP | 6033922 | 11/2016 |
| JP | 2018-091009 | 6/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2014/194576 | 12/2014 |
| WO | WO 2015/061113 | 4/2015 |
| WO | WO 2016/198305 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |

OTHER PUBLICATIONS

U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 16/539,960, filed Aug. 13, 2019 now U.S. Pat. No. 10,859,292.
U.S. Appl. No. 17/110,621, filed Dec. 3, 2020 now U.S. Pat. No. 11,573,033.
U.S. Appl. No. 18/106,104, filed Feb. 6, 2023.
U.S. Appl. No. 15/798,023, filed Oct. 30, 2017 now U.S. Pat. No. 10,640,980.
U.S. Appl. No. 16/866,080, filed May 4, 2020 now U.S. Pat. No. 11,085,188.
U.S. Appl. No. 17/398,146, filed Aug. 10, 2021.
U.S. Appl. No. 16/360,923, filed Mar. 21, 2019 now U.S. Pat. No. 10,903,785.
U.S. Appl. No. 29/845,330, filed Jul. 6, 2022.
U.S. Appl. No. 29/877,872, filed Jun. 13, 2023.
U.S. Appl. No. 29/877,876, filed Jun. 13, 2023.
U.S. Appl. No. 17/156,469, filed Jan. 22, 2021 now U.S. Pat. No. 11,616,468.
U.S. Appl. No. 18/125,006, filed Mar. 22, 2023.
U.S. Appl. No. 16/714,060, filed Dec. 13, 2019 now U.S. Pat. No. 10,948,002.
U.S. Appl. No. 17/199,947, filed Mar. 12, 2021 now U.S. Pat. No. 11,668,332.
U.S. Appl. No. 18/195,273, filed May 9, 2023.
U.S. Appl. No. 13/720,461, filed Dec. 19, 2012.
U.S. Appl. No. 15/628,927, filed Jun. 21, 2017 now U.S. Pat. No. 10,634,175.

(56) References Cited

OTHER PUBLICATIONS

U.S. Appl. No. 16/824,651, filed Mar. 19, 2020 now U.S. Pat. No. 11,333,179.
U.S. Appl. No. 17/745,528, filed May 16, 2022 now.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/383,477, filed Feb. 2, 1995.
U.S. Appl. No. 08/285,280, filed Aug. 1, 1994 now U.S. Pat. No. 5,557,903.
U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 09/698,358, filed Oct. 27, 2000.
U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 now U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.
U.S. Appl. No. 14/697,387, filed Apr. 27, 2015.
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 16/592,521, filed Oct. 3, 2019 now U.S. Pat. No. 11,035,126.
U.S. Appl. No. 17/347,291, filed Jun. 14, 2021.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020 now U.S. Pat. No. 11,774,143.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020 now U.S. Pat. No. 11,041,310.
U.S. Appl. No. 17/353,483, filed Jun. 21, 2021.
U.S. Appl. No. 17/203,481, filed Mar. 16, 2021 now U.S. Pat. No. 11,352,793.
U.S. Appl. No. 17/833,252, filed Jun. 6, 2022 now U.S. Pat. No. 11,739,529.
U.S. Appl. No. 18/457,101, filed Aug. 28, 2023.
U.S. Appl. No. 17/203,483, filed Mar. 16, 2021 now U.S. Pat. No. 11,512,474.
U.S. Appl. No. 18/070,135, filed Nov. 28, 2022.
U.S. Appl. No. 17/371,888, filed Jul. 9, 2021.
U.S. Appl. No. 29/812,325, filed Oct. 20, 2021.
U.S. Appl. No. 29/874,164, filed Apr. 14, 2023.
U.S. Appl. No. 29/911,242, filed Aug. 30, 2023.
U.S. Appl. No. 29/909,779, filed Aug. 10, 2023.
U.S. Appl. No. 29/911,713, filed Sep. 7, 2023.
"Ace Clamp Cut Sheet | 5031 Z1-2," Ace Clamp, Nov. 2018, 1 page.
"ADJ Heavy Duty Lighting C-clamp," Sweetwater, 2011, 3 pages [retrieved online from: http://web.archive.org/web/20111112045516/http://www.sweetwater.com/store/detail/CClamp/].
"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].
"Aerocompact® Compactmetal TR," Aerocompact, Sep. 2, 2021, PB TR ENG EU V1, 3 pages[retrieved online from: cdn.intelligencebank.com/eu/share/8MnR/qMBXP/VYrWa/original/AEROCOMPACT_Leaflet_TR_ENG_V1_WEB].
"Aluminum," Wikipedia, Jul. 3, 2016, 21 pages [retrieved from: en.wikipedia.org/w1ki/Aluminium].
"ClampFit-H Product Sheet," Schletter GmbH, Kirchdorf, Germany, Nov. 2015, 2 pages.
"Code: The SR-EC-010," Lockseam Ltd., Received Nov. 9, 2022, Datasheet SR-EC-010 Version 2.0, 6 pages.
"CompactMETAL TR59 | TR74 Assembly Instructions," Aerocompact, Sep. 2021, 27 pages.

(56) References Cited

OTHER PUBLICATIONS

"ERK-TRB-C16 RiverClack Roofing Profile Interface," Enerack, 2021, 2 pages. [retrieved online from: www.enerack.com/erk-trb-c16-riverclack-roofing-profile-interface-p00231p1.html].
"EZ Grip Metal Deck Mount," SunModo Corp., 2019, 1 page.
"EZ Grip Metal Deck Mount," SunModo Corp., 2019, Product page, 3 pages [retrieved online May 30, 2019 from: sunmodo.com/product/ez-grip-metal-deck-mount/#].
"Fix2000 check list," Schletter GmbH, last updated Jul. 2010, 1 page.
"Grounding Clip for Electrical Protection," ARaymond, 2016, 2 pages.
IDEEMATEC Tracking & Mounting Systems [online], Apr. 2008, [retrieved Mar. 6, 2012], Retrieved from http://www.ideematec.de.
"Installation Instructions for Rayvolt®—Grounding clip for Framed PV Modules," ARaymond, Feb. 2016, Version 2.2, 1 page.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"LM-KS-700," Lumax Energy, 2018, 1 page.
"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].
"Metal Roof Deck Mount Kit," SunModo Corp., Oct. 16, 2018, Product Drawing, 1 page.
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"New 'Alzone 360 system'", Arrid, 2008, 34 pages [retrieved online from: https://web.archive.org/web/20120317120735/www.arrid.com.au/?act=racking_parts].
"Non-Penetrative Clamps with Roofs," Clenergy, Dec. 2021, Datasheet, 5 pages.
"Oil Canning—Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.
"ProteaBracket ™ Install Instructions," Metal Roof Innovations, Ltd., 2022, 2 pages.
"ProteaBracket™ Brochure," Metal Roof Innovations, Ltd., 2019, 2 pages.
"PV-ezRack Klip-lok Interface," Clenergy, 2020, 1 page.
"PV-ezRack SolarRoof-Black Anodized," Clenergy, 2020, 4 pages.
"REES—Snow Retention Systems," Weerbewind, 2010, 3 pages [retrieved online from: https://web.archive.org/web/20100310075027/www.rees-oberstdorf.de/en/products/snow-retention-system.html].
"S-5! WindClamp™ Install," Metal Roof Innovations, Ltd., 2014, 1 page.
"Slot definition," Merriam-Webster Dictionary, 2022, 1 page [retrieved online Aug. 24, 2022 from www.merriam-webster.com/dictionary/slot].
"Solar mount. System," Schletter GmbH, 2012, 1 page [retrieved online from: https://web.archive.org/web/20120316154604/www.schletter.de/152-1-Solar-mounting-systems.html].
"Standing Seam Rail Free One Sheet," SunModo, Corp., 2020, 2 pages.
"Standing Seam RiverClack Clamp," Shanghai Woqin New Energy Technology Co., Ltd., 2018, 4 pages [retrieved online on Mar. 23, 2022 from: www.wochnmount.com/Details.html?product_id=36].
"SunDock™ Standing Seam Rail-Free Attachment System," SunModo Corp., 2018, 1 page.
"SunDock Standing Seam PV Mounting System Installation Manual," SunModo, 2019, Doc. No. D10160-V006, 14 pages.
"Universal Clamps Brochure for Web," Universal Clamps, 2020, 2 pages.
"Universal Klip-lok Interface pre-assembly with Cross Connector Clamp," Clenergy, 2020, 1 page.
"Universal Klip-lok Interface pre-assembly with Tin Interface A with ezClick module," Clenergy, 2020, 1 page.
"Wiley Grounding & Bonding Solutions," Hubbell, 2020, 2 pages [retrieved online from: www.hubbell.com/wiley/en/grounding-and-bonding].
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A CCD, 1 page.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages& ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
Notice of Allowance with English Translation for China Patent Application No. 201830515191.4, dated May 6, 2019 4 pages.
Notice of Allowance with English Translation for China Patent Application No. 201830515375.0, dated Feb. 12, 2019 4 pages.
Notice of Allowance with English Translation for China Patent Application No. 201830515387.3, dated Apr. 10, 2019 4 pages.
Notice of Allowance with English Translation for China Patent Application No. 201830515406.2, dated Mar. 26, 2019 4 pages.
Notice of Allowance with English Translation for China Patent Application No. 201830515409.6, dated Mar. 26, 2019 4 pages.
Notice of Allowance with English Translation for China Patent Application No. 201830515288.5, dated Mar. 26, 2019 4 pages.
International Search Report and Written Opinion for International (PCT) Patent Application No. PCT/US19/23423, dated Jun. 13, 2019 11 pages.
International Preliminary Report on Patentability for International (PCT) Patent Application No. PCT/US2019/023423, dated Oct. 1, 2020 10 pages.
Official Action for ARIPO Patent Application No. AP/P/2020/012727, dated Jul. 4, 2022 6 pages.
Official Action for ARIPO Patent Application No. AP/P/2020/012727, dated Feb. 15, 2023 8 pages.
Notice of Allowance for ARIPO Patent Application No. AP/P/2020/012727, dated Apr. 25, 2023 4 pages.
Official Action for Australia Patent Application No. 2019240320, dated Oct. 7, 2021 3 pages.
Notice of Acceptance for Australia Patent Application No. 2019240320, dated Sep. 28, 2022 4 pages.
Official Action for Canada Patent Application No. 3,094,498, dated Oct. 5, 2021 4 pages.
Notice of Allowance for Canada Patent Application No. 3,094,498, dated Oct. 20, 2022 1 page.
Official Action with machine translation for Chile Patent Application No. 2408-2020, dated Sep. 14, 2021 24 pages.
Official Action with machine translation for Chile Patent Application No. 202002408, dated Apr. 4, 2022 29 pages.
Official Action with partial machine translation for China Patent Application No. 201980032371.9, dated Oct. 15, 2021 6 pages.
Notice of Allowance with English Translation for China Patent Application No. 201980032371.9, dated Apr. 26, 2022 5 pages.
Official Action with machine translation for Colombia Patent Application No. NC2020/0012829, dated Jul. 21, 2022 12 pages.
Official Action with Machine Translation for Colombia Patent Application No. NC2020/0012829, dated Jan. 31, 2023 17 pages.
Official Action with Machine Translation for Costa Rica Patent Application No. 2020-0000491, dated Jan. 23, 2023 7 pages.
Extended Search Report for European Patent Application No. 19771033.8, dated Nov. 9, 2021 10 pages.
Official Action for Kuwait Patent Application No. KW/P/2020/00305, dated Jun. 21, 2022 10 pages.

(56) References Cited

OTHER PUBLICATIONS

Official Action with machine translation for Mexico Patent Application No. MX/a/2020/009805, dated Jul. 27, 2021 10 pages.
Official Action with English Summary for Mexico Patent Application No. MX/a/2020/009805, dated Feb. 24, 2022 8 pages.
Official Action with English Summary for Mexico Patent Application No. MX/a/2020/009805, dated Oct. 10, 2022 6 pages.
Official Action with English Overview for Mexico Patent Application No. MX/a/2020/009805, dated Apr. 14, 2023 5 pages.
Official Action for New Zealand Patent Application No. 768908, dated Jan. 21, 2021, 4 pages.
Notice of Acceptance for New Zealand Patent Application No. 768908, dated Jul. 23, 2021 2 pages.
Official Action for Panama Patent Application No. 92309-01, dated Jul. 8, 2021 4 pages.
Official Action for Panama Patent Application No. 92309-01, dated Sep. 20, 2022 3 pages.
Official Action with English Summary for Saudi Arabia Patent Application No. 520420174, dated Mar. 30, 2022 8 pages.
Official Action with English Summary for Saudi Arabia Patent Application No. 520420174, dated Jun. 30, 2022 7 pages.
Official Action with machine translation for Saudi Arabia Patent Application No. 522431324, dated Sep. 25, 2022 17 pages.
Official Action with Machine Translation for China Patent Application No. 202230857176.4, dated Jul. 20, 2023 2 pages.
Official Action for U.S. Appl. No. 16/360,923, dated Nov. 14, 2019 6 pages Restriction Requirement.
Official Action for U.S. Appl. No. 16/360,923, dated Feb. 10, 2020 11 pages.
Official Action for U.S. Appl. No. 16/360,923, dated Jul. 10, 2020 11 pages.
Notice of Allowance for U.S. Appl. No. 16/360,923, dated Sep. 24, 2020 10 pages.
Corrected Notice of Allowance for U.S. Appl. No. 16/360,923, dated Nov. 3, 2020 7 pages.
Official Action for U.S. Appl. No. 17/156,469, dated Aug. 4, 2021 6 pages Restriction Requirement.
Official Action for U.S. Appl. No. 17/156,469, dated Oct. 20, 2021 21 pages.
Official Action for U.S. Appl. No. 17/156,469, dated Mar. 1, 2022 22 pages.
Official Action for U.S. Appl. No. 17/156,469, dated Jul. 22, 2022 23 pages.
Notice of Allowance for U.S. Appl. No. 17/156,469, dated Nov. 7, 2022 9 pages.
"MLPE Mount," Unirac, Dec. 2016, 1 page.
"Rail System," Pegasus Solar, 2021, 2 pages.

\* cited by examiner

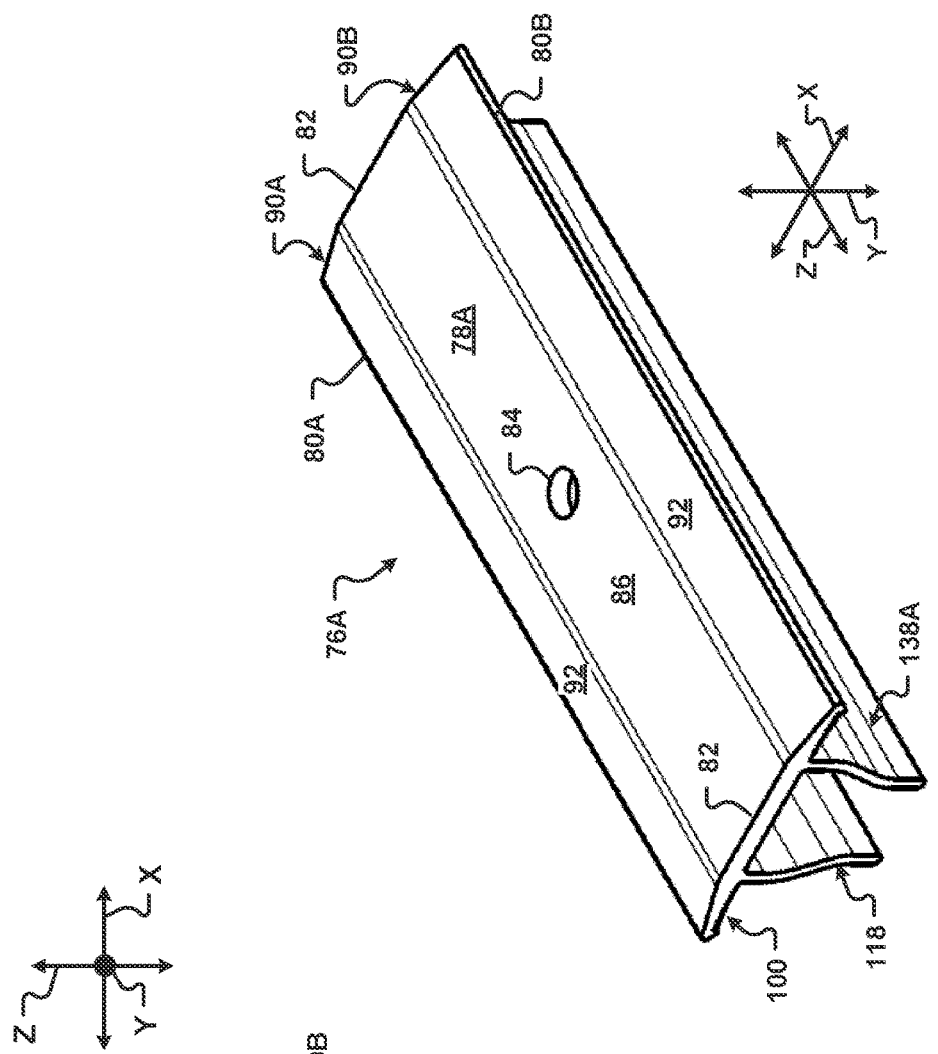
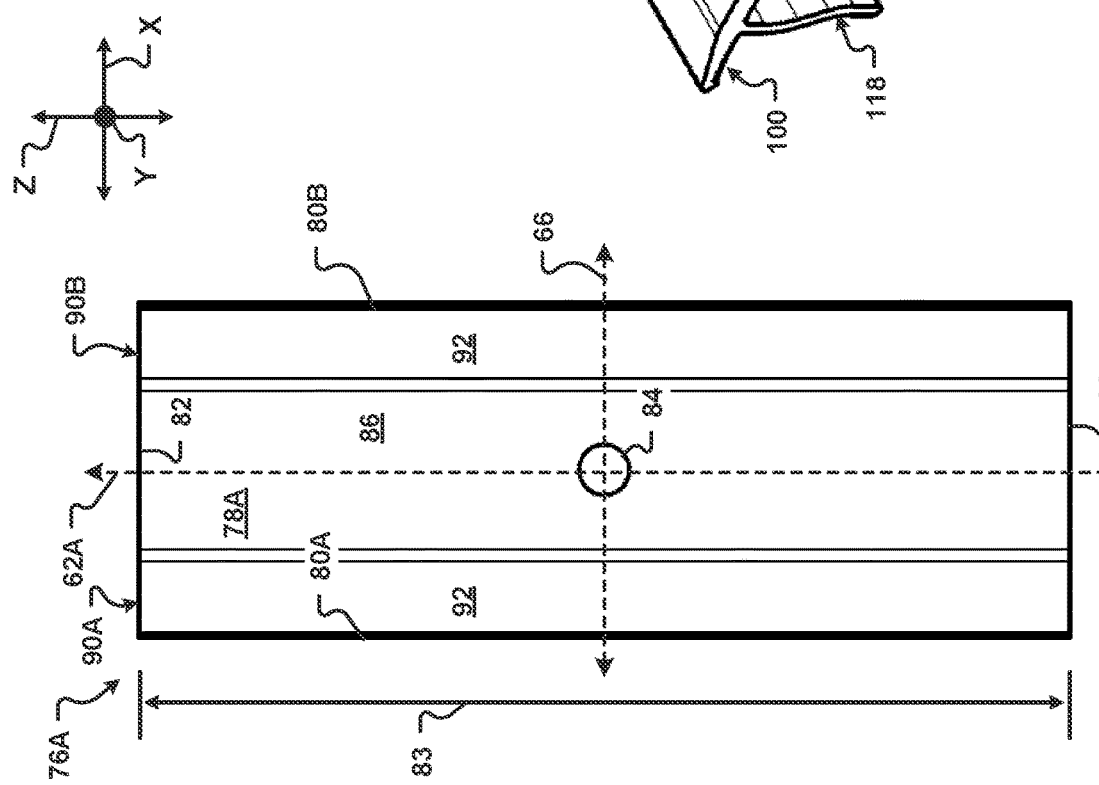
Fig. 8C
Fig. 8B

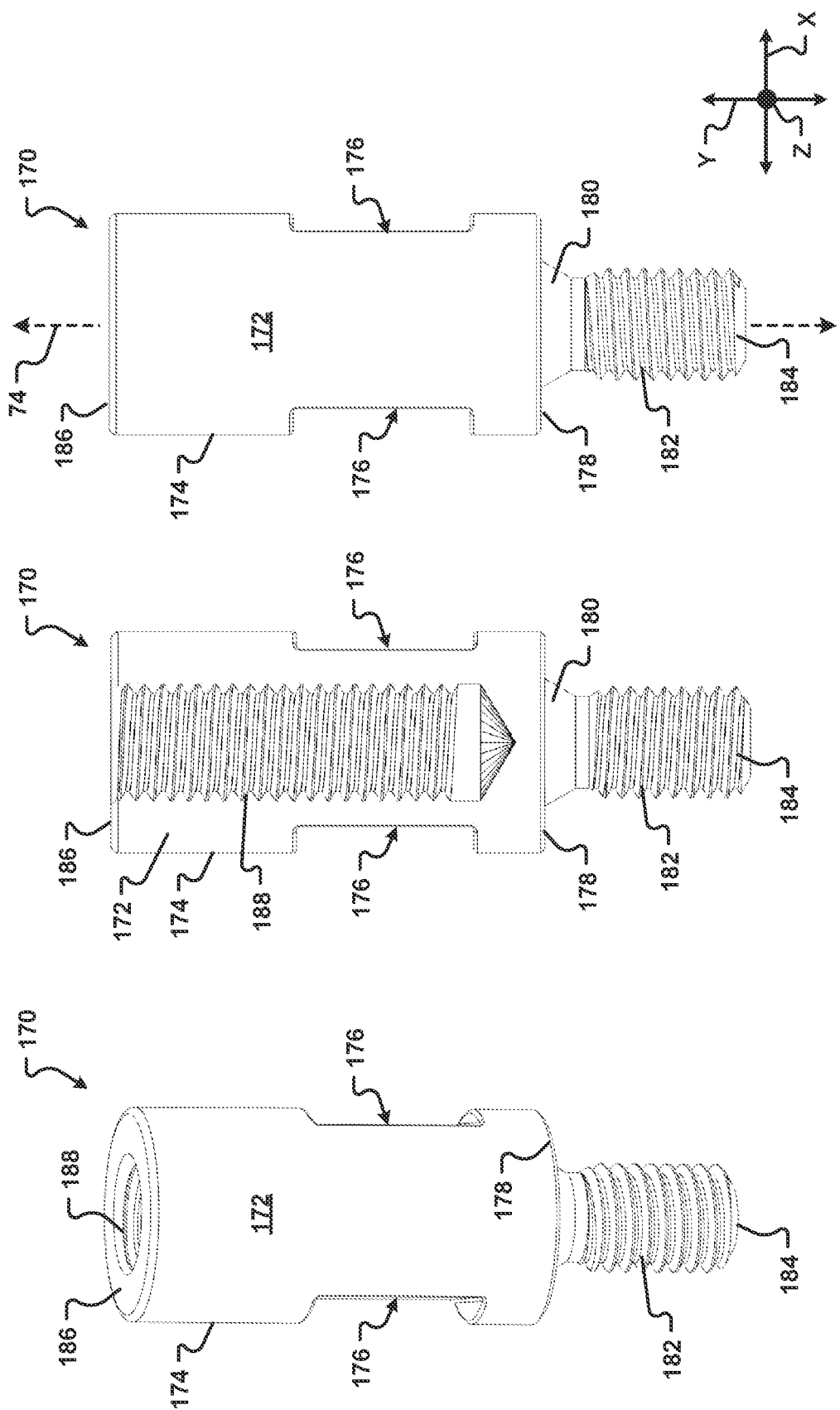

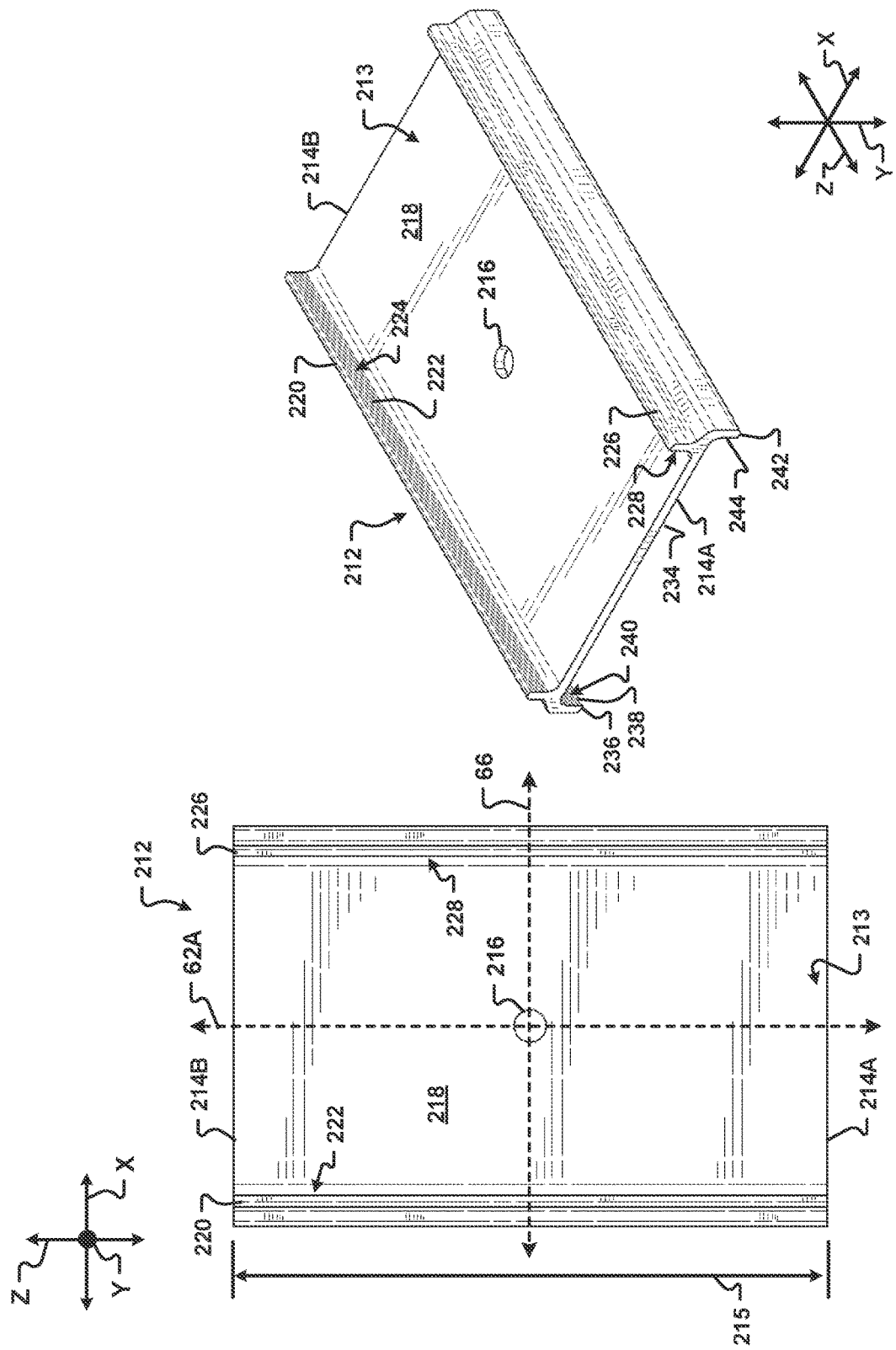

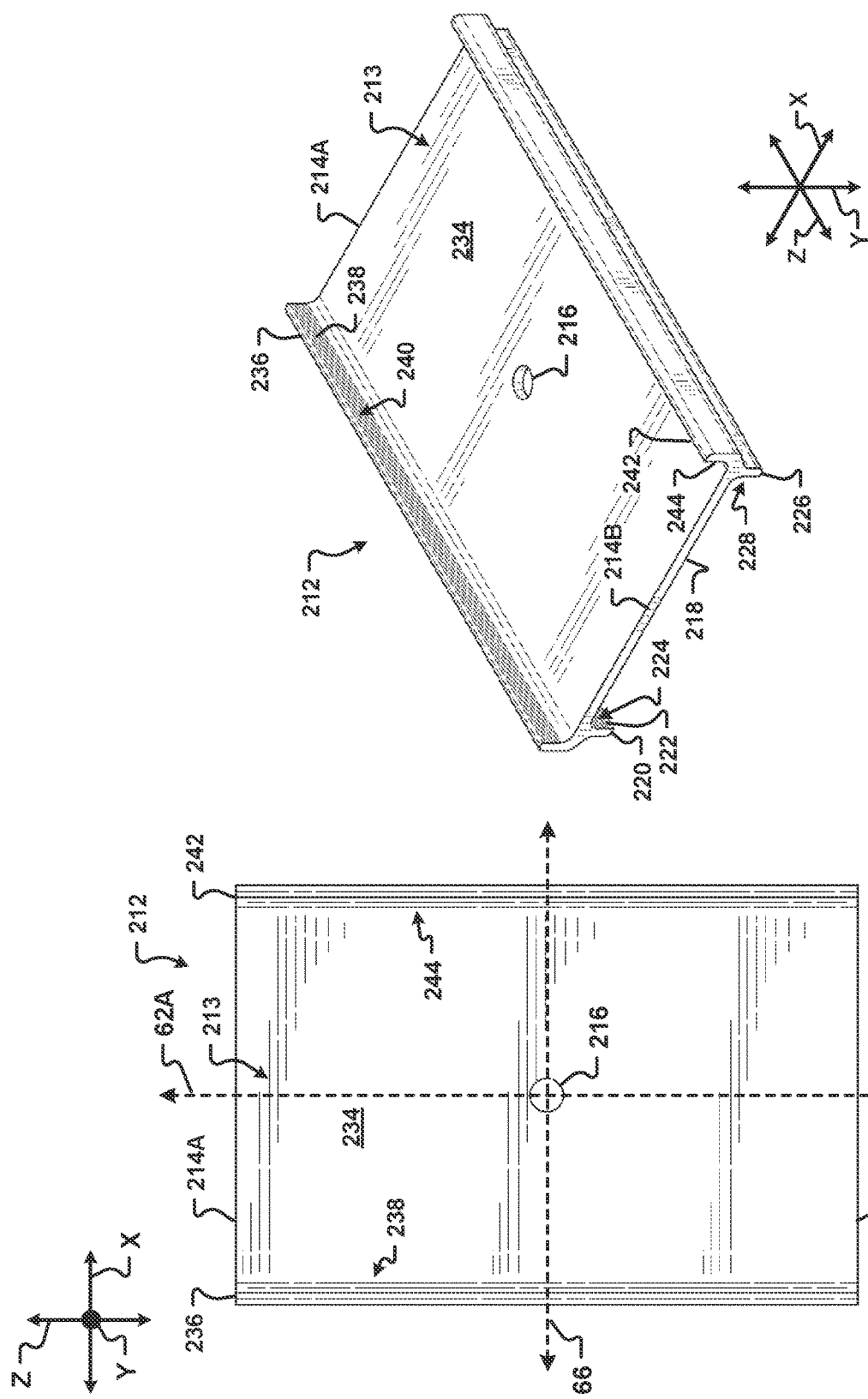

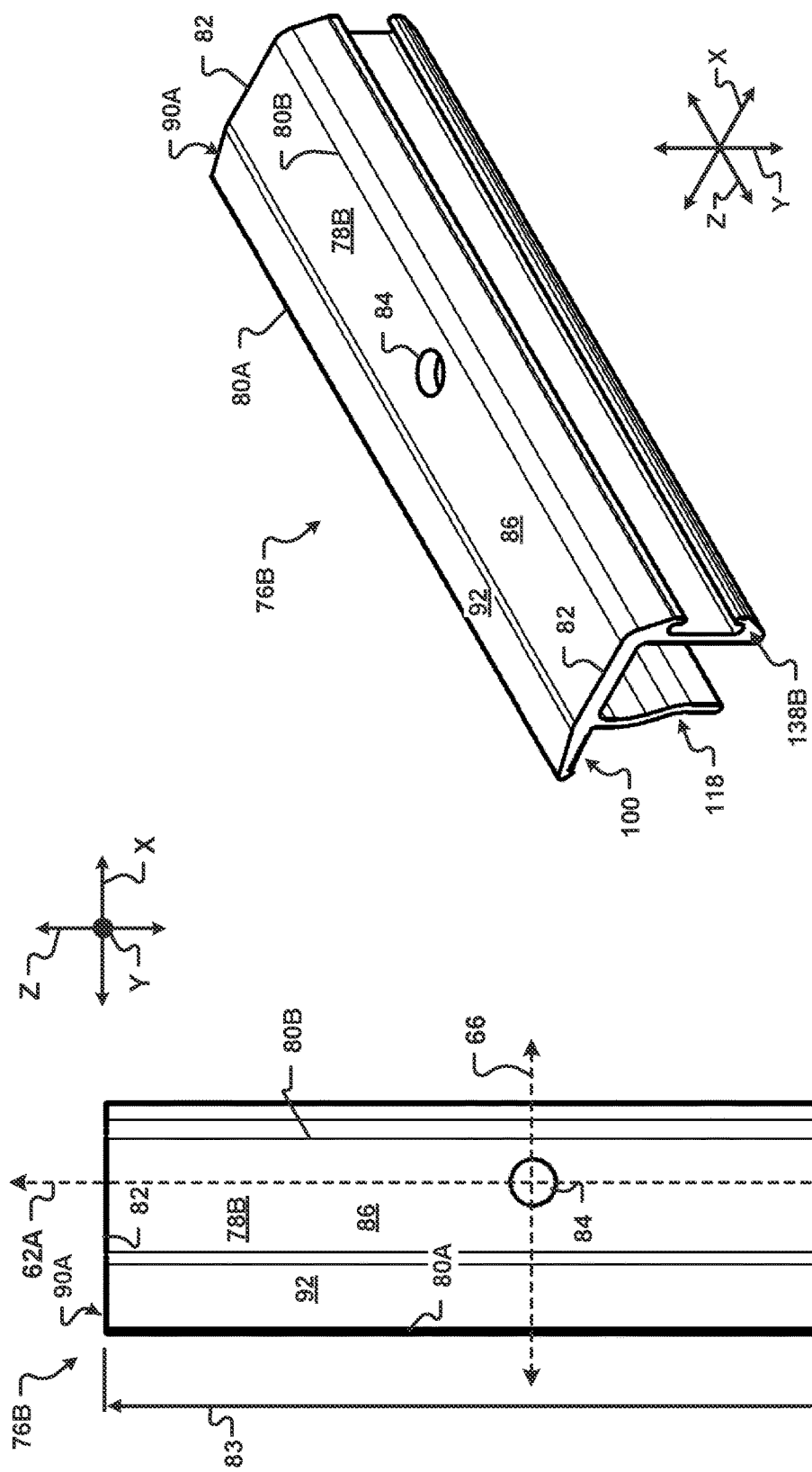

PV MODULE MOUNTING ASSEMBLY WITH CLAMP / STANDOFF ARRANGEMENT

CROSS-REFERENCE TO RELATED APPLICATIONS

This application claims priority under 35 U.S.C. § 119(e) to U.S. Provisional Patent Application Ser. No. 63/358,778 filed Jul. 6, 2022, and to U.S. Provisional Patent Application Ser. No. 63/507,814 filed Jun. 13, 2023, which are both incorporated herein in their entirety by reference.

FIELD

The present invention generally relates to installing structures on a building surface and, more particularly, to mounting devices for installing attachments, such as photovoltaic modules, on such a building surface.

BACKGROUND

Metal panels are frequently used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as photovoltaic modules, heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time and have been installed on various building roofs. A photovoltaic cell 32 is typically incorporated into a perimeter frame 18 of an appropriate material (e.g., aluminum) to define a photovoltaic module or solar cell module 16. Multiple photovoltaic modules may be installed in one or more rows (e.g., a string) on a roofing surface to define an array 14.

FIG. 1 illustrates one prior art approach that has been utilized to mount a photovoltaic module 16 to a standing seam 8. A mounting assembly 34 includes a mounting device 36, a bolt 46, and a clamping member 50. Generally, the mounting device 36 includes a slot 42 that receives at least an upper portion of a standing seam 8. A seam fastener 44 is directed through the mounting device 36 and into the slot 42 to forcibly retain the standing seam 8 therein. This then mounts the mounting device 36 to the standing seam 8.

A threaded shaft 48 of the bolt 46 passes through a hole in a base 52 of the clamping member 50, and into a threaded hole 40 on an upper surface 38 of the mounting device 36. This then mounts the clamping member 50 to the mounting device 36. The clamping member 50 is illustrated interconnecting a pair of frames 18 of two photovoltaic modules 16 with the mounting assembly 34. For this purpose, the clamping member 50 includes a pair of clamping legs 54, and each clamping leg 54 includes an engagement section 56 that is spaced from the upper surface 38 of the mounting device 36.

The bolt 46 is threaded into the mounting device 36 to engage a head of the bolt with the base 52 of the clamping member 50. Increasing the degree of threaded engagement between the bolt 46 and the mounting device 36 causes the engagement sections 56 of the clamping legs 54 to engage the corresponding solar cell module frame 18 and force the same against the upper surface 38 of the mounting device 36.

FIG. 2 illustrates a photovoltaic assembly 12 in the form of a building surface 2, a solar cell array 14 defined by a plurality of photovoltaic modules 16 (schematically shown in FIG. 2), and a plurality of mounting assemblies 34. The building surface 2 is defined by interconnecting a plurality of panels 4. Although the panels 4 may be formed from any appropriate material or combination of materials, typically they are in the form of metal panels 4. Some embodiments of metal panels are configured such that each adjacent pair of panels 4 is interconnected in a manner so as to define a standing seam 8 (schematically shown in FIG. 2). These standing seams 8 may have many different configurations, including a single fold, double fold, snap seam, snap lock, nail strip, batten cap, T-seam, and bulb seam. Some roof joints, including bulb seams, may be slidably connected to an underlying halter or clip, such that the roof joint "floats" on the underlying halter or clip. Some metal panels have ribs that extend from the panel. The ribs are positioned between seams that join the metal panel to adjacent metal panels.

A cross-sectional schematic of one of the standing seams 8 is illustrated in FIG. 3. A pair of interconnected panels 4 define a standing seam 8. A base 6 is disposed between the opposing edges 10 of each panel 4. The entirety of the base 6 may be flat or planar. However, one or more small structures may be formed/shaped into the base 6 of one or more panels 4 of the building surface 2 to address oil canning. These structures are commonly referred to as crests, minor ribs, intermediate ribs, pencil ribs, striations, fluting, or flutes.

Generally, the end or edge section 10A of one panel 4A is "nested" with the opposing end or edge section 10B of the adjacent panel 4B to define the standing seam 8. Typically, each of the two opposing edges 10 of a given panel 4 will be of a different configuration. That way, one edge 10 (one configuration) of one panel 4 will be able to "nest" with one edge 10 (another configuration) of the adjacent panel 4. Various configurations may be employed for the edges 10 of the panels 4, which may result in different configurations/profiles for the corresponding standing seam 8.

More detailed views of one of the photovoltaic modules or solar cell modules 16 from FIG. 2 is presented in FIGS. 4A and 4B. Each solar cell module or photovoltaic module 16 includes a frame 18 that is disposed about the corresponding solar cell 32. The frame 18 may be of any appropriate size, shape, configuration, and/or type, and may be formed from any appropriate material or combination of materials. In the illustrated examples, the frame 18 is of a rectangular profile, and may be formed from an appropriate metal or metal alloy (e.g., aluminum).

The frame 18 generally comprises an outer or end wall 26 with a top wall or bezel and a bottom wall 28. Some frames have a bezel 20 with a sloped or tapered surface 22. Specifically, the bezel may have a varying thickness, with a maximum thickness proximate to the end wall 26 and a minimum thickness at an inner edge 24 of the bezel. The bottom wall 28 projects inwardly (toward a center of the solar cell 32) from the end wall 26 to a free or inner end 30. Thus, the bottom wall 28 defines a flange or shelf projecting from the end wall 26 below the solar cell 32.

The photovoltaic cell or solar cell 32 may be of any appropriate size, shape, configuration and/or type to convert light into electricity. Typically, the solar cell 32 will be in the form of a substrate having a stack of a plurality of layers. Any number of photovoltaic modules 16 may be used for the solar cell array 14 of FIG. 2, and multiple photovoltaic modules 16 may be disposed in any appropriate arrangement (e.g., any appropriate number of rows and/or columns of photovoltaic modules 16).

When a photovoltaic module 16 is mounted to a building surface 2 as illustrated in FIG. 2, the photovoltaic module is susceptible to uplift due to external forces such as wind. During particularly windy conditions, the uplift from the force of wind can cause the frame 18 of the photovoltaic module 16 to bend or deform. In some situations, the frame 18 can come loose from the clamping member 50 and detach from the roof and cause damage to the roof or pose a risk to people.

One problem with known clamping members 50 is that their engagement sections 56 do not fully engage the top wall 20 of the frame 18 of the photovoltaic module 16. Referring again to FIG. 1, some photovoltaic modules 16 have a frame with a top wall 20 that is tapered toward the solar cell 32. Accordingly, there is a gap 58 between a free end of the engagement section 56 and the top wall 20 of the frame. This gap 58 limits the surface area of the frame that is engaged by the engagement section 56 and may permit unintended movement of the frame 18 relative to the mounting assembly. The limited contact between the engagement section 56 and the frame 18 limits the amount of upward or lift-off force the clamping member 50 can withstand before the photovoltaic module 16 comes free.

SUMMARY

Accordingly, there is a need for mounting assemblies and mounting systems to mount a photovoltaic module to a building surface and which has increased resistance to lift-off due to wind forces and which permits the photovoltaic module to be quickly and easily secured to a panel projection of a building surface. Further, because photovoltaic modules are produced in a variety of sizes, the mounting assemblies and mounting systems should be adjustable to engage photovoltaic modules of various sizes without the need for modification and without adding additional components to the mounting assembly.

It is one aspect of various embodiments of the present invention to provide a clamp for a mounting assembly for photovoltaic modules that more securely holds the frame of the photovoltaic modules. The shape of the portion of the frame that is engaged by the clamp can vary. In some embodiments, the clamp is configured to engage a top wall of the frame which is curved and rounded. As such, a clamping section of the clamp is more curved in some embodiments compared to known clamps. Specifically, a ledge or clamping section of the clamp is slightly curved downward to engage the upper surface of the frame. In some embodiments, the clamping section comprises a plurality of teeth with an outermost tooth comprising a maximum height that is greater than the height of other teeth of the plurality of teeth.

It is another aspect of various embodiments of the present invention to provide a clamp with a clamping section that is angled downward and that is also longer to hold the frame more securely. In some embodiments, when a threaded shaft of a clamp fastener extends through a fastener aperture in an upper wall of the clamp and engages with a threaded aperture of a stanchion, a bent sidewall of the clamp is kicked outwardly, which causes the clamping section to rotate upward slightly. This rotation can cause the clamping section to not hold the PV frame as securely. Thus, the downward angle of the clamping section and the longer length of the clamping section more securely holds the PV frame even with some rotation.

It is one aspect of the present disclosure to provide a mounting system to secure a photovoltaic module to a building surface. The mounting system comprises: (1) a clamp, comprising: (a) an upper wall comprising a fastener aperture, a first long edge on a first side of the fastener aperture, and a second long edge approximately parallel to the first long edge and on a second side of the fastener aperture; (b) a first sidewall extending from a lower surface of the upper wall, the first sidewall spaced from the first long edge to form a first clamping section configured to engage the photovoltaic module, the first clamping section comprising a lower clamp surface; (c) a plurality of teeth formed in the lower clamp surface, wherein the teeth increase in size from an inner portion of the lower clamp surface proximate to the first sidewall to a distal end of the lower clamp surface such that an innermost tooth has a minimum height measured in a vertical dimension and an outermost tooth has a maximum height measured in the vertical dimension, the maximum height being greater than the minimum height; and (d) a second sidewall extending from the lower surface of the upper wall, the first and second sidewalls defining a stanchion receptacle therebetween; (2) a stanchion comprising a body, a first threaded shaft extending from a first end of the body, and a first threaded hole extending through a second end of the body the first end of the body being opposite the second end of the body; (3) a base plate, comprising: (a) a body with a first narrow end and a second narrow end opposite to the first narrow end; (b) a first surface of the body; (c) a second surface of the body opposite to the first surface, the first and second surfaces extending in a longitudinal dimension from the first narrow end to the second narrow end; (d) a first flange and a second flange extending from the first surface between the first and second narrow ends, the first flange comprising a first inner surface facing a second inner surface of the second flange, the first inner surface being separated from the second inner surface by a first interior width measured in a lateral dimension that is orthogonal to the longitudinal dimension; € a third flange and a fourth flange extending from the second surface between the first and second narrow ends, the third flange comprising a third inner surface facing a fourth inner surface of the fourth flange, the third inner surface being separated from the fourth inner surface by a second interior width measured in the lateral dimension that is greater than the first interior width; and (f) a plate aperture extending through the first and second surfaces, the plate aperture comprising a diameter sufficient to receive the first threaded shaft of the stanchion; (4) a mounting device comprising a second hole configured to receive the first threaded shaft of the stanchion to releasably secure the base plate between the stanchion and the mounting device, the mounting device configured to engage a projection extending from the building surface; and (5) a clamping fastener comprising a second threaded shaft configured to threadably engage the first threaded hole of the stanchion, wherein the fastener aperture of the clamp and the first threaded hole of the stanchion are configured to receive the second threaded shaft of the clamping fastener to selectively secure the clamp to the stanchion with at least a portion of the stanchion body extending into the stanchion receptacle.

In some embodiments, the mounting system may further comprise a mounting plate comprising a top surface oriented toward the clamp, at least a portion of the top surface configured to support the photovoltaic module, a bottom surface opposite the top surface and oriented toward the base plate, and a mounting aperture with a diameter sufficient to receive the first threaded shaft of the stanchion, the mounting plate adapted to be positioned between the stanchion and the base plate when the mounting system is in a position of use.

The mounting system may include the previous embodiment and optionally: (i) the upper wall of the clamp has a first length measured in the longitudinal dimension; (ii) the first and second surfaces of the base plate each have a second length measured in the longitudinal dimension; and (iii) the second length is approximately equal to the first length.

The mounting system optionally includes one or more of the previous embodiments, and a horizontal reference plane contacting a distal point of the innermost tooth extends through the outermost tooth proximate to a base of the outermost tooth, the horizontal reference plane extending in the longitudinal dimension and the lateral dimension.

In some embodiments, the mounting system includes any one or more of the previous embodiments, and optionally the third flange is offset in the lateral dimension from the first flange such that a vertical reference plane defined by the third inner surface does not intersect the first flange, the vertical reference plane extending in the longitudinal dimension and the vertical dimension.

Optionally, the vertical reference plane defined by the third inner surface does not intersect the first surface of the base plate.

The mounting system optionally includes any one or more of the previous embodiments, and the base plate further comprises serrations formed on one or more of the first inner surface of the first flange, the second inner surface of the second flange, the third inner surface of the third flange, and the fourth inner surface of the fourth flange.

The mounting system may include one or more of the previous embodiments, and optionally serrations formed on the inner surface of the first flange extend in the longitudinal dimension and are oriented approximately parallel to the first surface.

In some embodiments, when the mounting system is assembled, the innermost tooth of the clamp is spaced from the first surface of the base plate by a first magnitude measured in the vertical dimension and the outermost tooth is spaced from the first surface of the base plate by a second magnitude measured in the vertical dimension that is less than the first magnitude.

The mounting system optionally includes one or more of the previous embodiments, and: (i) the first sidewall of the clamp has a first inner surface; (ii) the second sidewall of the clamp has a second inner surface; and (iii) a portion of the first inner surface is spaced from a portion of the second inner surface by a first inner distance approximately equal to a width of the stanchion body such that at least a portion of at least one of the first and second inner surfaces contacts at least a portion of the stanchion body when the stanchion is positioned within the stanchion receptacle.

In some embodiments, the mounting plate comprises an annular projection with a first outer diameter, the first sidewall of the clamp has a first outer surface with a first upper section proximate to the lower surface of the upper wall, and the second sidewall of the clamp has a second outer surface with a second upper section proximate to the lower surface of the upper wall, the second outer surface spaced from the first outer surface by a first outer distance that is approximately equal to the first outer diameter of the annular projection such that at least a portion of the annular projection and the first outer surface are engageable with the photovoltaic module when it is engaged by the first clamping section when the mounting system is assembled.

The mounting system may optionally include any one or more of the previous embodiments, and optionally the first threaded shaft of the stanchion has a shaft diameter and the body of the stanchion has a body diameter that is greater than the shaft diameter.

Optionally, the mounting system includes one or more of the previous embodiments, and the lower clamp surface of the first clamping section is adapted to engage a curved surface of a frame of the photovoltaic module.

In one or more embodiments, the lower clamp surface of the first clamping section further comprises a flat portion positioned between the innermost tooth of the teeth and the first sidewall.

Optionally, the innermost tooth is spaced from an exterior surface of the first sidewall by a predetermined distance.

In some embodiments, the second sidewall is spaced from the second long edge to form a second clamping section.

The mounting system may include one or more of the previous embodiments, and optionally teeth are formed in a lower clamp surface of the second clamping section.

The mounting system may optionally include one or more of the previous embodiments, and: (a) in a first configuration of the mounting system to engage a first photovoltaic module of a first size, the first surface of the base plate is oriented toward the clamp such that the second surface of the base plate is facing the mounting device; and (b) in a second configuration of the mounting system to engage a second photovoltaic module of a second size that is different than the first size, the second surface of the base plate is oriented toward the clamp such that the first surface of the base plate is facing the mounting device.

Another aspect of the present disclosure is a clamp for a mounting system to secure a photovoltaic module to a building surface, comprising: (1) an upper wall comprising a fastener aperture, a first long edge on one side of the fastener aperture, and a second long edge approximately parallel to the first long edge on an opposite side of the fastener aperture, the first and second long edges extending in a longitudinal dimension; (2) a first sidewall extending from a lower surface of the upper wall, the first sidewall positioned between the fastener aperture and the first long edge to form a first clamping section configured to engage the photovoltaic module, the first clamping section comprising a lower clamp surface; (3) a plurality of teeth formed in the lower clamp surface, wherein the teeth increase in size from an inner portion of the lower clamp surface proximate to the first sidewall to a distal end of the lower clamp surface such that: (a) an innermost tooth has a minimum height measured in a vertical dimension between a base and a distal point of the innermost tooth, the vertical dimension being perpendicular to the longitudinal dimension; and (b) an outermost tooth has a maximum height measured in the vertical dimension, the maximum height being greater than the minimum height; and (4) a second sidewall extending from the lower surface of the upper wall, the first and second sidewalls defining a stanchion receptacle therebetween;

The upper wall of the clamp optionally intersects a vertical reference plane, the vertical reference plane intersecting an axis of the fastener aperture and extending in the vertical dimension and the longitudinal dimension, and no other portion of the clamp intersects the vertical reference plane. In at least some embodiments, the first long edge and the second long edge are approximately parallel to the vertical reference plane.

The clamp may include the previous embodiment, and optionally no apertures are formed through the first sidewall or the second sidewall.

The clamp optionally includes one or more of the previous embodiments, and optionally the fastener aperture extends through a planar surface of the upper wall, and a horizontal reference plane defined by the planar surface does not intersect the first sidewall or the second sidewall, the horizontal reference plane extending in the longitudinal dimension and a lateral dimension perpendicular to the longitudinal dimension.

Optionally, a horizontal reference plane contacting the distal point of the innermost tooth extends through the outermost tooth, the horizontal reference plane extending in the longitudinal dimension and a lateral dimension perpendicular to the longitudinal dimension.

The clamp optionally includes one or more of the previous embodiments, and in some embodiments the fastener aperture is circular and unthreaded.

The clamp may include any one or more of the previous embodiments, and optionally the fastener aperture is the only aperture through the upper wall.

Yet another aspect of the present disclosure is to provide a base plate for a mounting system to secure a photovoltaic module to a building surface. The base plate generally comprises: (1) a body with a first narrow end and a second narrow end opposite to the first narrow end; (2) a first surface of the body; (3) a second surface of the body opposite to the first surface, the first and second surfaces extending in a longitudinal dimension from the first narrow end to the second narrow end; (4) a first flange and a second flange extending from the first surface between the first and second narrow ends, the first flange comprising a first inner surface facing a second inner surface of the second flange, wherein the first inner surface is separated from the second inner surface by a first interior width measured in a lateral dimension that is orthogonal to the longitudinal dimension; (5) a third flange and a fourth flange extending from the second surface between the first and second narrow ends, the third flange comprising a third inner surface facing a fourth inner surface of the fourth flange, wherein the third inner surface is separated from the fourth inner surface by a second interior width measured in the lateral dimension that is greater than the first interior width, and wherein a portion of one or more of the first inner surface, the second inner surface, the third inner surface, and the fourth inner surface comprises serrations; and (6) a plate aperture extending through the first and second surfaces.

In some embodiments, the third flange is offset in the lateral dimension from the first flange such that a first vertical reference plane defined by the third inner surface does not intersect the first flange, the first vertical reference plane extending in the longitudinal dimension and the vertical dimension.

Optionally, the fourth flange is offset in the lateral dimension from the second flange such that a second vertical reference plane defined by the fourth inner surface does not intersect the second flange, the second vertical reference plane extending in the longitudinal dimension and the vertical dimension.

The base plate may include any one or more of the previous embodiments, and optionally the first and second flanges are positioned between the first and second vertical reference planes.

The base plate may include one or more of the previous embodiments, and optionally the first vertical reference plane defined by the third inner surface does not intersect the first surface of the body. Additionally, or alternatively, the second vertical reference plane defined by the fourth inner surface does not intersect the first surface of the body.

In some embodiments, serrations formed on the first inner surface of the first flange extend in the longitudinal dimension and are oriented approximately parallel to the first surface.

The base plate may comprise any one or more of the previous embodiments, and optionally: (i) in a first configuration of the mounting system to engage a first photovoltaic module of a first size, the first surface of the base plate is oriented away from the building surface with a bottom wall of the first photovoltaic module positioned between the first and second flanges; and (ii) in a second configuration of the mounting system to engage a second photovoltaic module of a second size that is greater than the first size, the second surface of the base plate is oriented away from the building surface with a bottom wall of the second photovoltaic module positioned between the third and fourth flanges.

The base plate may include any one or more of the previous embodiments, and the base plate may be formed of a single piece of extruded metal.

In some embodiments, the first flange extends continuously for an entire length of the base plate from the first narrow end to the second narrow end.

The base plate may include any one or more of the previous embodiments, and optionally the first inner surface of the first flange, the second inner surface of the second flange, the third inner surface of the third flange, and the fourth inner surface of the fourth flange are oriented approximately parallel to one another.

Optionally the base plate includes one or more of the previous embodiments, and the first surface is substantially planar between the first and second narrow ends and between the first and second inner surfaces.

The base plate may include any one or more of the previous embodiments, and optionally the plate aperture is circular and unthreaded.

The base plate optionally includes any one or more of the previous embodiments, and in some embodiments the fastener aperture is the only aperture that extends through the first and second surfaces.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". When used with a number or a range, the terms "about" and "approximately" indicate the number or range may be "a little above" or "a little below" the endpoint with a degree of flexibility as would be generally recognized by those skilled in the art. Further, the terms "about" and "approximately" may include the exact endpoint, unless specifically stated otherwise. Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus to 5° unless otherwise indicated. Similarly, the term "perpendicular" or "orthogonal" means two objects are oriented at angle of from 85° to 95° unless otherwise indicated.

Unless otherwise indicated, the term "substantially" indicates a difference of from 0% to 5% of the stated value is acceptable.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

These and other advantages will be apparent from the disclosure of the invention(s) contained herein. The above-described embodiments, objectives, and configurations are neither complete nor exhaustive. The Summary is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary as well as in the attached drawings and the Detailed Description and no limitation as to the scope of the present invention is intended by either the inclusion or non-inclusion of elements, components, etc. in this Summary. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

FIG. 8B is a top plan view of the clamp of FIG. 8A;

FIG. 8C is a top front perspective view of the clamp of FIG. 8A;

FIG. 9A is a front perspective view of a stanchion of the mounting assembly of FIG. 5A according to embodiments of the present disclosure;

FIG. 9B is a front cross-sectional elevation view of the stanchion of FIG. 9A;

FIG. 9C is a front elevation view of the stanchion of FIG. 9A;

FIG. 11B is a top plan view of the base plate of FIG. 11A with a first surface facing upwardly;

FIG. 11C is a top perspective view of the base plate of FIG. 11B with the first surface facing upwardly;

FIG. 11D is a top plan view of the base plate of FIG. 11A with a second surface facing upwardly;

FIG. 11E is a top perspective view of the base plate of FIG. 11A with the second surface facing upwardly;

FIG. 14B is a top plan view of the edge-grab clamp of FIG. 14A; and

FIG. 14C is a top front perspective view of the edge-grab clamp of FIG. 14A.

Figure 1:
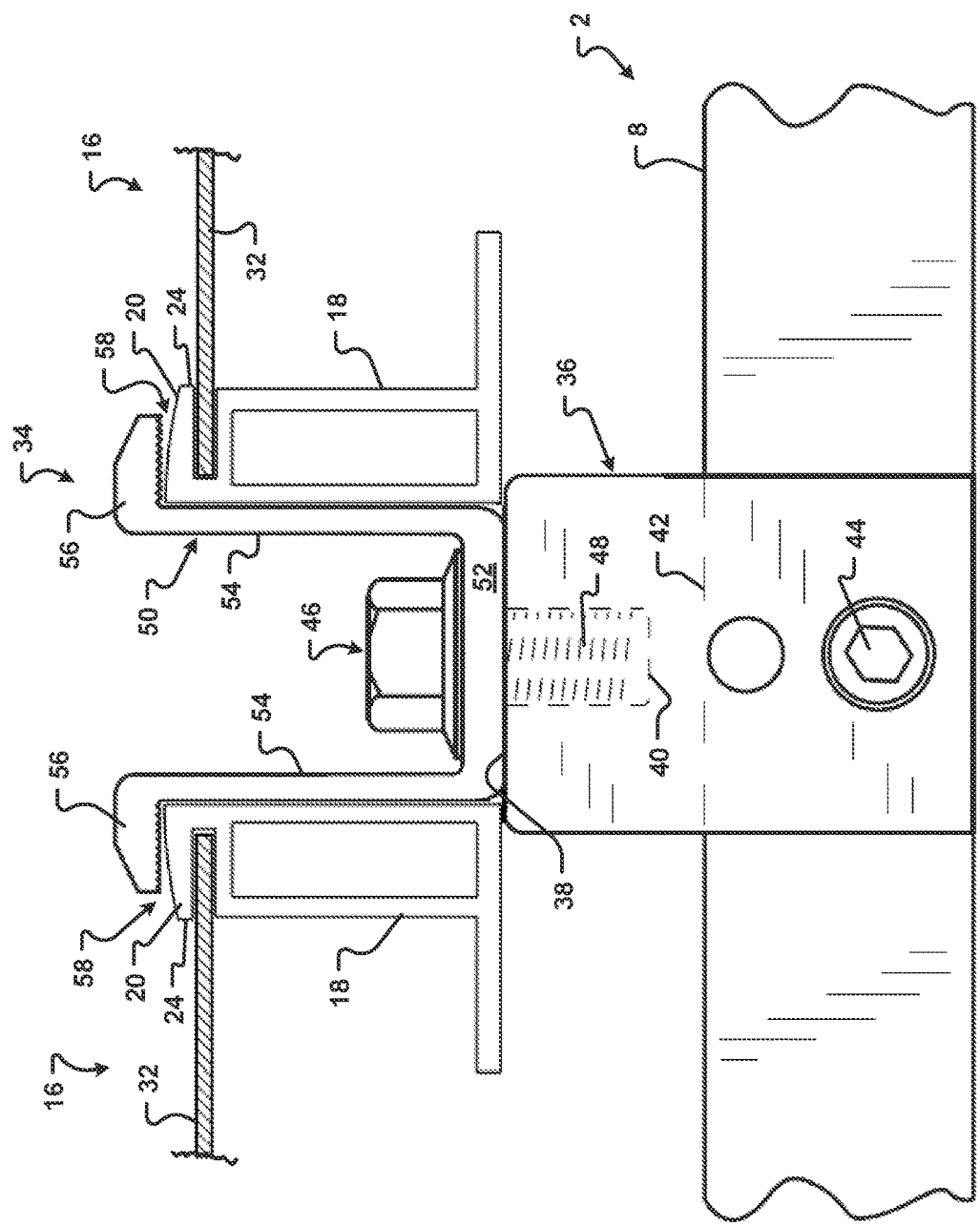
FIG. 1 is a front elevation view of a prior art mounting assembly for interconnecting photovoltaic modules to a standing seam of a building surface.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

In the following description of various embodiments, components of mounting devices and assemblies of different embodiments are identified by the same reference numbers. Those corresponding components between two embodiments that are different in at least some respect are identified by the same reference number, but may include suffix such as a letter.

The following is a listing of components according to various embodiments of the present disclosure, and as shown in the drawings:

| Number | Component |
|---|---|
| 2 | Building Surface |
| 4 | Panels |
| 6 | Base |
| 8 | Standing seam (or rib, or projection) |
| 10A | Edge section of first panel |
| 10B | Edge section of second panel |
| 12 | Photovoltaic Assembly |
| 14 | Solar cell array |
| 16 | Solar cell module (Photovoltaic module) |
| 18 | Frame |
| 20 | Bezel (or Top Wall) |
| 22 | Tapered surface |
| 24 | Inner edge of bezel |
| 26 | End wall |
| 28 | Bottom wall |
| 30 | Inner end |
| 32 | Solar cell |
| 34 | Mounting assembly |
| 36 | Mounting device |
| 38 | Upper surface |
| 40 | Threaded hole |
| 42 | Slot |
| 44 | Seam fastener |
| 46 | Bolt |
| 48 | Threaded shaft |
| 50 | Clamping member |
| 52 | Base |
| 54 | Clamping legs |
| 56 | Engagement section |
| 58 | Gap |
| 60 | Mounting assembly (or mounting system) |
| 62 | Vertical reference plane |
| 64 | Horizontal reference plane |
| 66 | Transverse reference plane |
| 68 | Clamp fastener |
| 70 | Head |
| 72 | Threaded shaft |
| 74 | Rotational axis |
| 76 | Clamp |
| 76A | Mid-grab clamp |
| 76B | Edge-grab clamp |
| 78 | Upper wall |
| 80 | Long edges |
| 82 | Ends |
| 83 | Length of clamp |
| 84 | Fastener aperture |
| 86 | Upper surface |
| 88 | Lower surface |
| 90 | Clamping section |
| 90A | First clamping section |
| 90B | Second clamping section |
| 92 | Upper clamp surface |
| 94 | Lower clamp surface of clamping section |
| 96 | Flat portion of lower clamp surface |
| 98 | Distal end of lower clamp surface |
| 100 | Teeth |
| 102 | Base of tooth |
| 104 | Distal point of tooth |
| 106 | Innermost tooth |
| 108 | Minimum height |
| 110 | Intermediate teeth |
| 112 | Outermost tooth |
| 114 | Maximum height |
| 116 | Clamp width |
| 118 | First sidewall |
| 120 | First upper section |
| 122 | First curve |
| 124 | First intermediate section |
| 126 | Second curve |
| 128 | First lower section |
| 130 | First free end |
| 132 | First outer surface |
| 134 | First inner surface |
| 138 | Second sidewall |
| 140 | Second upper section |
| 142 | Third curve |
| 144 | Second intermediate section |
| 146 | Fourth curve |
| 148 | Second lower section |

| Number | Component |
|---|---|
| 150 | Second free end |
| 152 | Second outer surface |
| 154 | Second inner surface |
| 156 | Outer perimeter |
| 158 | Side slot |
| 160 | Channel |
| 162 | Channel base |
| 164 | Lips |
| 166 | Stanchion receptacle |
| 168 | Minimum width of stanchion receptacle |
| 170 | Stanchion |
| 172 | Body |
| 174 | Sidewall |
| 176 | Flats |
| 178 | First end of Body |
| 180 | Beveled portion |
| 182 | Threaded shaft |
| 184 | First end of stanchion |
| 186 | Second end of stanchion |
| 188 | Threaded aperture |
| 190 | Mounting plate |
| 192 | Upper surface |
| 194 | First (or inner) annular projection |
| 196 | Receptacle base |
| 198 | Second (or outer) annular projection |
| 200 | Lower surface |
| 202 | Ribs |
| 204 | Mounting aperture |
| 206 | Outer perimeter |
| 208 | Outer annulus |
| 210 | Bonding projections |
| 212 | Base plate |
| 213 | Body |
| 214 | Narrow ends |
| 215 | Length of base plate |
| 216 | Plate aperture |
| 218 | First surface |
| 220 | First flange |
| 222 | First inner surface |
| 224 | First serrations or ridges |
| 226 | Second flange |
| 228 | Second inner surface |
| 230 | Second serrations or ridges |
| 232 | First interior width |
| 234 | Second surface |
| 236 | Third flange |
| 238 | Third inner surface |
| 240 | Third serrations or ridges |
| 242 | Fourth flange |
| 244 | Fourth inner surface |
| 246 | Fourth serrations or ridges |
| 248 | Second interior width |
| 249 | Distance between flange and standing seam |
| 250 | Mounting device (or seam clamp, or bracket) |
| 252 | Upper surface |
| 254 | Upper hole |
| 256 | Bottom surface |
| 258 | Side surfaces |
| 260 | Side hole |
| 262 | Ends |
| 264 | Slot |
| 266 | Seam fastener |
| R1 | Radius between a sidewall and a lower clamp surface |
| R2 | Radius of curvature second most outer tooth |
| R3 | Radius of curvature of outermost tooth |
| X | Lateral dimension |
| Y | Vertical dimension |
| Z | Longitudinal (or extrusion) dimension |

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 2:
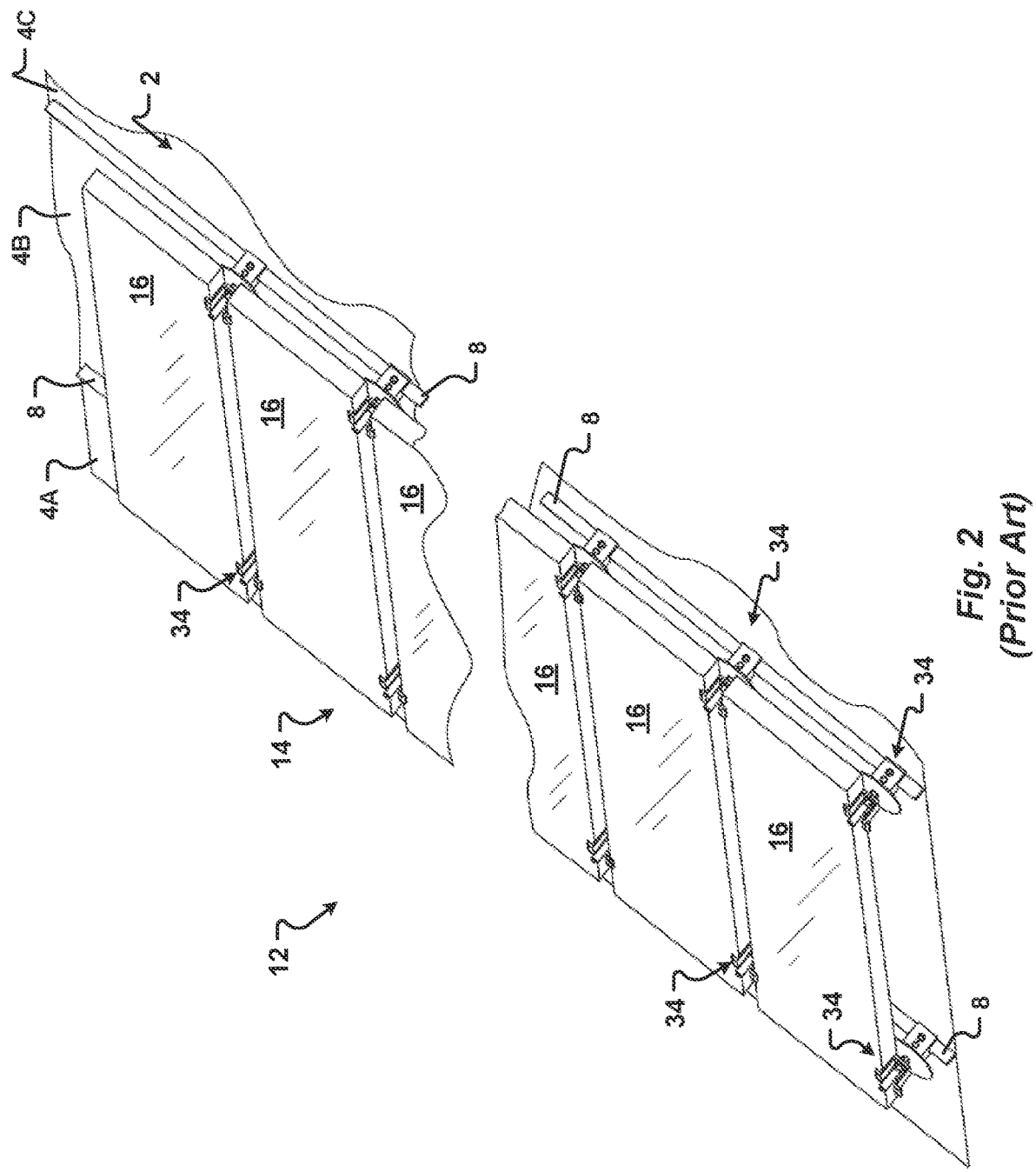
FIG. 2 is a perspective view of a plurality of photovoltaic modules installed on a building surface using a plurality of prior art mounting assemblies.

Referring now to FIGS. 5A-12B, a mounting system (or mounting assembly) 60A according to embodiments of the present disclosure is generally illustrated. The mounting assembly 60A generally comprises a clamp fastener 68, a clamp 76A, a "standoff" or stanchion 170, a base plate 212, a mounting device 250, and optionally a mounting plate 190. The mounting assembly 60, more specifically the clamp 76A, is adapted to engage two photovoltaic modules 16 of a photovoltaic module array (e.g., solar module array 14 shown in FIG. 2) of any appropriate size and/or configuration, where rows of photovoltaic modules are typically disposed perpendicular to the pitch of a sloped roofing surface and where columns of photovoltaic modules are typically disposed along the pitch of such a sloped roofing surface. Typically the clamp 76A of the mounting assembly 60A will engage two photovoltaic modules 16 that the clamp is disposed between, and thus the clamp 76A may also be referred to as a "mid-grab" clamp or configured for a mid-grab application. Specifically, the clamp 76A is configured to simultaneously engage a pair of adjacently positioned photovoltaic modules 16.

Figure 12A:
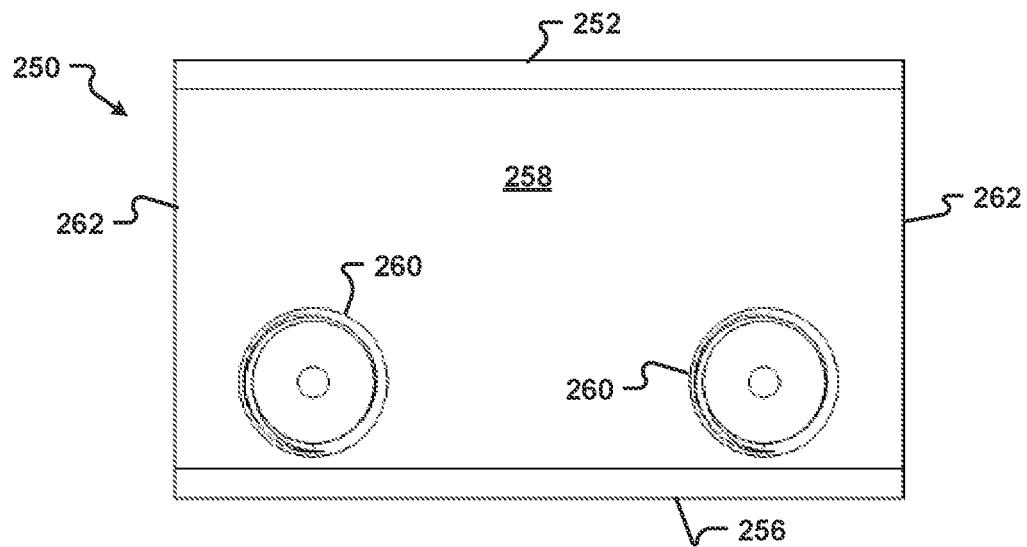
FIG. 12A is a side elevation view of a mounting device of the mounting assembly of FIG. 5A according to embodiments of the present disclosure.
Figure 12B:
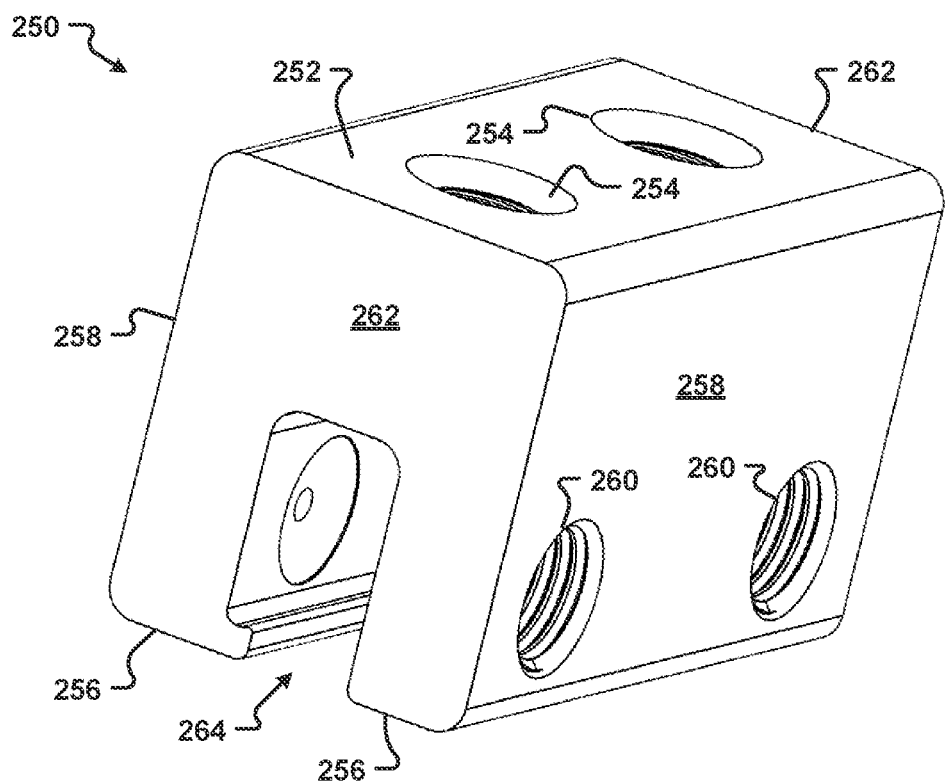
FIG. 12B is a front perspective view of the mounting device of FIG. 12A.

Referring to FIGS. 12A-12B, the mounting device 250 is attachable to a building surface of any appropriate type, and as such the mounting device 250 may be of any appropriate configuration for a particular application/building surface configuration. The illustrated mounting device 250 is adapted for installation on a projection 8 extending from a building surface 2. The mounting device 250 may be configured to engage a variety of different projections 8, including a standing seam 8 defined by a pair of interconnected panels that are part of such a building surface 2. As such, the mounting device 250 is least generally in accordance with the mounting device 36 discussed above in relation to FIG. 1.

The mounting device 250 includes an upper surface 252, an oppositely disposed bottom surface 256, a pair of laterally spaced side surfaces 258, and a pair of ends 262. The ends 262 for the mounting device 250 will be spaced along a standing seam 8 when the mounting device 250 is in an installed configuration.

One or more side holes 260 will extend between one or more of the side surfaces 258 and a slot 264 that is incorporated through the bottom surface 256 and that extends between the two ends 262 of the mounting device 250. A seam fastener 266 may be engaged with the mounting device 250 (e.g., FIG. 5A), via a corresponding side hole 260, to secure a standing seam or other projection 8 within the slot 264.

In some embodiments, the side holes 260 are threaded. In these embodiments, the seam fastener 266 presses against the standing seam 8 without penetrating the building surface.

Alternatively, the side holes 260 are unthreaded. For these embodiments, the seam fastener 266 is configured to penetrate the building surface to secure the mounting device 250 to the building surface.

The upper surface 252 of the mounting device 250 also may include an upper hole 254. The upper hole 254 is configured for detachably connecting the mounting device 250 with the threaded shaft 182 of the stanchion 170.

In some embodiments, the upper hole 254 is threaded. Alternatively, the upper hole 254 is unthreaded, and the threaded shaft 182 of the stanchion 170 extends through the unthreaded upper hole and is secured to the mounting device 250 by a nut.

The mounting assemblies 60A, 60B of the present disclosure may be secured to various mounting devices 250 configured to engage a building surface 2 with a standing seam 8 (or other projection, seam, or rib) of any shape or size. Other mounting devices 250 that may be used with the mounting assemblies 60 of the present disclosure are described in U.S. Pat. Nos. 8,833,714, 9,085,900, 9,611,652, 10,443,896, 10,634,175, 10,948,002, 11,352,793, and U.S. Patent Publication 2022/001082 which are each incorporated herein in their entirety.

Details of the optional mounting plate 190 are described in conjunction with FIGS. The mounting plate 190 includes an upper surface 192 and an oppositely disposed lower surface 200. The lower surface 200 of the mounting plate 190 is oriented toward the upper surface 252 of the mounting device 250 when the mounting assemblies 60 of the present disclosure are in an installed configuration.

In some embodiments, an outer perimeter 206 for the mounting plate 190 extends beyond a perimeter of the upper surface 252 of the mounting device 250 in the installed configuration. Stated another way, the surface area defined by the outer perimeter 206 of the mounting plate 190 is larger than a surface area of the upper surface 252 of the mounting device 250 in at least one embodiment. A portion of a photovoltaic module 16 being engaged by a mounting assembly 60 of the present disclosure may thereby be positioned on a portion of the mounting plate 190 that is not directly supported by an underlying portion of the mounting device 250. Although the outer perimeter 206 is circular for the illustrated embodiment, other configurations may be appropriate.

The upper surface 192 of the mounting plate 190 optionally includes one or more of a first or inner annular projection 194 and a second or outer annular projection 198. In some embodiments, a circular configuration is used for each of the inner annular projection 194 and the outer annular projection 198, although other configurations may be appropriate.

A plurality of ribs 202 may optionally extend from the inner annular projection 194 to the outer annular projection 198. These ribs 202 are optionally radially spaced about a mounting aperture 204 that extends through the mounting plate 190 (e.g., the ribs 202 are in a spoked or spoke-like configuration on the upper surface 192 and each rib 202 may be characterized as extending along a separate radius relative to a center of the mounting plate 190). Although the ribs 202 are shown as being equally spaced in the radial dimension (e.g., about the mounting aperture 204), other configurations may be appropriate. When present, the ribs beneficially stiffen the mounting plate 190.

The mounting aperture 204 (which in some embodiments defines a center of the mounting plate 190 relative to its outer perimeter 206), the inner annular projection 194, and the outer annular projection 198 are concentrically disposed relative to each other in the illustrated embodiment. Accordingly, in some embodiments, the inner annular projection 194 is disposed radially outwardly of the mounting aperture 204, and the outer annular projection 198 is disposed radially outwardly of the inner annular projection 194.

The inner annular projection 194 optionally protrudes further in the vertical dimension Y than the outer annular projection 198 relative to the upper surface 192 of the outer annulus 208 (e.g., an upper surface of the inner annular projection 194 may be disposed at a higher elevation than an upper surface of the outer annular projection 198 when the mounting plate 190 is horizontally disposed and with its upper surface 192 projecting upwardly (in the vertical dimension Y)). In some embodiments, an upper surface of the ribs 202 and the upper surface of the outer annular projection 198 are disposed at a common elevation.

A receptacle base 196 is disposed radially inwardly of the inner annular projection 194 and is recessed relative to the upper surface of the inner annular projection 194 (e.g., the upper surface of the inner annular projection 194 is disposed at a higher elevation in the vertical dimension Y than the receptacle base 196 when the mounting plate 190 is horizontally disposed and with its upper surface 192 projecting upwardly). The recessed receptacle base 196 allows the stanchion 170 to be received therein, such that the threaded shaft 182 of the stanchion 170 can be shorter than would otherwise be required, resulting in material savings.

The mounting aperture 204 extends through this receptacle base 196 and is not threaded. The unthreaded mounting aperture 204 is beneficial to allow the threaded shaft 182 of the stanchion 170 to rotate without rotating the mounting plate 190.

The mounting aperture 204 may have any diameter sufficient to receive the threaded shaft 182 of the stanchion 170. In some embodiments, the diameter of the mounting aperture 204 is between about 0.33 inches and about 0.36 inches, or about 0.34 inches.

Figure 6A:
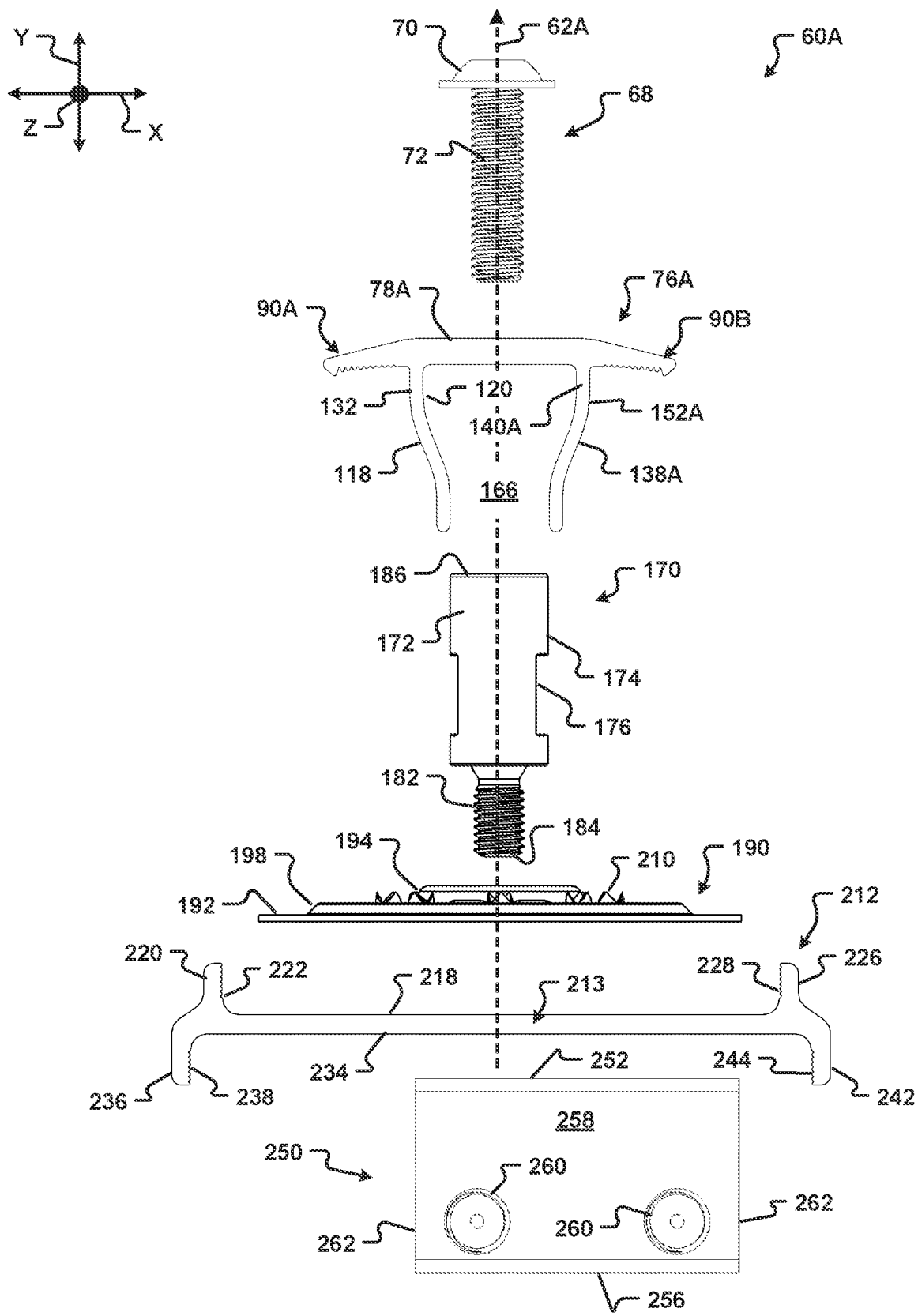
FIG. 6A is an exploded front elevation view of the mounting assembly of FIG. 5A.
Figure 7A:
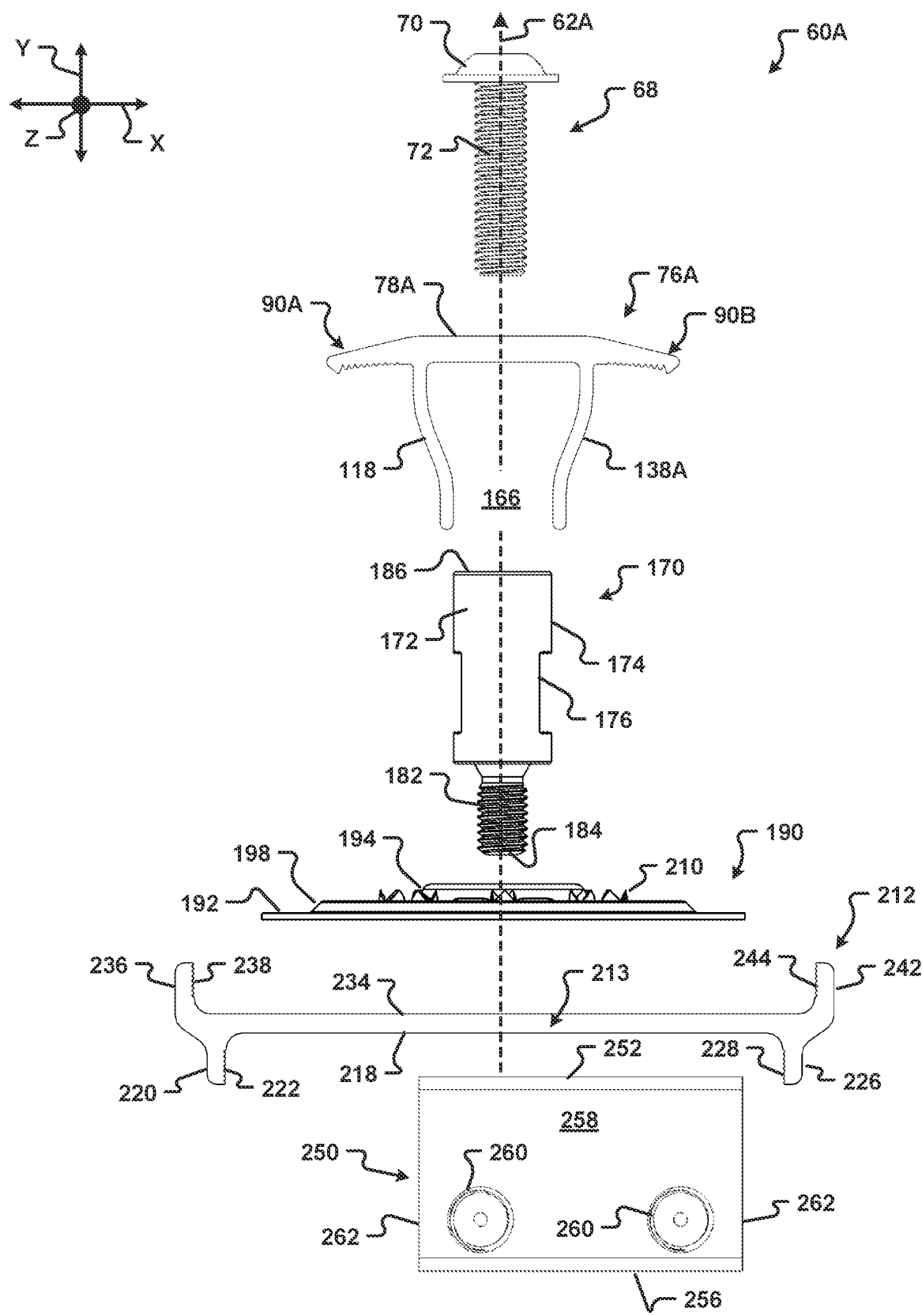
FIG. 7A is another exploded front elevation view of the mounting assembly of FIG. 5A and illustrating the mounting assembly in a second configuration.

In some embodiments, a plurality of electrical contacts, bonding spikes, or bonding projections 210 are incorporated by the upper surface 192 of the mounting plate 190. Optionally, one bonding projection 210 is disposed between each adjacent pair of ribs 202 and each bonding spike or projection 210 protrudes further in the vertical dimension Y than its corresponding pair of ribs 202 (e.g., an uppermost portion of each bonding projection 210 is disposed at a higher elevation in the vertical dimension Y than an uppermost surface of its corresponding adjacent pair of ribs 202 when the mounting plate 190 is horizontally disposed and with its upper surface 192 projecting upwardly as generally illustrated in FIGS. 6A, 7A). When a photovoltaic module is positioned on at portion of the upper surface 192 of the mounting plate 190, at least one of the bonding projections 210 should engage such a photovoltaic module so as to be electrically connected therewith. The mounting plate 190 accommodates having two photovoltaic modules 16 positioned thereon and in opposing relation to one another, with each such photovoltaic module being engaged by at least one bonding projection 210 and with the inner annular projection 194 of the mounting plate being disposed between these two photovoltaic modules.

The bonding projections 210 facilitate establishing an electrical connection with a photovoltaic module 16 when it is positioned on the upper surface 192 of the mounting plate 190 (e.g., by engaging a frame 18 or frame section of such a photovoltaic module, and which may require that one or more bonding projections 210 pierce or penetrate a surface or surface coating of this frame/frame section). Each bonding projection 210 optionally utilizes a plurality of upwardly projecting teeth for engaging a corresponding/overlying photovoltaic module. Other configurations may be appropriate for the bonding projections 210. Use of more substantial bonding projections 210 (e.g. with a larger cross-section, greater height, and/or multiple points per spike) beneficially increases the ability of the bonding projections 210 to continue to function for their intended purpose during a plurality of photovoltaic module installation cycles. In other words, if a photovoltaic module is installed on a mounting plate 190, then removed, the bonding projections 210 will still function for their intended purpose upon reinstallation of the photovoltaic module or installation of another photovoltaic module thereon.

An outer annulus 208 of the mounting plate 190 is recessed relative to the upper surface of the inner annular projection 194, the upper surface of the ribs 202, and the upper surface of the outer annular projection 198. In some embodiments, the upper surface of the outer annulus 208 is co-planar with the upper surface of the receptacle base 196. Optionally, the upper surface of the inner annular projection 194, the upper surface of the ribs 202, and the upper surface of the outer annular projection 198 are all disposed at a higher elevation than the outer annulus 208 when the mounting plate 190 is horizontally disposed and with its upper surface 192 projecting upwardly.

A fastening assembly for the mounting assembly 60 includes the stanchion 170 and the clamp fastener 68. Generally, the stanchion 170 is detachably connected with the mounting device 250. The clamp fastener 68 engages the clamp 76 and is detachably connected with the stanchion 170 in order to move the clamp 76 relative to the stanchion 170 to clamp a photovoltaic module 16 between the clamp 76 and the mounting plate 190.

Referring to FIGS. 9A-9C, the stanchion 170 for the mounting assembly 60 comprises a body 172 and a threaded shaft 182 that extends from a first end 178 of the body 172. In at least one embodiment, the body 172 has a width or diameter measured in the lateral dimension X that is greater than a diameter of the threaded shaft 182.

A free end of the threaded shaft 182 defines a first end 184 of the stanchion 170. A threaded aperture 188 is on a second end 186 of the stanchion 170 (which also coincides with a second end of the body 172). The spacing between the ends 184, 186 of the stanchion 170 define a length of the stanchion.

In some embodiments, the body 172 includes a sidewall 174 that is cylindrical. However, other shapes of the sidewall 174 are contemplated. In other embodiments, the sidewall 174 has a square cross-section taken along a horizontal reference plane defined by the lateral dimension X and the longitudinal dimension Z.

In at least some embodiments, the body 172 does not have external threads. For example, the body 172 may be formed without projections (e.g., smooth) to facilitate movement of inner surfaces of clamp sidewalls 130, 150A relative to the stanchion 170. Accordingly, in some embodiments, the width of the body 172 measured in the lateral dimension X is substantially constant from the first end 178 of the body to the second end of the stanchion 186.

Optionally the body 172 may include at least one pair of flats 176 that are preferably disposed in opposing relation to one another. The flats 176 are configured to be utilized to rotate the stanchion 170 relative to the mounting device 250 in at least certain instances (such as by engaging the flats 176 with a wrench or other appropriate tool).

In some embodiments, the first end 178 of the body 172 includes a beveled portion 180 positioned between the body and the threaded shaft 182. When the optional beveled portion 180 is present, it beneficially ensures that the optional mounting plate 190 is centered on the threaded shaft 182. More specifically, when the beveled portion 180 is between the threaded shaft 182 and the body first end 178, it prevents the mounting plate 190 from shifting relative to the threaded shaft 182 once the threaded shaft 182 has been tightened onto a mounting device 250.

When the mounting assembly 60 is assembled, the threaded shaft 182 of the stanchion 170 is directed through the mounting aperture 204 of the optional mounting plate 190 (when present), through a plate aperture 216 of the base plate 212, and into the upper hole 254 on the upper surface 252 of the mounting device 250. When the stanchion 170 is appropriately secured to the mounting device 250, typically the first end 178 of the body 172 of the stanchion 170 will be engaged with the receptacle base 196 of the mounting plate 190. Preferably, the threaded shaft 182 of the stanchion 170 will not extend into the slot 264 of the mounting device 250 in the installed configuration of the mounting assembly 60.

Referring now to FIG. 6A, the clamp fastener 68 includes a head 70 and a threaded shaft 72. The head has a diameter that is greater than the diameter of the threaded shaft 72. In some embodiments, the head may include a flange to further increase the diameter of the head. The threaded shaft is configured to extend through a fastener aperture 84 of the clamp 76 and engage the threaded aperture 188 of the stanchion.

Figure 8A:
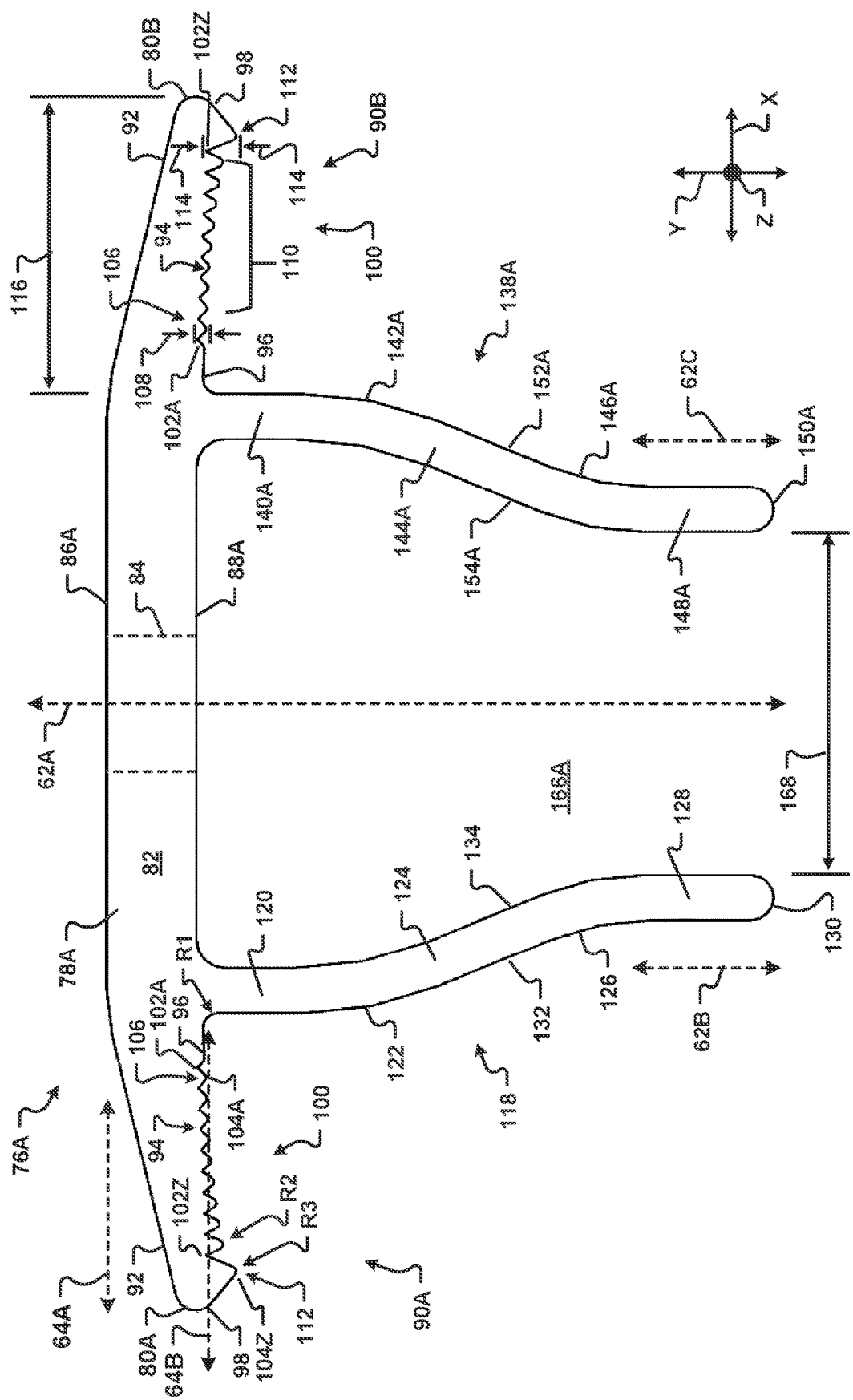
FIG. 8A is a front elevation view of a clamp of the mounting assembly of FIG. 5A according to embodiments of the present disclosure.
Figure 10A:
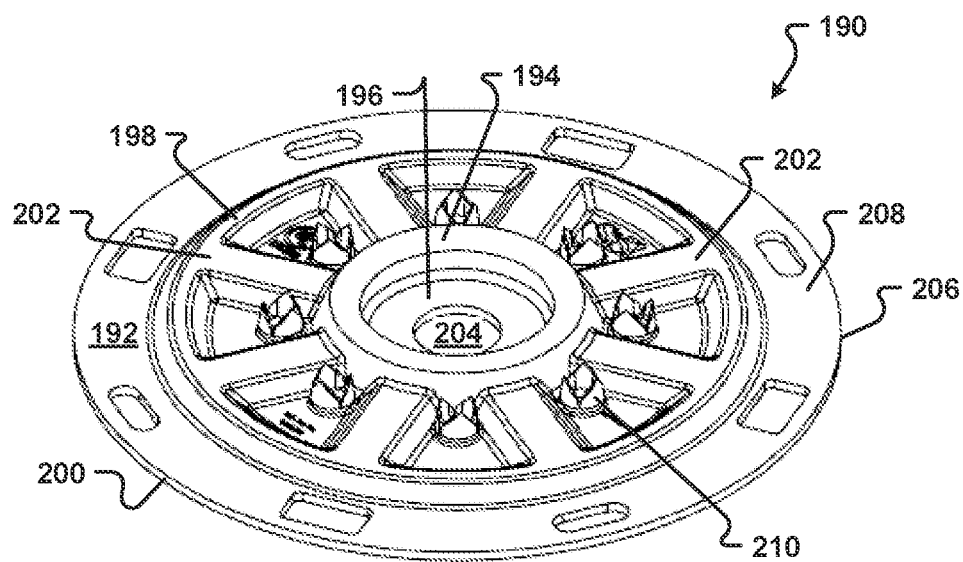
FIG. 10A is a front perspective view of a mounting plate of the mounting assembly of FIG. 5A according to embodiments of the present disclosure.
Figure 10B:
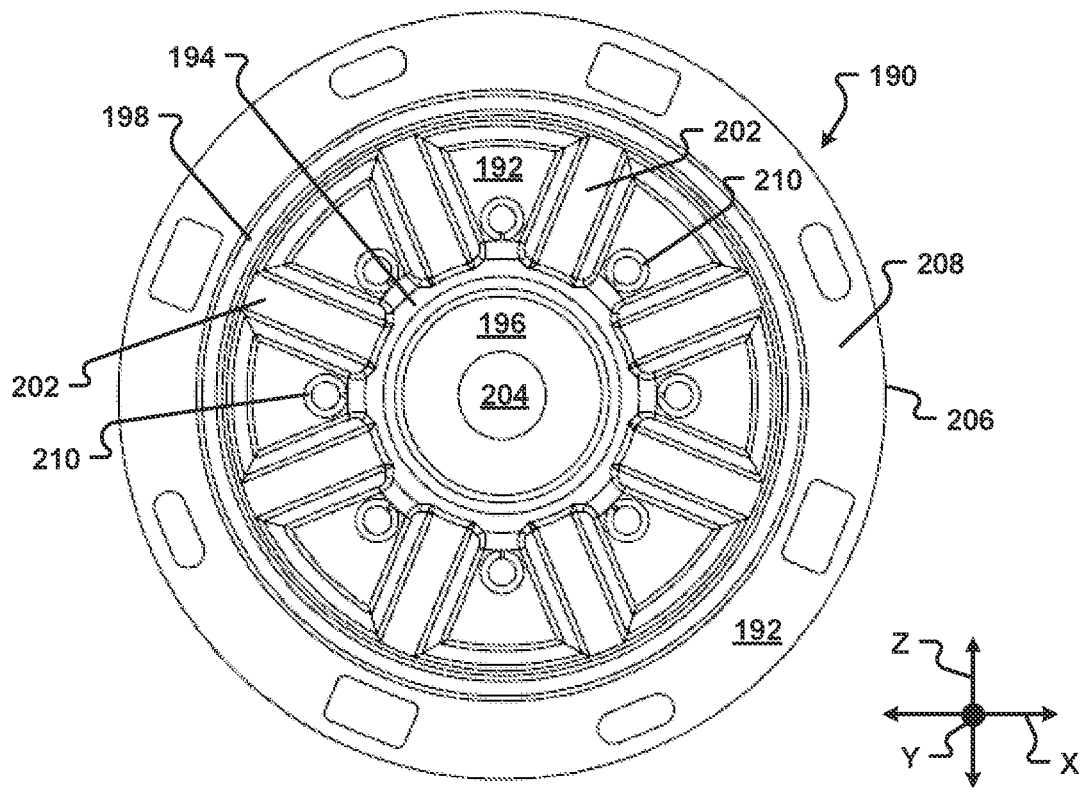
FIG. 10B is a top plan view of the mounting plate of FIG. 10A.

Details of the clamp 76A according to some embodiments of the present disclosure are illustrated in FIGS. 8A-8C, where the clamp 76A is shown as including an upper wall 78A, two clamping sections 90A, 90B, a first leg or first sidewall 118, and a second leg or second sidewall 138A that each extend between a pair of ends 82 of the upper wall.

In some embodiments the clamps 76A, 76B of all embodiments of the present disclosure are formed of a single piece of metal that is extruded. Accordingly, the clamps 76 may be described as being of unitary construction or one-piece construction. In some embodiments, the metal is an aluminum alloy. However, other appropriate materials or metals may be used to form the clamps of all embodiments of the present disclosure.

A vertical reference plane 62A is illustrated in FIGS. 8A, 8B equally spaced between the sidewalls 118, 138A. The vertical reference plane 62A extends in a vertical dimension Y that is orthogonal to a longitudinal dimension Z. In the illustrated example, the vertical reference plane 62A is positioned to bisect a fastener aperture 84 extending through the upper wall 78A. In some embodiments the clamp 76A is symmetric with respect to the vertical reference plane 62A.

A transverse reference plane 66 is illustrated in FIG. 8B as being equally spaced between ends 82 of the upper wall 78A. The transverse reference plane 66 extends in the lateral dimension X and the vertical dimension Y. In the illustrated example, the transverse reference plane 66 is positioned to bisect the fastener aperture 84 extending through the upper wall 78A. In some embodiments the clamp 76A is symmetric with respect to the transverse reference plane 66. The transverse reference plane 66 is oriented perpendicular to the vertical reference plane 62A.

In some embodiments the upper wall 78A has a perimeter that is generally rectangular and has two long edges 80 that extend in the longitudinal dimension Z from a first one of the ends 82 to a second one of the ends 82. The long edges 80 define a length 83 of the upper wall 78A and the clamp 76A. The length 83 may be between about 2 inches and about 10 inches. In some embodiments, the length is between about 4 inches and about 8 inches. In at least one embodiment, the length 83 of the clamp is about 6 inches. Alternatively, in other embodiments, the length 83 is about 2 inches.

In some embodiments, the length 83 of the clamp 76A is greater than some prior art clamps which may have a length of less than 2 inches. For example, clamps 76 of the present disclosure with a length 83 of from 2 to 10 inches beneficially increase the surface area of the top wall 20 of the frame 18 of a photovoltaic module that can be engaged by a clamping section 90 of the clamp. Increasing the surface area of the frame 18 engaged by clamps 76 of embodiments of the present closure beneficially increases the amount of lift-off force the clamp 76 can withstand without losing engagement to the photovoltaic module.

During testing of a mounting assembly 60A which included a clamp 76A with a length 83 of approximately 6 inches, the mounting assembly 60A withstood a lift-off pressure of 105 pounds per square foot (psf) of pressure on a photovoltaic module before losing engagement with the photovoltaic module. In contrast, a prior art mounting assembly with a clamp having a length of about 2 inches withstood only about 45 psf during testing before losing engagement with a photovoltaic module.

As will be appreciated by one of skill in the art, the increased length of clamps 76 of embodiments of the present disclosure compared to prior art clamps results in a significant increase in material costs to manufacture the clamps. However, the increased material costs is acceptable due to the significant increase in lift off resistance provided by the clamps 76 of embodiments of the present disclosure.

The long edges 80 are spaced apart in a lateral dimension X that is orthogonal to the vertical dimension Y and the longitudinal dimension Z. The distance between the long edges defines a width of the clamp 76A. In at least one embodiment, the width is between about 1.5 inch and about 3 inches. In some embodiments, the width is between about 2 inches and about 2.5 inches, or about 2.16 inches.

Figure 5A:
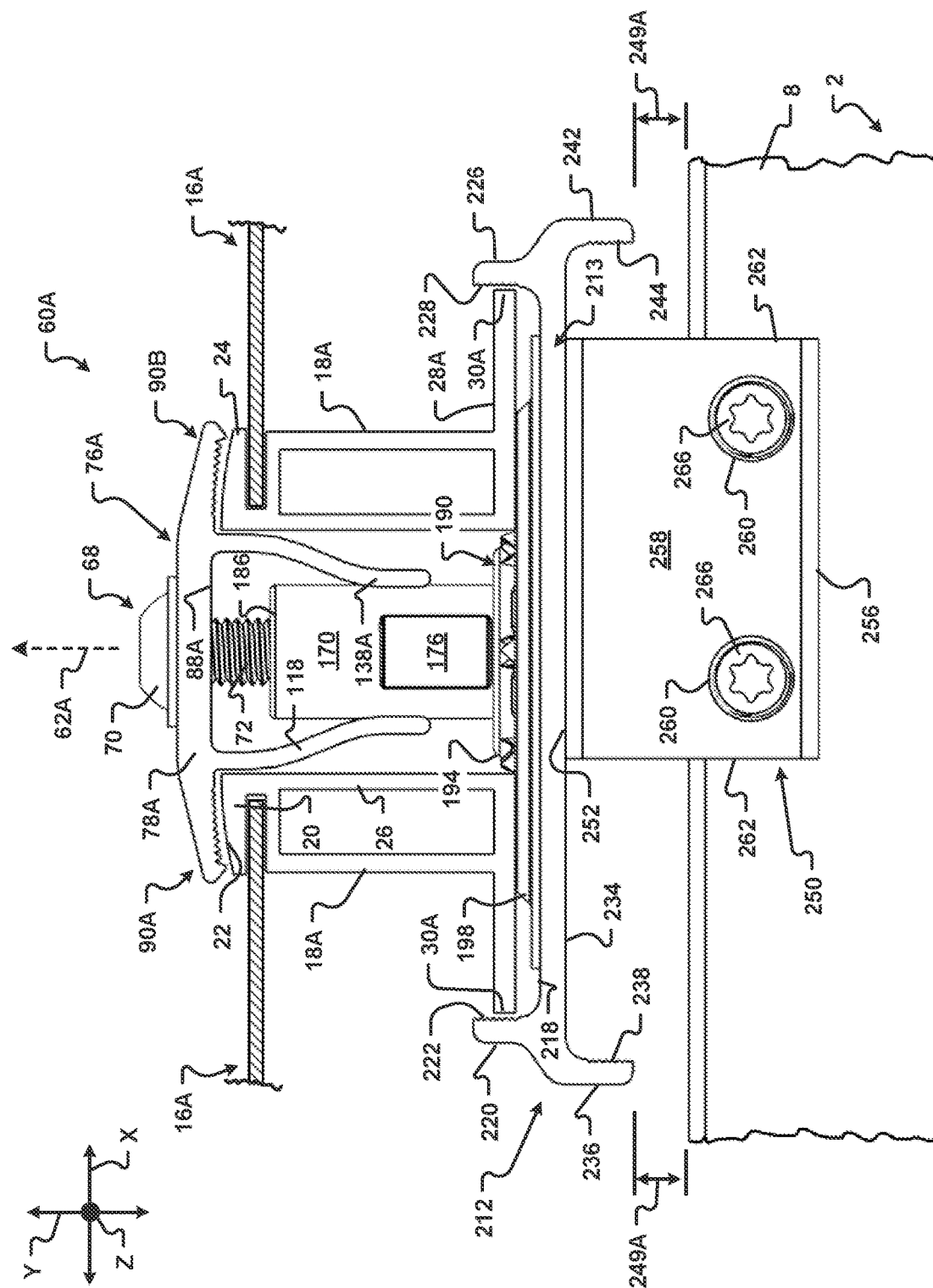
FIG. 5A is a front elevation view of a mounting assembly for interconnecting photovoltaic modules with a standing seam of a building surface according to embodiments of the present disclosure and illustrating the mounting assembly in a first configuration engaged with portions of two photovoltaic modules of a first size.
Figure 5B:
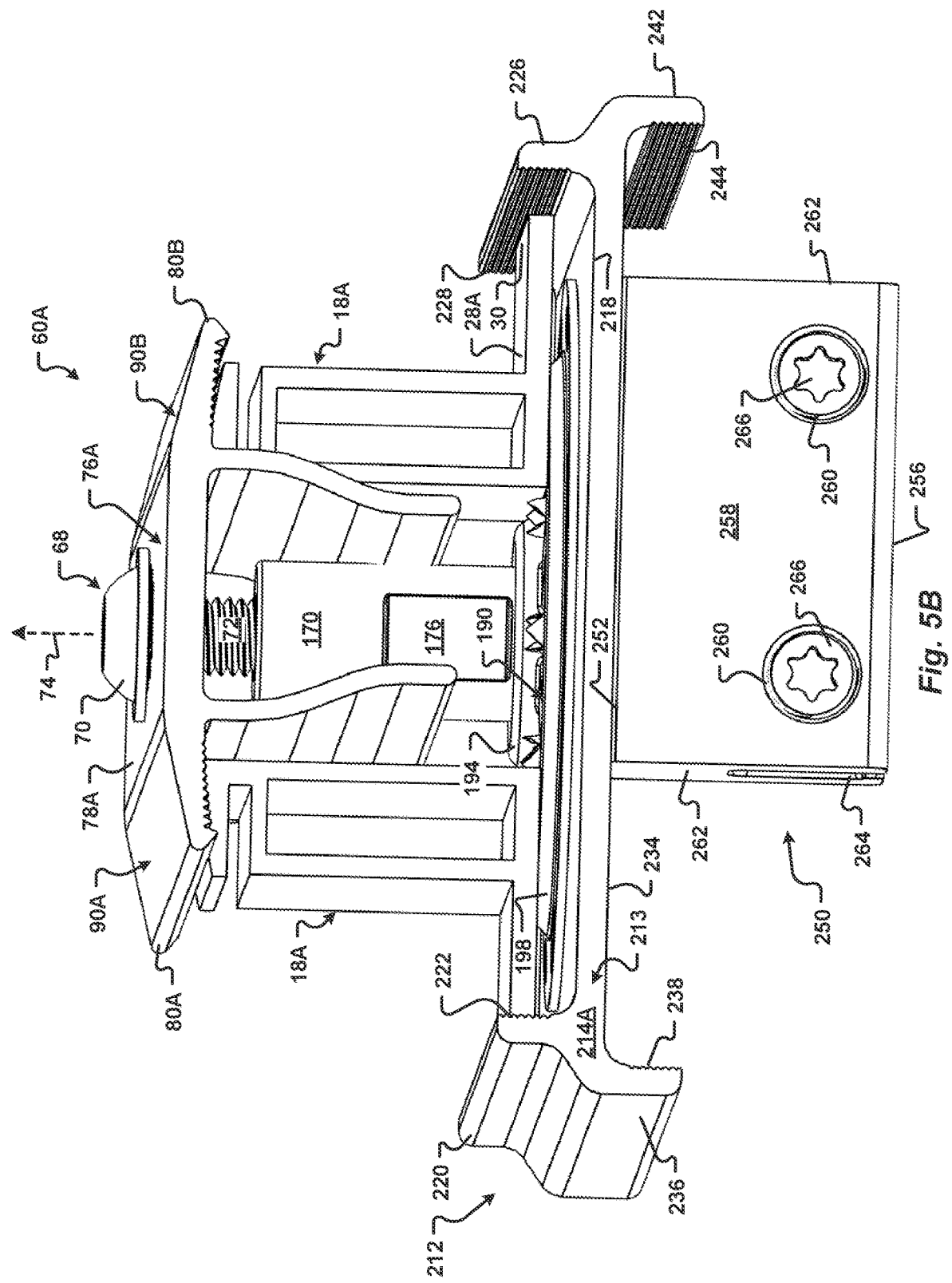
FIG. 5B is a front perspective view of the mounting assembly of FIG. 5A and illustrating portions of the two photovoltaic modules.
Figure 7B:
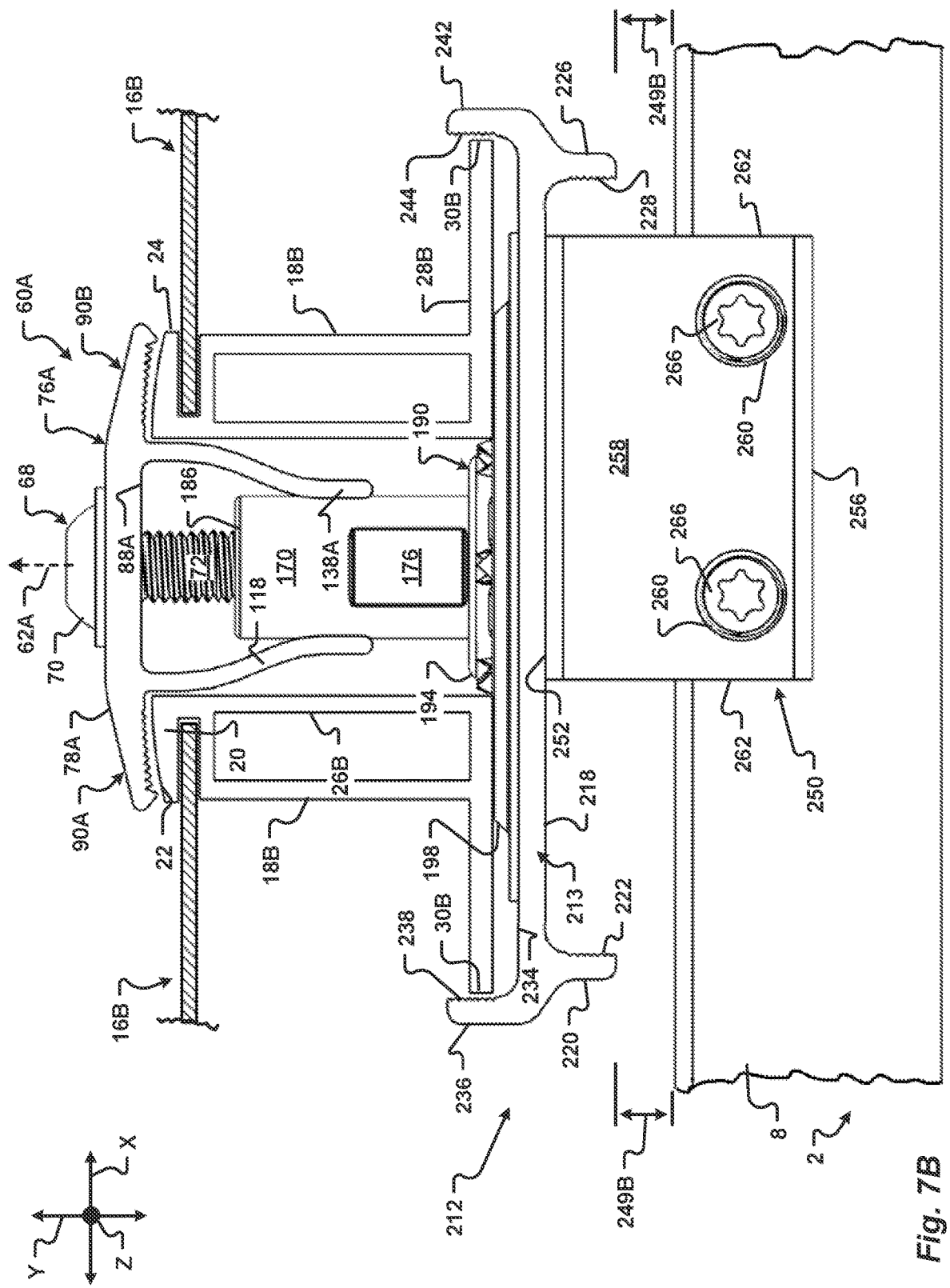
FIG. 7B is a front elevation view of the mounting assembly of FIG. 7A engaged with two photovoltaic modules of a second size that is different than the first size.

The upper wall 78A has an upper surface 86A. In some embodiments, at least a portion of the upper wall is planar. As shown in FIGS. 5A and 7B, when the mounting assembly 60A is assembled in a position of use, in some embodiments the planar portion of the upper wall 78A is the uppermost portion of the clamp 76A.

A horizontal reference plane 64A defined by the planar portion of the upper wall 78A is illustrated in FIG. 8A. The horizontal reference plane 64A extends in the lateral dimension X and the longitudinal dimension Z. Notably, the horizontal reference plane 64A does not intersect any portion of the clamp 76A, and specifically does not intersect the first or second sidewalls 118, 138A.

A fastener aperture 84 extends through the upper wall 78A to accommodate the threaded shaft 72 of the clamp fastener 68. In some embodiments, the fastener aperture is approximately centered between the ends 82 and between the long edges 80. The fastener aperture 84 optionally extends through the planar portion of the upper wall 78A.

The fastener aperture 84 has a diameter that is greater than the diameter of the threaded shaft 72 of the clamp fastener 68, but the diameter of the fastener aperture 84 is less than the diameter of the head 70 of the clamp fastener. In some embodiments, the fastener aperture 84 has a diameter of between about 0.31 inches and about 0.5 inches, or about 0.32 inches.

The fastener aperture 84 optionally includes a countersink. Other positions and configurations of the fastener aperture 84 are contemplated.

In some embodiments, the fastener aperture 84 is the only aperture or hole formed through the upper wall 78A. Specifically, in at least one embodiment, only one fastener aperture 84 is formed through the upper wall 78A. As will be appreciated by one of skill in the art, forming the clamp 76A with only one aperture (the fastener aperture 84) beneficially decreases time and associated costs to manufacture the clamp.

In at least one embodiment, the fastener aperture 84 is circular. Alternatively, the fastener aperture 84 may be elongated in the longitudinal dimension Z.

Figure 6B:
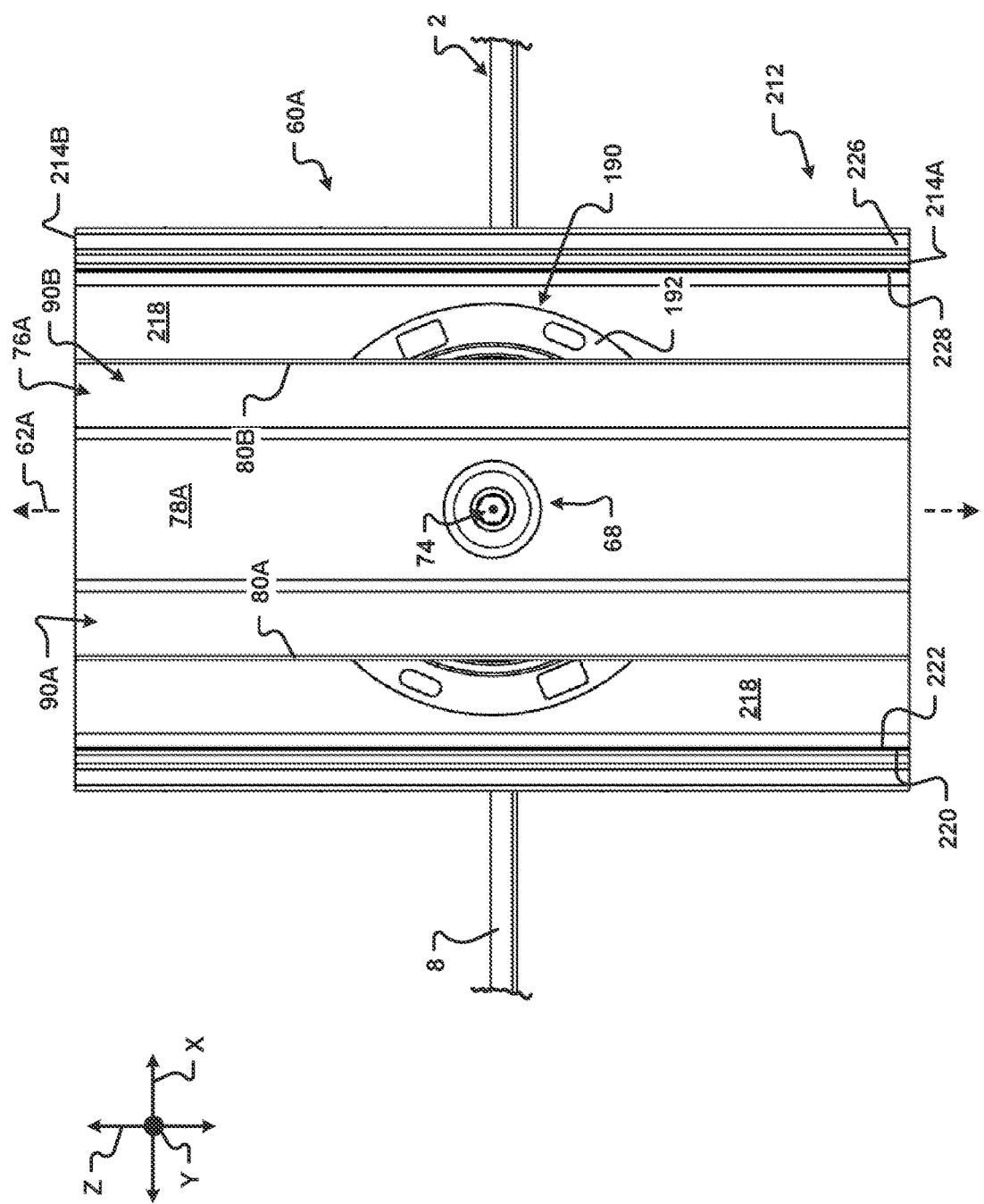
FIG. 6B is a top plan view of the mounting assembly of FIG. 5A with the photovoltaic modules removed for clarity.

The fastener aperture 84 of the clamp 76A is unthreaded in at least one embodiment. This is beneficial because when the fastener aperture 84 is unthreaded the clamp fastener 68 is not threadably engaged with the clamp 76A. Accordingly, rotation of the clamp fastener 68 about a rotational axis 74 (illustrated in FIGS. 5B, 6B and 9C) (the rotational axis 74 being for both the clamp fastener 68 and stanchion 170) should not rotate the clamp 76A, the clamp 76A may remain in a stationary position while the clamp fastener 68 is rotated relative to the clamp 76A and about the rotational axis 74. The rotational axis 74 is contained in the vertical reference plane 62A. As illustrated in FIG. 6B, the rotational axis 74 is oriented in the vertical dimension Y.

The first sidewall 118 and the second sidewall 138A of the clamp 76A both cantilever from the upper wall 78A (more specifically, from an underside or lower surface 88 thereof), with the first sidewall 118 having a first free end 130 and the second sidewall 138A having a second free end 150A.

The distance in the vertical dimension Y between the upper surface 86 of the upper wall 78A and the first and second free ends 130, 150A defines a height of the clamp 76A. In some embodiments, the height is between about 1 inch and about 1.5 inches. Optionally, the height is about 1.184 inches.

As shown at least in FIG. 8A, in the clamps 76 of the present disclosure, the first sidewall 118 is only connected to the second sidewall 138 by the upper wall 78. Accordingly, there are no bridges running from the first sidewall 118 to the second sidewall 138. Stated differently, only the upper wall 78 of the clamp 76 intersects the vertical reference plane 62A that bisects the clamp (e.g., no portion of the clamp 76 except for the upper wall 78 intersects the vertical reference plane 62A).

In at least one embodiment, no apertures or holes are formed through the first sidewall 118. Additionally, or alternatively, the second sidewall 138A optionally has no apertures or holes formed therethrough.

The clamping sections 90A, 90B may be characterized as portions of the upper wall 78A that extend beyond the respective first sidewall 118 (more specifically its first outer surface 132) and the second sidewall 138A (or its second outer surface 152A). Stated differently, the first sidewall 118 is spaced from the long edge 80A to define the first clamping section 90A. Accordingly, the first sidewall 118 may be described as being positioned between the long edge 80A (or the first clamping section 90A) and the fastener aperture 84. Similarly, the second sidewall 138A is spaced from the long edge 80B to define the second clamping section 90B. Thus, the second sidewall 138A can be described as being positioned between the long edge 80B (or the second clamping section 90B) and the fastener aperture 84.

The clamping sections 90 include upper clamp surfaces 92 and oppositely disposed lower clamp surfaces 94. The upper clamp surfaces 92 are portions of the upper surface 86A of the upper wall 78A.

In some embodiments, the upper clamp surfaces 92 of the clamping sections 90 are sloped, converging at least generally in the direction of the lower clamp surface 94 in proceeding from the upper surface 86A of the upper wall 78A toward the long edges 80 of the upper wall. Accordingly, in some embodiments, the upper wall has a first thickness measured in the vertical dimension Y between the first and second sidewalls 118, 138A and a second thickness measured in the vertical dimension in the clamping sections 90, the first thickness being greater than the second thickness. This is beneficial because of the resulting savings in the metal material used to form the clamp.

In some embodiments, the upper clamp surface 92 of a clamping section is oriented at an angle between about 10° and about 15° below horizontal, i.e., below the first horizontal reference plane 64A. In a preferred embodiment, the upper clamp surface 92 is oriented at an angle of from about 13° to 14° with respect to the horizontal reference plane 64A.

The lower clamp surfaces 94 of the clamping sections 90 of the present disclosure are adapted to engage a curved or sloped top wall 20 of a frame 18 of a photovoltaic module. More specifically, the lower clamp surfaces 94 comprise serrations or teeth 100 for engaging a bezel 20 of a frame 18 of a photovoltaic module 16.

Figure 4B:
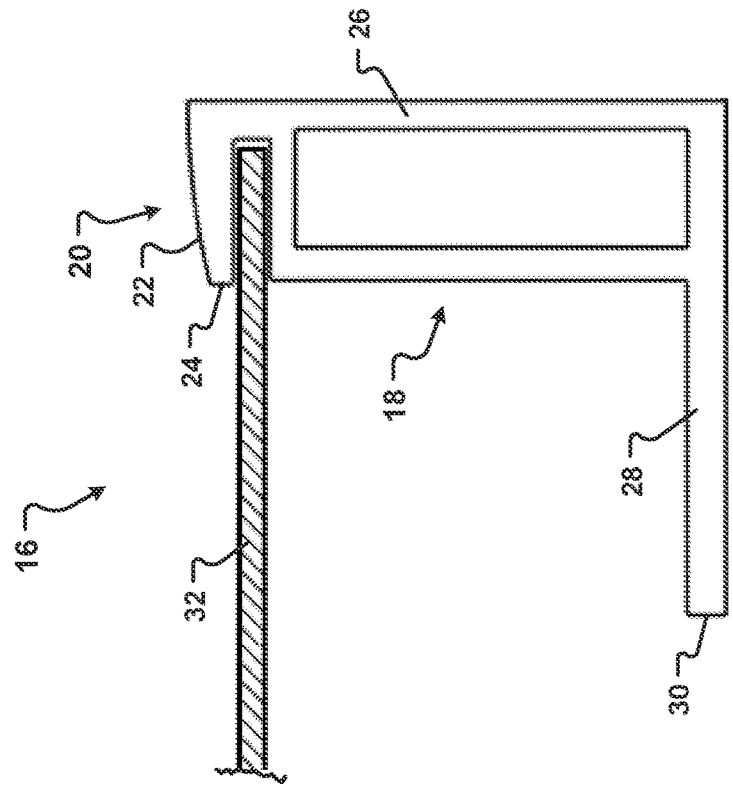
FIG. 4B is a cross-sectional view taken along line 4B-4B of FIG. 4A.
Figure 3:
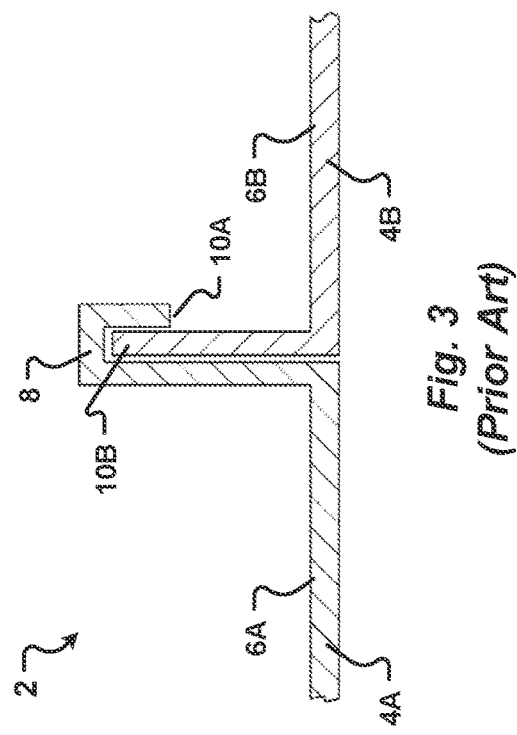
FIG. 3 is a cross-sectional schematic view of a representative standing seam defined by interconnecting a pair of metal panels.
Figure 4A:
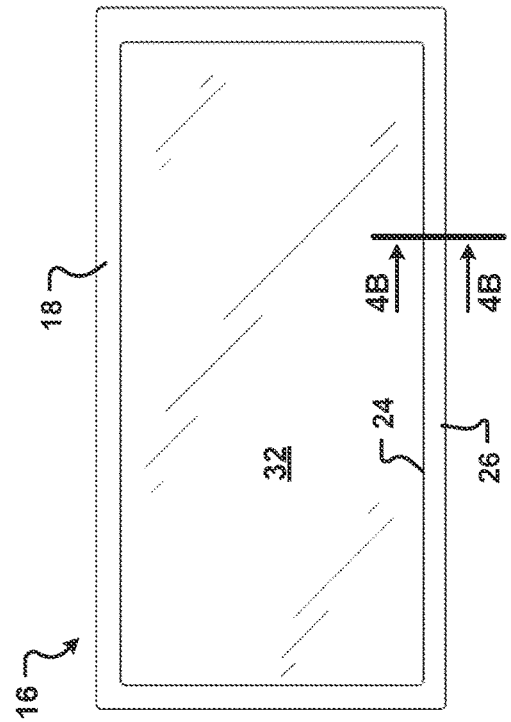
FIG. 4A is a top plan view of one of the photovoltaic modules illustrated in FIGS. 1-2.

Referring now to FIGS. 4B, 5A, and 7B, some photovoltaic modules 16 have a bezel 20 with a sloped or tapered surface 22. The tapered surface 22 generally slopes downwardly in the vertical dimension Y toward a lip or bottom wall 28 of the frame 18. Accordingly, a portion of the bezel 20 proximate to its inner edge 24 is thinner than a portion of the bezel 20 proximate to an end wall 26 of the frame 18.

Prior art clamp members 50 have an engagement section with a lower surface that is oriented perpendicular to the outer surface of the clamp legs and thus cannot engage the bezel 20 for a substantial portion of the width of the bezel, as generally discussed in conjunction with FIG. 1. This is problematic because the failure to engage the bezel securely by the prior art clamping member 50 may permit inadvertent or unintended movement of the photovoltaic module, such as rotation or pivoting of the photovoltaic module relative to the clamping member, in response to external forces caused by wind.

In contrast, the clamps 76 of the present disclosure are configured to engage the bezel 20 and its tapered surface 22. Referring again to FIG. 8A, the clamp 76A includes teeth 100 formed in the lower clamp surfaces 94 that are configured to engage the bezel 20.

The clamping sections 90 of the clamps of all embodiments of the present disclosure may optionally include a plurality of teeth (i.e., any number of teeth 100). In some embodiments, the clamping sections may have from 4 to 14 teeth. In the illustrated embodiments, the clamping sections 90 have ten teeth.

In some embodiments, the teeth 100 are approximately evenly spaced apart at between about 0.02 inches and about 0.05 inches. Optionally, the teeth 100 are spaced apart about 0.037 inches. In other embodiments, the teeth 100 are not evenly spaced apart and the distances between two adjacent teeth varies.

The teeth 100 generally comprise an innermost tooth 106 proximate to a sidewall 118, 138A of the clamp 76A. An outermost tooth 112 is formed proximate to a distal end 98 of the lower clamp surface 94. Intermediate teeth 100 are positioned between the innermost tooth 106 and the outermost tooth 112. Accordingly, the innermost tooth 106 may be described as being positioned between the intermediate teeth 100 and a sidewall 118, 138A. The outermost tooth 112 may be described as being positioned between the intermediate teeth 100 and the distal end 98 of the lower clamp surface 94.

In some embodiments, the teeth 100 are optionally spaced a predetermined distance from an associated sidewall. For example, the lower clamp surface 94 of a clamping section 90 optionally includes a flat portion 96 which extends from an associated sidewall 118, 138A.

In contrast, some prior art clamps have a tooth (or a base of a toot) positioned proximate to a vertical leg and do not include a similar flat portion 96 as included in clamps 76 of some embodiments of the present disclosure. However, the prior art clamps without a flat portion between the vertical leg and the first tooth have been observed to fracture at this tooth in some situations.

The flat portion 96 has a predetermined width measured in the lateral dimension. Optionally, the width of the flat portion 96 is between about 0.05 inches and about 0.11 inches to space the innermost tooth 106 from the closest sidewall.

The teeth generally increase in size from the innermost tooth 106 to the outermost tooth 112. For example, in some embodiments, the innermost tooth 106 has a minimum height 108, a first adjacent tooth has a first height that is greater than the minimum height, and a second adjacent tooth has a second height that is greater than the first height. In this example, each successive adjacent tooth increases in height compared to a previous (or inward) tooth until the outermost tooth 112 which has a maximum height 114 greater than heights of all the other teeth.

Although the outermost tooth 112 can be an exception, in some embodiments a radius of curvature of the distal point 104 of each tooth point gets smaller progressing toward the distal end 98 of the lower clamp surface 94. This means that the innermost tooth 106 proximate to a sidewall may have a distal point 104A with the largest radius of curvature in some embodiments. In some embodiments, the second tooth from the distal end (the intermediate tooth proximate to the outermost tooth) has a distal point with the smallest radius of curvature R2 of between about 0.004 inches and 0.008 inches.

In the embodiment shown in FIG. 8A, the second tooth from the distal end has a radius of curvature R2 of about 0.0065 inches. In some embodiments, the distal point 104Z of the outermost tooth 112 has a larger radius of curvature R3 than the radius of curvature R2 of the second tooth from the distal end. For example, the radius of curvature R3 of the distal point of the outermost tooth 112 may be between about 0.006 inches and 0.01 inches. In the embodiment shown, the radius of curvature R3 is about 0.008 inches.

In at least one embodiment, the innermost tooth 106 has a minimum height 108 and the outermost tooth 112 has a maximum height 114, the maximum height being greater than the minimum height. The minimum height 108 of the innermost tooth is measured in the vertical dimension Y from a base 102A of the innermost tooth to its distal point 104A. Similarly, the maximum height 114 of the outermost tooth is measured in the vertical dimension Y from the base 102Z of the outermost tooth to its distal point 104Z.

The relative size of the innermost tooth 106 and the outermost tooth 112 may be described with use of a horizontal reference plane 64B illustrated in FIG. 8A. The horizontal reference plane 64B extends in the lateral dimension X and the longitudinal dimension Z and is positioned in contact with the distal point 104A of the innermost tooth 106. As shown, the horizontal reference plane 64B extends through the outermost tooth 112. More specifically, the horizontal reference plane 64B contacts and extends through the outermost tooth proximate to its base 102Z. In some embodiments, the horizontal reference plane 64B will contact the outermost tooth between its base 102Z and its distal point 104Z. In some embodiments, the horizontal reference plane 64B intersects the first and second sidewalls 118, 138A.

The increased size of the outermost tooth 112 relative to the innermost tooth 106 is beneficial to increase the amount of contact of the lower clamp surface 94 of a clamping section 90 with the bezel 20 of the frame 18 of a photovoltaic module. The increased contact is generally illustrated in FIGS. 5A and 7B in contrast to the limited contact of a prior art clamp as discussed in conjunction with FIG. 1. Specifically, the outermost tooth 112 of a clamping section 90 of clamps 76 according to embodiments of the present disclosure extends further downwardly in the vertical dimension Y to engage a lowest portion of the bezel 20 (proximate to an inner edge 24 of the bezel) of the frame as generally illustrated in FIGS. 5A and 7B. It should be noted that the mounting assembly 60A is illustrated in FIGS. 5A, 7B in a partially tightened state with the clamping sections 90A, slightly spaced from the bezels 20 for clarity. It will be appreciated that as the clamp fastener 68 is tightened, the clamping sections 90 will engage the bezels 20 shown in FIGS. 5A, 7B.

Another benefit of the increased height (e.g. the maximum height 114) of the outermost tooth 112 is when the mounting assembly 60 is in either the first configuration shown in FIG. 5A or the second configuration shown in FIG. 7B, the innermost tooth 106 is spaced from the upper surface 192 of the mounting plate 190 by a first amount measured in the vertical dimension Y. However, the outermost tooth 112 is spaced from the upper surface of the mounting plate 190 by a second amount measured in the vertical dimension Y, the second amount being less than the first amount. Thus, the outermost tooth 112 can project downwardly in the vertical dimension Y to engage a lower portion at the inner edge 24 of the bezel 20 that would otherwise be unengaged by the clamping section 90 (or by a prior art clamp such as illustrated in FIG. 1).

The increased height of the outermost tooth 112 is also beneficial while securing a photovoltaic module 16 to the mounting assembly 60A. For example, as will be appreciated by one of skill in the art, during the mounting of the photovoltaic module 16, when the clamp fastener 68 is screwed into the threaded aperture 188 of the stanchion to secure the clamp 76A to the stanchion, the clamp 76A may rotate around the lateral dimension Z causing one of the sidewalls 118, 138A of the clamp to be kicked outwardly, which causes the associated clamping section 90 to rotate upward slightly. This rotation can cause the clamping section 90 to hold the frame 18 of the photovoltaic module 16 less securely than intended (or than required). However, the increased height of the outermost tooth 112 ensures contact of the outermost tooth with the frame 18 and its bezel 20 even with some rotation. The outermost tooth 112 acts as a hook at the tip of the clamping section 90, the hook beneficially grabbing the top bezel 20 of the frame 18 more effectively than known clamping devices.

The clamps 76 of embodiments of the present disclosure may have a radius R1, (rather than a right angle) between a sidewall (such as the first sidewall 118) and the lower clamp surface 94 as generally illustrated in FIG. 8A. In some embodiments, the radius R1 is between about 0.02 inches and 0.05 inches. In other embodiments, the radius R1 is about 0.030 inches. This radius is provided to better engage frames 18 of photovoltaic modules 16 with a rounded corner between the top wall 20 and the end wall 26.

Another improvement in the clamping section 90 of the clamps of the present disclosure is that they have an extended clamp width 116 in the lateral dimension X. In this manner, the clamping sections 90 of embodiments of the present disclosure may engage the top wall 20 of the frame 18 for substantially its entire width (between the end wall 26 of the frame 18 and the inner edge 24 of the bezel). This engagement of the outermost tooth 112 with the frame 18 proximate to the inner edge 24 of the bezel is generally shown in FIGS. 5A, 7B. In contrast, the prior art clamp shown in FIG. 1 does not have sufficient width to engage the illustrated PV frames proximate to their inner edges 24.

As will be appreciated by one of skill in the art, extending the widths of the clamping sections 90 of clamps 76 of the present disclosure in the lateral dimension X results in the use of significantly more material to form the clamp. However, increasing the width of the clamping sections 90 significantly increases the potential amount of the bezel that may be engaged by a clamping section, which should improve lift of resistance of the clamp.

In some embodiments, the clamping section 90 has a clamp width 116 measured from a long edge 80 of the upper wall to a sidewall 118, 138A of between about 0.5 inches and about 0.55 inches. Optionally, the clamp width 116 is about 0.529 inches.

Referring again to FIG. 8A, the first sidewall 118 of clamp 76A includes three sections: a first upper section 120, a first intermediate section 124, and a first lower section 128 that includes the first free end 130. The three sections 120, 124, 128 may be of approximately equal thicknesses measured in the lateral dimension X.

The first upper section 120 intersects (or extends from) the lower surface 88 of the upper wall 78A. The first intermediate section 124 is positioned between the first upper section 120 and the first lower section 128. The first lower section may be described as being positioned between the first intermediate section 124 and the first free end 130.

In some embodiments, a first curve 122 is positioned between the first upper section 120 and the first intermediate section 124. Additionally, or alternatively, a second curve 126 may optionally be positioned between the first intermediate section 124 and the first lower section 128.

The first upper section 120 and the first lower section 128 may be characterized as being disposed in parallel relation to one another and (optionally) to the vertical reference plane 62A. However, the first upper section 120 is offset in the lateral dimension X from the first lower section 128. Accordingly, a vertical reference plane 62B defined by first inner surface 134 of the first upper section 120 does not intersect the first lower section 128.

The first intermediate section 124 is disposed in a different orientation relative to both the first upper section 120 and the first lower section 128. The first intermediate section 124 may be described as being oriented at an oblique angle with respect to the upper surface 86A of the upper wall 78A and with respect to the first upper section 120 and the first lower section 128. The first intermediate section 124 extends from the first upper section 120 to the first lower section 128 at least generally in the direction of the vertical reference plane 62A.

In at least some embodiments, the second sidewall 138A may be described as a mirror image of the first sidewall 118. Accordingly, in some embodiments the second sidewall 138A similarly includes three sections: a second upper section 140A, a second intermediate section 144A, and a second lower section 148A that includes the second free end 150A. The three sections 140A, 144A, 148A may be of approximately equal thicknesses measured in the lateral dimension X. In at least one embodiment, the first and second sidewalls 118, 138A may be of approximately equal thicknesses. In some embodiments, the first and second sidewalls 118, 138A have a thickness of between about 0.06 inches and about 0.10 inch, or about 0.08 inches.

The second upper section 140A intersects (or extends from) the lower surface 88 of the upper wall 78A. The second intermediate section 144A is positioned between the second upper section 140A and the second lower section 148A. The second lower section 148A may be described as being positioned between the second intermediate section 144A and the second free end 150A.

In some embodiments, a third curve 142A is positioned between the second upper section 140A and the second intermediate section 144A. Additionally, or alternatively, a fourth curve 146A may optionally be positioned between the second intermediate section 144A and the second lower section 148A.

The second upper section 140A and the second lower section 148A may be characterized as being disposed in parallel relation to one another and (optionally) to the vertical reference plane 62A. However, the second upper section 140A is offset in the lateral dimension X from the second lower section 148A. Accordingly, a vertical reference plane 62C defined by second inner surface 154A of the second upper section 140A does not intersect the second lower section 148A. Moreover, the first lower section 128 and the second lower section 148A may be described as being positioned between the vertical reference planes 62B, 62C.

The second intermediate section 144A is disposed in a different orientation relative to both the second upper section 140A and the second lower section 148A. The second intermediate section 144A may be described as being oriented at an oblique angle with respect to the upper surface 86A of the upper wall 78A, with respect to the second upper section 140A and the second lower section 148A, and with respect to the first intermediate section 124. The second intermediate section 144A extends from the second upper section 140A to the second lower section 148A at least generally in the direction of the vertical reference plane 62A.

The first sidewall 118 includes a first outer surface 132 and a first inner surface 134 oriented toward the vertical reference plane 62A, while the second sidewall 138A includes a second outer surface 152A and a second inner surface 154A oriented toward the vertical reference plane 62A. The first inner surface 134 and the second inner surface 154A each include at least one flat or planar portion, for example associated with one or more of the first upper section 120, the first lower section 128, the second upper section 140A and the second lower section 148A.

The first inner surface 134 is spaced from the second inner surface 154A to collectively define a stanchion receptacle 166A. When the clamp 76A is separated from the mounting assembly (such as generally illustrated in FIG. 8A) the stanchion receptacle 166A between interior surfaces of the sidewalls is open and unobstructed between the lower surface 88 of the upper wall 78A and the first and second free ends 130, 150A of the first and second sidewalls 118, 138A.

A distance between the first inner surface 134 proximate to the first free end 130 and the second inner surface 154A proximate to the second free end 150A defines a minimum width 168 of the stanchion receptacle 166 measured in the lateral dimension X. In at least one embodiment, the minimum width 168 of the stanchion receptacle is between about 0.5 inches and about 0.7 inches. In some embodiments, the minimum width is about 0.610 inches.

In some embodiments, the first sidewall 118 is fixed with respect to the upper wall 78A and the second sidewall 138A. Similarly, the second sidewall 138A is optionally fixed with respect to the upper wall 78A and the first sidewall 118. Accordingly, although one or more of the first and second sidewalls may bend or flex (at least in the lateral dimension X), the first and second sidewalls may be described as being stationary or a fixed distance from one another.

A first spacing exists between the first inner surface 134 of the first upper section 120 and the vertical reference plane 62A and a second spacing exists between the first inner surface 134 of the first lower section 128 and the vertical reference plane 62A, with the first spacing being larger than the second spacing. Stated another way, the first inner surface 134 of the first upper section 120 is further from the vertical reference plane 62A (and from the second inner surface 154A of the second upper section 140A) than the first inner surface 134 of the first lower section 128. Stated yet another way, the first inner surface 134 of the first lower section 128 is closer to the vertical reference plane 62A (and to the second inner surface 154A of the second lower section 148A) than the first inner surface of the first upper section 120.

A third spacing exists between the first outer surface 132 of the first upper section 120 and the vertical reference plane 62A and a fourth spacing exists between the first outer surface 132 of the first lower section 128 and the vertical reference plane 62A. The third spacing is larger than the fourth spacing. Stated another way, the first outer surface 132 of the first upper section 120 is further from the vertical reference plane 62A than the first outer surface 132 of the first lower section 128. Stated yet another way, the first outer surface 132 of the first lower section 128 is closer to the vertical reference plane 62A than the first outer surface 132 of the first upper section 120.

In some embodiments, the third spacing between the first outer surface 132 of the first upper section 120 and the vertical reference plane 62A is between about 0.75 inches and about 0.35 inches, or about 0.55 inches. In at least one embodiment, the fourth spacing between the first outer surface 132 of the first lower section 128 and the vertical reference plane 62A is between about 0.285 inches and about 0.485 inches, or about 0.385 inches.

A fifth spacing exists between the second inner surface 154A of the second upper section 140A and the vertical reference plane 62A and a sixth spacing exists between the second inner surface 154A of the second lower section 148A and the vertical reference plane 62A, with the fifth spacing being larger than the sixth spacing. Stated another way, the second inner surface 154A of the second upper section 140A is further from the vertical reference plane 62A (and from the first inner surface 134 of the first sidewall 118) than the second inner surface 154A of the second lower section 148A. Stated yet another way, the second inner surface 154A of the second lower section 148A is closer to the vertical reference plane 62A than the second inner surface 154A of the second upper section 140A.

A seventh spacing exists between the second outer surface 152A of the second upper section 140A and the vertical reference plane 62A. An eighth spacing exists between the second outer surface 152A of the second lower section 148A and the vertical reference plane 62A, with the seventh spacing being larger than the eighth spacing. Stated another way, the second outer surface 152A of the second upper section 140A is further from the vertical reference plane 62A than the second outer surface 152A of the second lower section 148A. Stated yet another way, the second outer surface 152A of the second lower section 148A is closer to the vertical reference plane 62A than the second outer surface 152A of the second upper section 140A.

In some embodiments, the seventh spacing between the second outer surface 152A of the second upper section 140A and the vertical reference plane 62A is between about 0.75 inches and about 0.35 inches, or about 0.55 inches. In at least one embodiment, the eight spacing between the second outer surface 152A of the second lower section 148A and the vertical reference plane 62A is between about 0.285 inches and about 0.485 inches, or about 0.385 inches.

In some embodiments, the first sidewall 118 and the second sidewall 138A are the mirror image of each other. As such, in at least some embodiments: 1) the first spacing between the first inner surface 134 of the first upper section 120 and the vertical reference plane 62A may be of the same magnitude as the fifth spacing between the second inner surface 154A of the second upper section 140A and the vertical reference plane 62A; 2) the second spacing between the first inner surface 134 of the first lower section 128 and the vertical reference plane 62A may be of the same magnitude as the sixth spacing between the second inner surface 154A of the second lower section 148A and the vertical reference plane 62A; 3) the third spacing between the first outer surface 132 of the first upper section 120 and the vertical reference plane 62A may be of the same magnitude as the seventh spacing between the second outer surface 152A of the second upper section 140A and the vertical reference plane 62A; and 4) the fourth spacing between the first outer surface 132 of the first lower section 128 and the vertical reference plane 62A may be of the same magnitude as the eighth spacing between the second outer surface 152A of the second lower section 148A and the vertical reference plane 62A.

Referring now to FIG. 6A, in some embodiments the first outer surface 132 of the first upper section 120 of the first sidewall 118 and an outer perimeter of the inner or first annular projection 194 of the mounting plate 190 are disposed the same distance from the vertical reference plane 62A. Similarly, the second outer surface 152A of the second upper section 140 of the second sidewall 138A is optionally disposed the same distance from the vertical reference plane 62A as the outer perimeter of the first annular projection 194 of the mounting plate 190. This is beneficial because (as generally illustrated in FIGS. 5A and 7B) when a frame 18 of a photovoltaic module 16 is engaged by a clamping section 90A (or 90B) of the mounting assembly 60A (where this photovoltaic module (e.g., its frame 18) is positioned on both the upper surface of one or more of the ribs 202 and the upper surface of part of the outer or second annular projection 198 on the upper surface of the mounting plate 190 (the photovoltaic module is not positioned on an upper surface of the first annular projection 194 of the mounting plate)): 1) the teeth 100 of the lower clamp surface 94 of the clamping section 90 will engage the upper bezel 20 of this PV module frame section with the outermost tooth 112 engaging a lower portion of the bezel's tapered surface 22; 2) the first outer surface 132 of the first upper section 120 for the first sidewall 118 will engage an upper part of an end wall 26 of this same PV module frame section; 3) a lower part of the end wall 26 of this PV module frame section will engage the adjacent-most portion of the outer perimeter of the first annular projection 194 for the mounting plate 190; 4) this PV module frame section will be clamped between the upper surface 192 of the mounting plate 190 and the clamping section 90A of the clamp 76A by rotating the clamp fastener 68 to advance the clamp 76A toward the mounting plate 190 and relative to the stanchion 170; and 5) the first inner surface 134 of at least part of the first lower section 128 of the first sidewall 118 and the second inner surface 154A of at least part of the second lower section 148A of the second sidewall 138A will engage opposing portions of the body 172 of the stanchion 170.

In addition, as illustrated in FIGS. 5A and 7B, when the clamp 76A is engaged to frames 18 of photovoltaic modules 16, the first outer surface 132 of the first upper section 120 of the first sidewall 118 may contact the frame 18 of a first one of the photovoltaic modules. However, the first outer surface 132 of the first lower section of the first sidewall is spaced from the frame 18 of the first photovoltaic module 16. Similarly, the second outer surface 152A of the second upper section 140A of the second sidewall 138A may contact the frame of a second one of the photovoltaic modules 16. But the second outer surface 152A of the second lower section of the second sidewall is spaced from the frame 18 of the second photovoltaic module 16.

In at least one embodiment, no apertures or holes are formed through the first sidewall 118. Accordingly, in some embodiments, no apertures extend through the first outer surface 132. Similarly, the first inner surface 134 is optionally unbroken (or uninterrupted) by apertures or holes. Further, in at least one embodiment, no bumps or protrusions extend from either the first outer surface 132 or the first inner surface 134.

In some embodiments, no apertures or holes are formed through the second sidewall 138A. Accordingly, in some embodiments, no apertures extend through the second outer surface 152A. Similarly, the second inner surface 154A is optionally unbroken (or uninterrupted) by apertures or holes. Further, in at least one embodiment, no bumps or protrusions extend from either the second outer surface 152A or the second inner surface 154A.

Referring now to FIGS. 11A-11E, the base plate 212 according to embodiments of the present disclosure is generally illustrated. The base plate 212 is configured to be reversible to accommodate photovoltaic modules 16 of a variety of sizes.

When the mounting assembly 60A is assembled in either the first configuration or the second configuration, the base plate 212 is positioned between the clamp 76A and the mounting device 250. The base plate 212 may be positioned proximate to the optional mounting plate 190 when it is used with the mounting assembly 34.

In some embodiments the base plate 212 is formed of a single piece of metal that is extruded. Accordingly, the base plate may be described as being of unitary or one-piece construction, or as an extrusion. In some embodiments, the metal is an aluminum alloy. However, other materials and methods of manufacturing the base plate 212 are contemplated.

The base plate 212 comprises a body 213 with a first narrow end 214A and a second narrow end 214B opposite to the first narrow end. The body 213 further comprises a first surface 218 which extends in the longitudinal dimension Z from the first narrow end to the second narrow end. Opposite to the first surface 218 is a second surface 234 that also extends between the first narrow end and the second narrow end. In at least one embodiment, the first surface 218 is approximately parallel to the second surface 234.

A plate aperture 216 extends through the body 213 and its first and second surfaces 218, 234. The plate aperture may have any diameter sufficient to receive the threaded shaft 182 of the stanchion 170. In some embodiments, the diameter of the plate aperture 216 is between about 0.30 inches and about 0.35 inches, or about 0.32 inches.

A first flange 220 and a second flange 226 extend from the body 213 in the vertical dimension Y away the first surface 218. In some embodiments, the first and second flanges 220, 226 run continuously between the first and second narrow ends 214.

The first flange 220 comprises a first inner surface 222 facing a second inner surface 228 of the second flange 226. Optionally, at least one of the first and second inner surfaces 222, 228 is oriented approximately orthogonal to the first surface 218. In some embodiments, both of the first and second inner surfaces 222, 228 are oriented approximately orthogonal to the first surface 218.

Similarly, a third flange 236 and a fourth flange 242 extend from the body 213 in the vertical dimension Y away the second surface 234. In some embodiments, one or more of the third and fourth flanges 236, 242 extend continuously between the first and second narrow ends 214A, 214B. For example, in some embodiments, one or more of the first, second, third, and fourth flanges have no breaks or interruptions between the first and second narrow ends 214A, 214B.

The third flange 236 comprises a third inner surface 238 facing a fourth inner surface 244 of the fourth flange 242. Optionally, at least one of the third and fourth inner surfaces 238, 244 is oriented approximately orthogonal to the second surface 234. In some embodiments, both of the third and fourth inner surfaces 238, 244 are oriented approximately orthogonal to the second surface 234.

In some embodiments, the first surface 218 is substantially planar between the first and second narrow ends 214A, 214B and between the first and second flanges 220, 226. Additionally, or alternatively, the second surface 234 is optionally substantially planar between the first and second narrow ends 214A, 214B and between the third and fourth flanges 236, 242.

The first inner surface 222 is optionally approximately parallel to the third inner surface 238. In some embodiments, the second inner surface 228 is oriented approximately parallel to the fourth inner surface 244. Additionally, or alternatively, the first inner surface 222, the second inner surface 228, the third inner surface 238, and the fourth inner surface 244 are optionally oriented approximately parallel to one another.

Figure 11A:
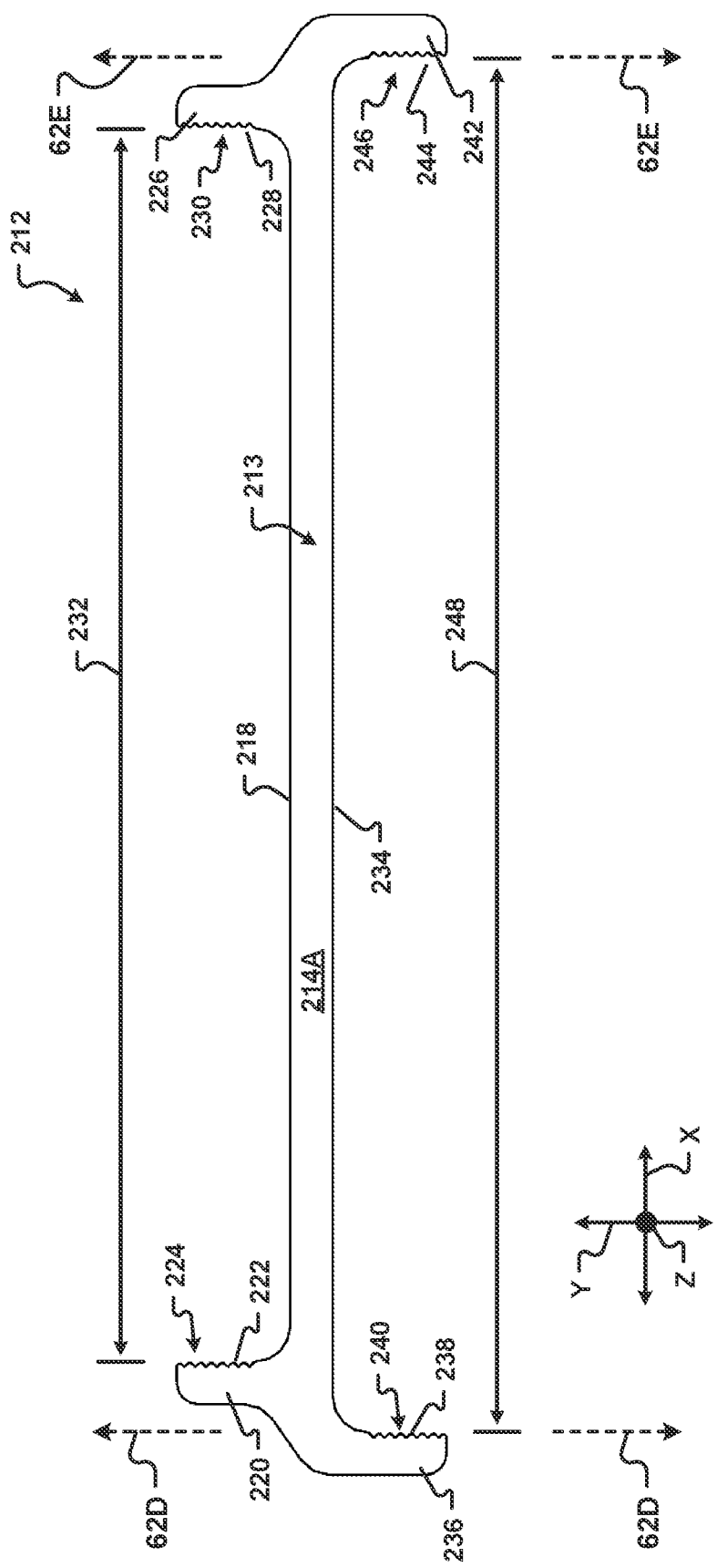
FIG. 11A is front elevation view of a base plate of the mounting assembly of FIG. 5A according to embodiments of the present disclosure.

Referring now to FIG. 11A, in some embodiments, the first and second flanges 220, 226 are offset in the lateral dimension X from the third and fourth flanges 236, 242. More specifically, the third flange 236 is offset in the lateral dimension X from the first flange 220 (as well as the second flange 226). Accordingly, a vertical reference plane 62D defined by the third inner surface 238 does not intersect the first flange 220 or the second flange 226. The illustrated vertical reference plane 62D extends in the vertical dimension Y and the longitudinal dimension Z. Notably, the vertical reference plane 62D also does not intersect the first surface 218.

Additionally, or alternatively, in at least one embodiment the fourth flange 242 is offset in the lateral dimension X from the second flange 226 (as well as the first flange 220). Accordingly, a vertical reference plane 62E defined by the fourth inner surface does not intersect the second flange 226 or the first flange 220. Moreover, in at least some embodiments, the vertical reference plane 62E does not intersect the first surface 218.

A vertical reference plane 62A is illustrated in FIGS. 11B, 11D equally spaced between the first and third flanges 220, 236 and the second and fourth flanges 226, 242. The vertical reference plane 62A extends in the vertical dimension Y and the longitudinal dimension Z. In the illustrated example, the vertical reference plane 62A is positioned to bisect the plate aperture 216 extending through the first and second surfaces 218, 234. In some embodiments the base plate 212 is symmetric with respect to the vertical reference plane 62A.

A transverse reference plane 66 is also illustrated in FIGS. 11B, 11D as being equally spaced between the narrow ends 214A, 214B. The transverse reference plane 66 extends in the lateral dimension X and the vertical dimension Y and is oriented perpendicular to the vertical reference plane 62A. In the illustrated example, the transverse reference plane 66 is positioned to bisect the plate aperture 216 of the base plate 212. In some embodiments the base plate 212 is symmetric with respect to the transverse reference plane 66.

The arrangement and geometry of the flanges 220, 226, 236, 242 with respect to the first and second surfaces 218, 234 beneficially permits the base plate 212 to be used with photovoltaic modules 16 of various sizes. More specifically, the first inner surface 222 is separated from the second inner surface 228 by a first interior width 232 measured in the lateral dimension X. The first interior width 232 is sufficient to receive the frames 18A of two photovoltaic modules 16A of a first size when the mounting assembly 60A is in a first configuration. In the first configuration, the first surface 218 of the base plate 212 is oriented upwardly, facing the clamp 76A as generally illustrated in FIG. 5A.

In addition, the first interior width 232 is greater than a width or diameter of the mounting plate 190. Accordingly, when the mounting assembly 60 is assembled in the first configuration, the optional mounting plate 190 may engage the first surface 218 of the base plate.

Moreover, the third inner surface 238 is separated from the fourth inner surface 244 by a second interior width 248 measured in the lateral dimension X. The second interior width 248 is greater than the first interior width 232. In some embodiments, the first interior width 232 is also greater than an exterior distance between a first exterior surface of the first flange 220 and a second exterior surface of the second flange 226.

The increased magnitude of the second interior width 248 compared to the first interior width 232 facilitates use of the base plate 212 when the mounting assembly 60 will be used to engage photovoltaic modules 16B of a second size that is larger than the first size of the photovoltaic modules 16A. More specifically, the second interior width 248 is sufficient to receive the frames 18B of two photovoltaic modules 16B when the mounting assembly 60A is in a second configuration. As generally shown in FIG. 7B, in the second configuration of the mounting assembly 60A, the second surface 234 of the base plate 212 is oriented facing the clamp 76A.

In some embodiments, one or more of the first inner surface 222, the second inner surface 228, the third inner surface 238, and the fourth inner surface 244 comprise ridges or serrations 224, 230, 240, 246. Optionally, each of the first, second, third and fourth inner surfaces 222, 228, 238, 244 include serrations. The serrations 224, 230, 240, 246 generally extend in the longitudinal dimension Z.

In one or more embodiments, at least one of the serrations 224, 230, 240, 246 of one or more of the first, second third and fourth inner surfaces 222, 228, 238, 244 is oriented (i.e., extends or runs) approximately parallel to the first surface 218. In some embodiments, all of the serrations of one or more of the first, second third and fourth inner surfaces 222, 228, 238, 244 are approximately parallel to the first surface 218.

In some embodiments, the plate aperture 216 is approximately centered between the first and second narrow ends 214A, 214B and between the first and second flanges 220, 226.

In at least some embodiments, the plate aperture 216 is the only aperture or hole formed in the base plate 212. More specifically, in at least one embodiment, the plate aperture 216 is the only depression or hole formed in the first surface 218. Additionally, or alternatively, in at least one embodiment, no holes or apertures extend through the second surface 234 except for the plate aperture 216.

In at least one embodiment, the plate aperture 216 is circular. Alternatively, the plate aperture 216 may be elongated in the longitudinal dimension Z.

The plate aperture 216 of the base plate 212 is unthreaded in at least one embodiment. This is beneficial because when the plate aperture 216 is unthreaded the base plate 212 is not threadably engaged with the stanchion 170 or the mounting device 250 when the mounting assembly 60 is assembled. Accordingly, rotation of the stanchion 170 (and its threaded shaft 182) about the rotational axis 74 (illustrated in FIGS. 5B and 6B) should not rotate the base plate 212. The base plate 212 may thus remain in a stationary position while the stanchion 170 is rotated relative to the mounting device 250 and about the rotational axis 74.

The base plate 212 has a length 215 extending in the longitudinal dimension Z that is defined by the distance between the first and second narrow ends 214A, 214B. Optionally, the length 215 of the base plate 212 is approximately equal to the length 83 of the clamp 76.

In some embodiments, the length 215 of the base plate 212 is between about 2 inches and about 10 inches. In some embodiments, the length 215 of the base plate is between about 4 inches and about 8 inches. In at least one embodiment, the length 215 of the base plate is about 6 inches.

The base plate 212 has an exterior width measured in the lateral dimension X defined between an outer surface of the third flange 236 and an outer surface of the fourth flange 242. In some embodiments, the exterior width of the base plate is between about 3.8 inches and about 4.2 inches, or about 4.06 inches.

The clamp fastener 68, the clamp 76A, and the stanchion 170 may be assembled prior to securing the stanchion 170 to the mounting device 250. The threaded shaft 72 of the clamp fastener 68 is directed through the fastener aperture 84 of the clamp 76A and at least an upper section of the stanchion 170 is positioned within the stanchion receptacle 166 of the clamp 76A such that the threaded shaft 72 of the clamp fastener 68 may be threaded into the threaded aperture 188 on the second end 186 of the stanchion 170 (e.g., by directing the stanchion 170 through the space between the sidewalls 118, 138A at either of the ends 82 of the clamp 76; by directing the stanchion 170 through the space between the sidewalls 118, 138A at their respective fee ends 130, 150). In some embodiments, the clamp fastener 68 is temporarily secured to the stanchion 170, such as by an appropriate bond (e.g., adhesive). For instance, an appropriate adhesive (e.g., Loctite®) may be applied to the threaded shaft 72 of the clamp fastener 68 and/or within the threaded aperture 188 of the stanchion 170 to bond the clamp fastener 68 to the stanchion 170. While the clamp fastener 68 and the stanchion 170 are in a bonded state, the clamp fastener 68 and the stanchion 170 may be collectively rotated (e.g., using the drive socket of the clamp fastener 68, about the rotational axis 74) to thread the threaded shaft 182 of the stanchion 170 into the upper hole 254 of the mounting device 250. At this time the clamp 76A should remain in a rotationally stationary state (i.e., both the stanchion 170 and the clamp fastener 68 may rotate, but not the clamp 76A). Once the stanchion 170 has been appropriately tightened/secured to the mounting device 250, the bond between the clamp fastener 68 and the stanchion 170 should be eliminated (e.g., by breaking the bond; an un-bonded state) to thereafter allow the clamp fastener 68 to continue to rotate about the rotational axis 74 and now relative to both the clamp 76A and the stanchion 170. Rotation of the clamp fastener 68 relative to the stanchion 170 will then advance the clamp 76A along the stanchion 170 and in the direction of the first end 184 of the stanchion 170. That is, the head 70 of the clamp fastener 68 will exert a force on the clamp 76A (the force vector being in a direction of an underlying portion of the base plate 212) to advance the clamp 76A relative to the stanchion 170, and which will thereby exert a compressive force on one or two photovoltaic modules 16 disposed between the clamp 76A and the base plate 212 so as to retain such a photovoltaic module within the mounting assembly 60A.

At least a portion of the perimeter of a photovoltaic module 16 is typically defined by one or more sections of a frame 18. The height or thickness of these PV module frame sections may vary as will be noted by comparing in FIGS. 5A and 7B. The mounting assembly 60A accommodates a range of PV module frame section heights or thicknesses, namely by accommodating for a plurality of positions of the clamp 76A along the stanchion 170 in a manner that will still allow for engagement of a photovoltaic module 16 and/or by positioning either the first surface 218 or the second surface 234 of the base plate 212 proximate to the photovoltaic module 16.

FIG. 5A illustrates use of the mounting assembly 60A to secure a photovoltaic module 16A having a first size for a frame 18A, where this photovoltaic module is positioned on both the upper surface of one or more of the ribs 202 and the upper surface of part of the outer annular projection 198 on the upper surface 192 of the mounting plate 190 (the photovoltaic module is not positioned on an upper surface of the inner annular projection 194 of the mounting plate 190). In the first configuration, generally: 1) the stanchion 170 is appropriately secured to the mounting device 250 as described herein; 2) the frame 18A of the PV module 16A is clamped between the clamp 76A and the mounting plate 190 by rotating the clamp fastener 68 to advance the clamp 76A toward the mounting plate 190 and relative to the stanchion 170; 3) the lower clamp surface of the clamping section 90 for the clamp 76A engages an upper wall or bezel 20 of the frame 18A of the PV module; and 4) a portion of the first outer surface 132 of the first sidewall 118 for the clamp 76A engages at least part of an end wall 26 of the frame 18A. The lower surface 88A of the upper wall 78A may be spaced from the second end 186 of the stanchion 170 by a first distance (depending upon the height of the frame 18A in the vertical dimension Y).

In addition, in at least some embodiments, opposing portions of the sidewall 174 of the stanchion 170 may be engaged by the first inner surface 134 of the first lower section 128 of the first sidewall 118 and the second inner surface 154A of the second lower section 148A of the second sidewall 138A of the clamp 76A. In some embodiments the engagement of the first and second inner surfaces 134, 154A with the sidewall 174 of the stanchion is facilitated by having the stanchion sidewall 174 being a cylindrical surface. Accordingly, in some embodiments, there is contact (e.g., along at least a line) between the stanchion sidewall 174 and the first inner surface 134 of the first sidewall 118 and there is also opposing contact (e.g., along at least a line) between the stanchion sidewall 174 and the second inner surface 154A of the second sidewall 138A of the clamp 76A. This provides support for the corresponding PV module 16. The engagement between the stanchion 170 and the clamp 76A should reduce the chance of the corresponding PV module 16 "tilting" relative to the underlying building surface when compressing the frame 18 of the PV module 16 between the clamp 76A and the mounting plate 190 as described.

To facilitate movement of the clamp 76A downwardly in the vertical dimension toward the mounting device 250, in at least some embodiments the first and second inner surfaces 134, 154A of at least the first and second lower sections 128, 148A of the first and second sidewalls 118, 138A are smooth and have no teeth, grooves, or projections. In this manner, the first and second inner surfaces 134, 154A can move freely (or slide against) the body 172 of the stanchion 170 (and its sidewall 174) as the clamp fastener 68 is rotated to advance the clamp 76A toward the mounting device 250 and relative to the stanchion 170.

FIG. 5A also illustrates a first configuration of the mounting assembly 60A and a first orientation of the base plate 212 to engage photovoltaic modules 16A of the first size. Notably, the frames 18A of the photovoltaic modules 16A have a height in the vertical dimension Y that is less than a height of frames 18B of the photovoltaic modules 16B illustrated in FIG. 7B. Further, a bottom wall 28A of the frames 18A shown in FIG. 5A has a width extending in the lateral dimension X that is less than the widths of the bottom walls 28B of the frames 18B.

In the first configuration, the first surface 218 of the base plate 212 is oriented toward the optional mounting plate 190 and the photovoltaic modules 16A such that the bottom surface of the mounting plate 190 is supported by the first surface 218 of the base plate. Notably, in the first configuration, the first and second inner surfaces 222, 228 of the first and second flanges 220, 226 of the base plate 212 are in close proximity to inner ends 30A of the bottom walls 28A of the photovoltaic frames 18A. Accordingly, if the photovoltaic modules 16A tip or rotate (for example, about the longitudinal dimension Z) the inner ends 30A of the bottom wall 28A should engage the respective first and second inner surfaces 222, 228. If a middle portion (not illustrated) of one or both of the photovoltaic modules 16A illustrated in FIG. 5A bows or bends upwardly in the vertical dimension Y, the inner ends 30A of the bottom wall 28A may pivot upwardly in the vertical dimension Y, and should contact and bind (or jam) against the respective first inner surface 222 or the second inner surface 228 to prevent or reduce the extend of movement of the photovoltaic module 16 relative to the underlying building surface. Further, the first and second serrations 224, 230 on the respective first and second inner surfaces 222, 228 may catch a corner or edge of the inner end 30A of the respective bottom wall 28A of the photovoltaic frame 18. Thus, the base plate 212 and its flanges can limit or eliminate unintended and inadvertent movement of a photovoltaic module 16 with respect to the mounting assembly 60 of the current disclosure.

FIG. 7B illustrates use of the mounting assembly 60A in a second configuration to secure two photovoltaic modules 16B each having a frame 18B with a second size that is bigger than the first size of frame 18A of FIG. 5A, and where these photovoltaic modules (e.g., their frames 18B) are positioned on both the upper surface of one or more of the ribs 202 and the upper surface of part of the outer annular projection 198 on the upper surface 192 of the mounting plate 190 (the photovoltaic module is not positioned on an upper surface of the inner annular projection 194 of the mounting plate 190). In the second configuration, generally: 1) the stanchion 170 is appropriately secured to the mounting device 250 as described herein; 2) the frame 18B of the photovoltaic module 16B is clamped between the clamp 76A and the optional mounting plate 190 by rotating the clamp fastener 68 to advance the clamp 76A toward the mounting plate 190 and relative to the stanchion 170; 3) the lower clamp surface 94 of the clamping section 90 for the clamp 76A engages an upper wall or bezel 20 of the frame 18B; and 4) the first outer surface 132 of the first upper section 120 of the first sidewall 118 for the clamp 76A engages at least part of an end wall 26B of the frame 18B. Larger spacing exists between the lower surface 88A of the upper wall 78A of the clamp 76A and the second end 186 of the stanchion 170 compared to the embodiment shown in FIG. 5A. More specifically, when the clamp 76A engages the frame 18B as shown in FIG. 7B, the first and second free ends 130, 150A of the first and second sidewalls 118, 138A are further from the first end 184 of the stanchion 170 (and its threaded shaft 182) than when the clamp 76A engages the frame 18A illustrated in FIG. 5A. In addition, opposing portions of the body 172 of the stanchion 170 engage the first inner surface 134 of the first lower section 128 of the first sidewall 118 and also engage the second inner surface 154A of the second lower section 148A of the second sidewall 138A of the clamp 76A. In some embodiments, this contact is facilitated by having the sidewall 174 of the stanchion body 172 being a cylindrical surface. There is contact (e.g., at least along a line) between the body 172 of the stanchion 170 and the first inner surface 134 of the first sidewall 118 of the clamp 76A. There is also opposing contact (e.g., at least along a line) between the sidewall 174 of the body 172 of the stanchion 170 and the second inner surface 154A of the second sidewall 138A of the clamp 76A. This provides support for the corresponding PV module 16B (or modules). The engagement between the stanchion 170 and the clamp 76A should reduce the chance of the corresponding PV module 16B "tilting" relative to the underlying building surface when compressing the frame 18B of the photovoltaic module 16B between the clamp 76A and the mounting plate 190 as described.

In the second configuration of the mounting assembly 60A shown in FIG. 7B, the second surface 234 of the base plate 212 is illustrated oriented relative to the photovoltaic module 16B. The photovoltaic module 16B is of a second size with a height in the vertical dimension Y that is greater than the height of the frame 18A of the photovoltaic module 16A illustrated in FIG. 5A. Further, the bottom walls 28B of each of the frames 18B shown in FIG. 7B has a width extending in the lateral dimension X that is greater than the width of the bottom wall 28A of frame 18A.

In the second configuration, the second surface 234 of the base plate 212 is oriented facing toward the optional mounting plate 190 and the photovoltaic modules 16B such that the bottom surface of the mounting plate 190 is supported by the second surface 234 of the base plate 212. Because the third and fourth flanges 236, 242 are spaced further apart in the lateral dimension X than the first and second flanges 220, 226, the bottom walls 28B of two photovoltaic frames 18B may be positioned between the third and fourth flanges 236, 242. Accordingly, similar to the first configuration, the third and fourth inner surfaces 238, 244 of the respective third and fourth flanges 236, 242 of the base plate 212 are in close proximity to inner ends 30B of the bottom walls 28B of the PV frames 18B. This is beneficial because if the photovoltaic modules 16B tip or rotate (for example, about the longitudinal dimension Z) the inner ends 30B of the bottom walls 28B should engage the respective third and fourth inner surfaces 238, 244. If a middle portion (not illustrated) of one or both of the photovoltaic modules 16B illustrated in FIG. 7B bows or bends upwardly in the vertical dimension Y, the inner ends 30B of the bottom walls 28B should contact and bind (or jam) against the respective third inner surface 238 or the fourth inner surface 244 to prevent or reduce the extend of movement of the PV modules 16B relative to the underlying building surface. Further, the third and fourth serrations 240, 246 on the respective third and fourth inner surfaces 238, 244 may catch a corner or edge of the inner end 30B of the respective bottom walls 28B of the photovoltaic frames 18B. Thus, in both the first and second configurations, the base plate 212 and its flanges can limit or eliminate unintended and inadvertent movement of a photovoltaic module 16 with respect to the mounting assemblies 60 of all embodiments of the current disclosure. Specifically, the base plate 212 in either the first configuration or the second configuration can beneficially reduce the risk of photovoltaic module 16A, 16B of different sizes working free of the mounting assembly 60 due to external forces, such as wind and associated uplift.

Another benefit of the base plate 212 of the present disclosure is that its flanges 220, 226 may engage the standing seam 8 when the mounting assembly 60A is in the second configuration (and its flanges 236, 242 may engage the standing seam 8 when the mounting assembly is in the first configuration). For example, referring again FIG. 5A, when the mounting assembly 60A is in the first configuration, ends of the third flange 236 and the fourth flange 242 are very close to an upper surface of the standing seam 8. Accordingly, if the mounting assembly 60A unintentionally or inadvertently moves in the lateral dimension X, one or the other of the third and fourth flanges 236 or 242 may contact the standing seam 8 to prevent further movement in the lateral dimension.

In some embodiments, the distance 249A between the lower ends of the third and fourth flanges 236 and 242 and the upper surface of the standing seam 8 is between about 0.2 inches and about 0.5 inches when the mounting assembly 60A is in the first configuration with the mounting assembly oriented in the vertical dimension Y.

Similarly, and referring now to FIG. 7B, when the mounting assembly 60A is in the second configuration, ends of the first flange 220 and the second flange 236 are very close to an upper surface of the standing seam 8. Accordingly, if the mounting assembly 60A unintentionally or inadvertently moves in the lateral dimension X, one or the other of the first and second flanges 220 or 226 may contact the standing seam 8 to prevent further movement in the lateral dimension.

In some embodiments, the distance 249B between the lower ends of the first and second flanges 220, 226 and the upper surface of the standing seam 8 is between about 0.2 inches and about 0.5 inches when the mounting assembly 60A is in the second configuration with the mounting assembly oriented in the vertical dimension Y.

Referring now to FIGS. 13A-14C, a mounting assembly 60B according to one or more embodiments of the present disclosure is generally illustrated. The mounting assembly 60B includes components that are the same as, or similar to, the components of the mounting assembly 60A described in conjunction with FIGS. 5A-12B. More specifically, the mounting assembly 60B generally comprises a clamp fastener 68, a clamp 76B, a stanchion 170, a base plate 212, a mounting device 250, and optionally a mounting plate 190.

Corresponding components between the mounting assembly 60A described in conjunction with FIGS. 5A-12B and the mounting assembly 60B described in conjunction with FIGS. 13A-14C are identified by the same reference numerals, and the corresponding discussion presented above remains equally applicable unless otherwise noted to the contrary. Those components from the mounting assembly 60B that differ in at least some respect from a corresponding component of the mounting assembly 60A use the same reference numeral in combination with a further identifier, such as a letter. Specifically, the clamp fastener 68, the stanchion 170, the mounting plate 190, the base plate 212, and the mounting device 250 of the mounting assembly 60B are the same as described with the mounting assembly 60A. Details of the clamp fastener 68, the stanchion 170, the mounting plate 190, the base plate 212, and the mounting device 250 of the mounting assembly 60B are as described in conjunction with FIGS. 5A-12B.

Notwithstanding the discussion of differences that may exist between a component of the mounting assembly 60B and its corresponding component in the mounting assembly the remainder of the discussion of this corresponding component from the embodiment of mounting assembly 60A will remain equally applicable to the embodiment of mounting assembly 60B unless otherwise noted to the contrary.

The primary distinction between the mounting assembly 60B and mounting assembly 60A is the clamp 76B. The mounting assembly 60B, more specifically the clamp 76B, is adapted to engage a single photovoltaic module 16 of a photovoltaic module array (e.g., solar module array 14 shown in FIG. 2). Typically the clamp 76B of the mounting assembly 60B will engage a single photovoltaic module 16 that is disposed along an edge of the photovoltaic module array, and thus the clamp 76B may also be referred to as an "edge grab" clamp or configured for an edge grab application.

The clamp 76B is similar to clamp 76A. More specifically, the clamp 76B according to some embodiments of the present disclosure includes an upper wall 78B, a single clamping section 90A, a first sidewall 118, and a second sidewall 138B that each extend between a pair of ends 82 of the upper wall 78B.

Similar to clamp 76A, in some embodiments the clamp 76B is formed of a single piece of metal that is extruded. Accordingly, the clamp 76B may be described as being of unitary or one-piece construction. In some embodiments, the metal is an aluminum alloy.

Figure 14A:
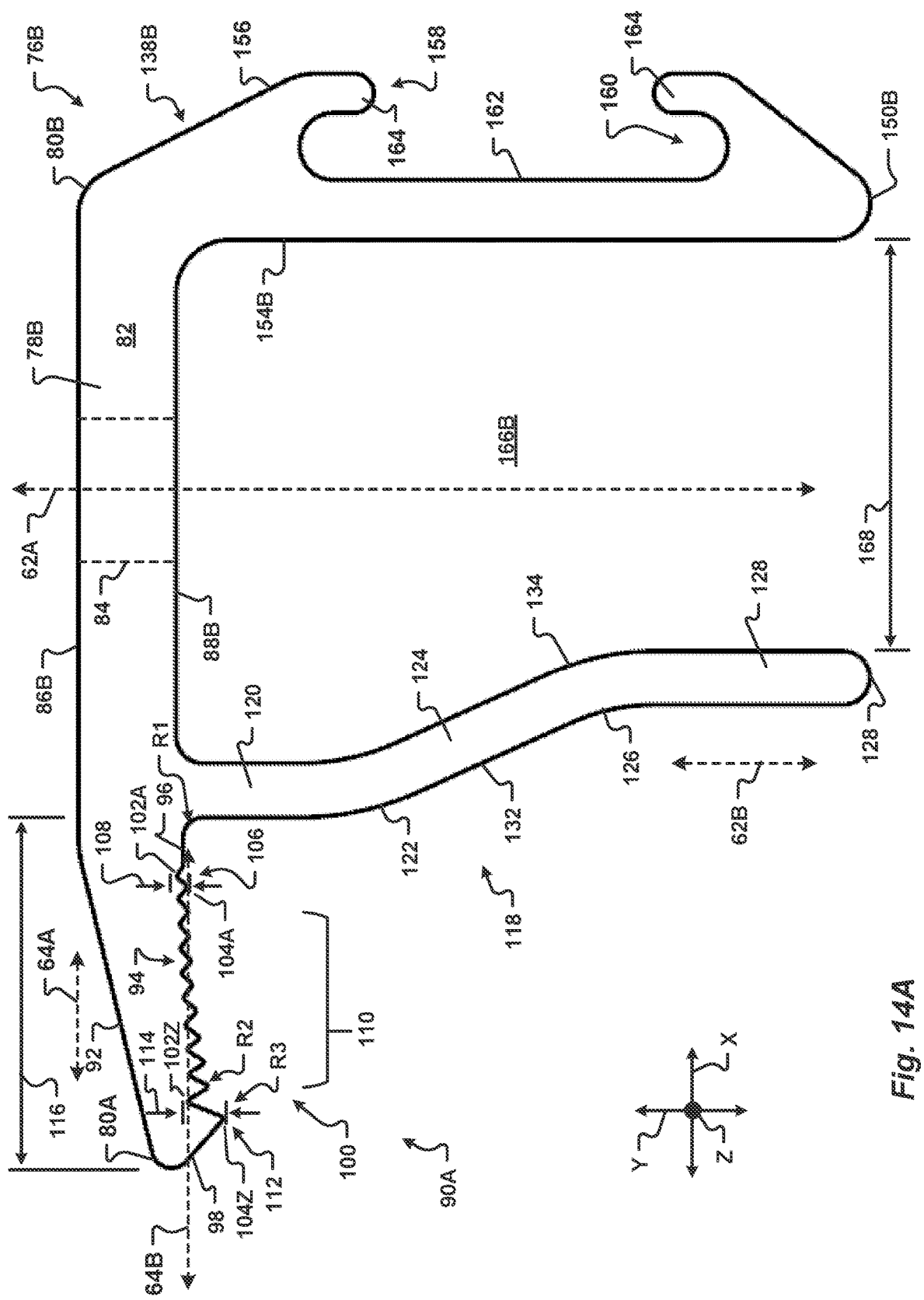
FIG. 14A is a front elevation view of an edge-grab clamp of the mounting assembly of FIG. 13A according to embodiments of the present disclosure.

A vertical reference plane 62A is illustrated in FIG. 14A between the sidewalls 118, 138B. The vertical reference plane 62A extends in the vertical dimension Y and the longitudinal dimension Z. The vertical reference plane 62A is illustrated as being centered on the fastener aperture 84.

In some embodiments, the upper wall 78B has a perimeter that is generally rectangular and has two long edges 80 that extend in the longitudinal dimension Z from a first one of the ends 82 to a second one of the ends 82. The long edges 80 define a length 83 of the upper wall 78B and the clamp 76B. The length 83 may be between about 2 inches and about 10 inches. In some embodiments, the length 83 is between about 4 inches and about 8 inches. In at least one embodiment, the length 83 of the clamp is about 6 inches.

Figure 13A:
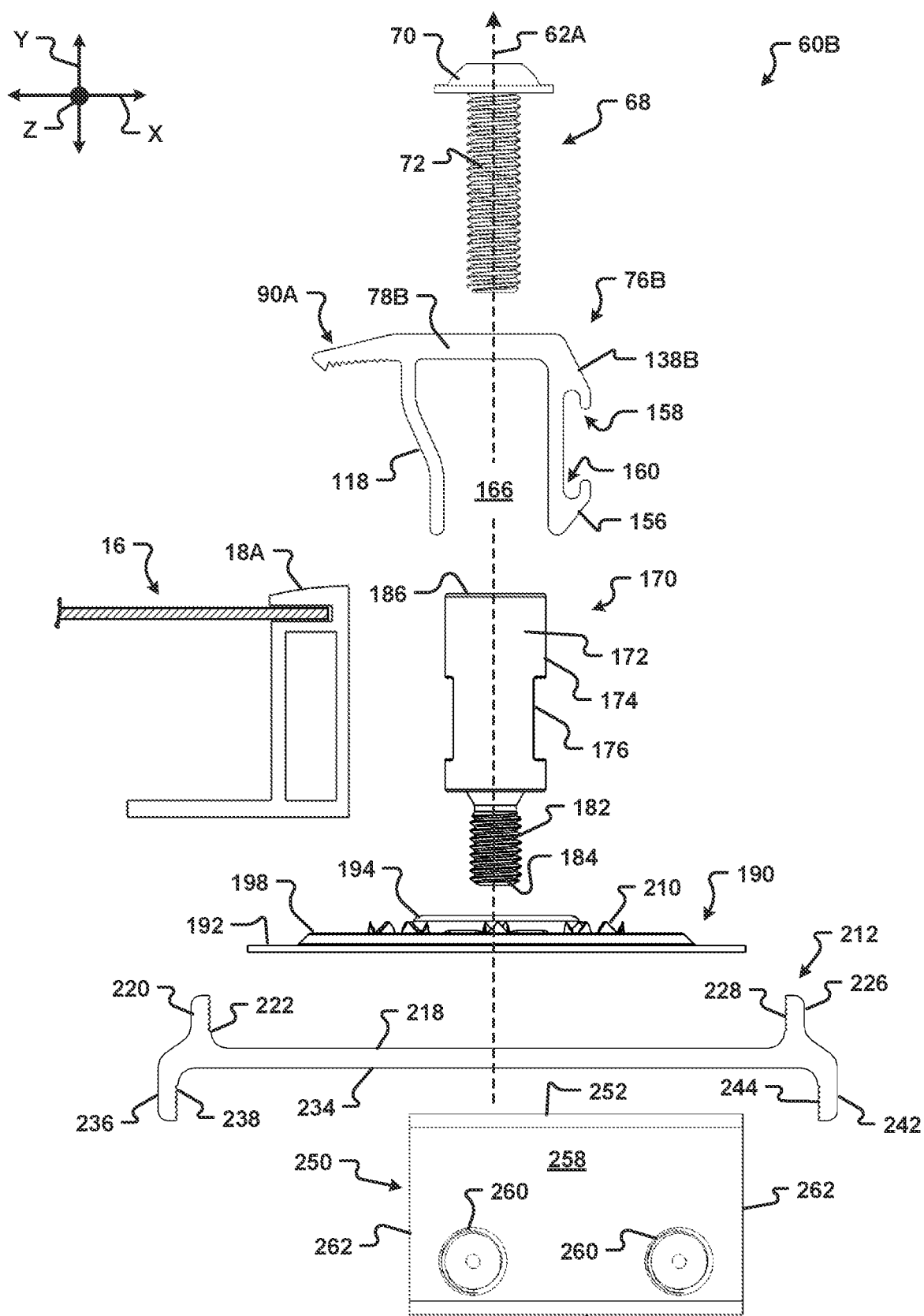
FIG. 13A is an exploded front elevation view of a mounting assembly for interconnecting one photovoltaic module with a standing seam of a building surface according to other embodiments of the present disclosure and illustrating the mounting assembly in a first configuration to engage a single photovoltaic module of a first size.
Figure 13B:
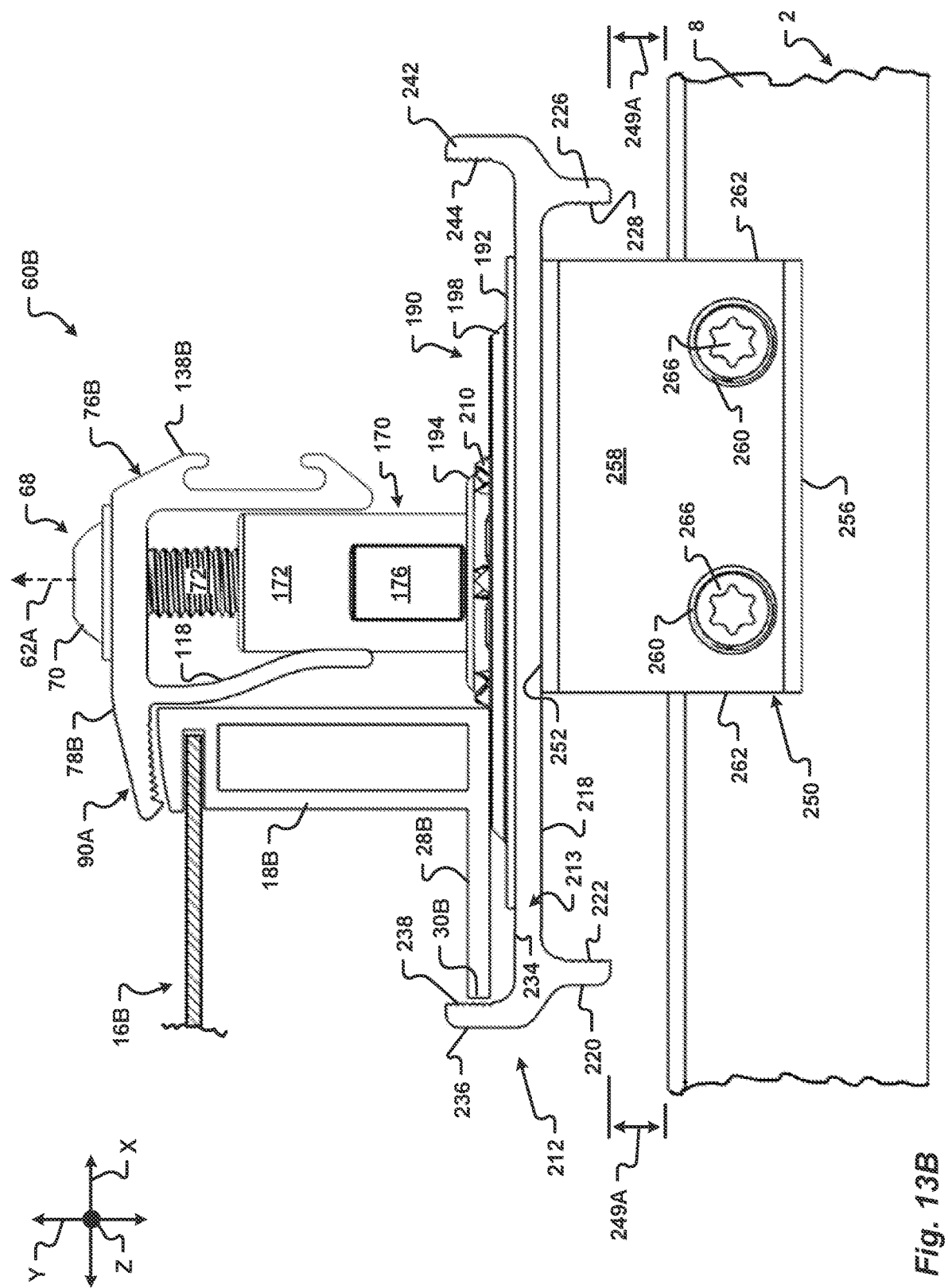
FIG. 13B is a front elevation view of the mounting assembly of FIG. 13A and illustrating the mounting assembly in a second configuration engaged to a single photovoltaic module of a second size that is different than the first size.

The upper wall 78B has an upper surface 86B. In some embodiments, at least a portion of the upper wall is planar. As shown in FIG. 13B, when the mounting assembly 60B is assembled in a position of use, in at least some embodiments the planar portion of the upper wall 78B is the uppermost portion of the clamp 76B.

A horizontal reference plane 64A defined by the planar portion of the upper wall 78B is illustrated in FIG. 14A. The horizontal reference plane 64A extends in the lateral dimension X and the longitudinal dimension Z. Notably, the horizontal reference plane 64A does not intersect any portion of the clamp 76B, and specifically does not intersect the first or second sidewalls 118, 138B.

A fastener aperture 84 extends through the upper wall 78B to accommodate the threaded shaft 72 of the clamp fastener 68. In some embodiments, the fastener aperture is approximately centered between the ends 82. Optionally, the fastener aperture 84 extends through the planar surface of the upper wall 78B. In some embodiments, the fastener aperture 84 is the only aperture or hole formed through the upper wall 78B.

The fastener aperture 84 has a diameter that is greater than the diameter of the threaded shaft 72, but the diameter of the fastener aperture is less than the diameter of the head 70 of the clamp fastener 68. The fastener aperture 84 optionally includes a countersink.

In at least one embodiment, the fastener aperture 84 is circular. Alternatively, the fastener aperture 84 may be elongated in a longitudinal dimension Z.

The fastener aperture 84 of the clamp 76B is unthreaded in at least one embodiment. This is beneficial because when the fastener aperture 84 is unthreaded the clamp fastener 68 is not threadably engaged with the clamp 76B. Accordingly, rotation of the clamp fastener 68 about rotational axis 74 should not rotate the clamp 76B, and the clamp 76B may remain in a stationary position while the clamp fastener 68 is rotated relative to the clamp 76B and about the rotational axis.

As shown at least in FIG. 14A, in the clamp 76B, the first sidewall 118 is only connected to the second sidewall 138B by the upper wall 78B. Accordingly, there are no bridges running from the first sidewall 118 to the second sidewall 138B. Stated differently, only the upper wall 78B of the clamp 76B intersects the vertical reference plane 62A (e.g., no portion of the clamp 76B except for the upper wall 78B intersects the vertical reference plane 62A).

In at least one embodiment, no apertures or holes are formed through the first sidewall 118. Additionally, or alternatively, the second sidewall 138B optionally has no apertures or holes formed therethrough.

Notably, only the first sidewall 118 of the clamp 76B cantilevers from the upper wall 78B (more specifically, from an underside or lower surface 88B thereof) to define the single clamping section 90A of the clamp 76B. The clamping section 90A includes an upper clamp surface 92 and an oppositely disposed lower clamp surface 94, the upper clamp surface 92 being a portion of the upper surface 86B of the upper wall 78B.

The lower clamp surface 94 of the clamp 76B is the same as described for the clamp 76A. Accordingly, the lower clamp surface 94 of clamp 76B is adapted to engage a curved or sloped top wall 20 of a frame 18 of a photovoltaic module 16. Further, the lower clamp surface 94 comprises teeth 100 for engaging a bezel 20 of a frame 18 of a photovoltaic module 16. The teeth 100 have the same size, geometry, and configuration as the teeth 100 describe in conjunction with clamp 76A.

In some embodiments, the clamping section 90A of clamp 76B has a clamp width 116 measured from a long edge 80 of the upper wall 78B to the first sidewall 118 of between about 0.5 inches and about 0.55 inches. Optionally, the clamp width 116 is about 0.529 inches.

Referring again to FIG. 14A, the first sidewall 118 of clamp 76B includes three sections: a first upper section 120, a first intermediate section 124, and a first lower section 128 that includes the first free end 130. The three sections 120, 124, 128 may be of approximately equal thicknesses measured in the lateral dimension X. Moreover, the geometry and orientation of the sections of the first sidewall 118 of clamp 76B are the same as described for the clamp 76A.

Notably, in contrast to the second sidewall 138A of clamp 76A, the second sidewall 138B of clamp 76B has a second inner surface 154B that is generally planar. Moreover, in some embodiments, the second inner surface 154B is oriented approximately parallel to the vertical reference plane 62A.

In at least one embodiment, an entirety of the second inner surface 154B is planar. Further, the second inner surface 154B may be devoid of grooves, holes, aperture, depressions or protrusions.

The second sidewall 138B has an outer perimeter 156. In at least one embodiment, the outer perimeter of the second sidewall 138B includes a side slot 158 that leads to a channel 160. Both the side slot 158 and the channel 160 extend between the two ends 82 of the clamp 76B.

The channel 160 is defined by a channel base 162 and a pair of lips 164 that are spaced from this channel base 162. The side slot 158 provides access to the channel 160 in at least certain instances. The channel 160 may be used for any appropriate purpose, such as wire management, attachment of equipment shields and/or snow retention devices, module cantilever support, and the like.

The clamp 76B accommodates a range of frames 18 of photovoltaic modules 16 of various sizes in a manner similar to clamp 76A. Further, the mounting assembly 60B may be assembled and secured to a mounting device 250 in the same general manner as mounting assembly 60A and as generally illustrated in FIGS. 13A and 13B.

Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

One aspect of the disclosure comprises any one or more of the aspects/embodiments as substantially disclosed herein.

Another aspect of the disclosure is any one or more of the aspects/embodiments as substantially disclosed herein optionally in combination with any one or more other aspects/embodiments as substantially disclosed herein.

It is another aspect of the present disclosure to provide one or more means adapted to perform any one or more of the above aspects/embodiments as substantially disclosed herein.

To provide additional background, context, and to further satisfy the written description requirements of 35 U.S.C. § 112, the following references are incorporated by reference herein in their entireties: U.S. Pat. Nos. 5,228,248, 5,491,931, 6,718,718, 7,100,338, 7,013,612, 9,085,900, 11,333,179, U.S. Patent App. Pub. 2014/0311087, U.S. Patent App. Pub. 2018/0031279, U.S. Patent App. Pub. 2019/0296689, U.S. Patent App. Pub. 2020/0191180, U.S. Patent App. Pub. 2020/0340712, U.S. Patent App. Pub. 2021/0285222, and U.S. Patent App. Pub. 2021/0285223. In addition, Appendix A, which includes additional views mounting devices of embodiments of the present disclosure, is incorporated by reference in its entirety.

What is claimed is:

1. A mounting system to secure a photovoltaic module to a building surface, comprising:
   a clamp, comprising:
      an upper wall comprising a fastener aperture, a first long edge on one side of the fastener aperture, and a second long edge approximately parallel to the first long edge and on an opposite side of the fastener aperture;
      a first sidewall extending from a lower surface of the upper wall, the first sidewall spaced from the first long edge to form a first clamping section configured to engage the photovoltaic module, the first clamping section comprising a lower clamp surface;
      a plurality of teeth formed in the lower clamp surface, wherein the teeth increase in size from an inner portion of the lower clamp surface proximate to the first sidewall to a distal end of the lower clamp surface such that an innermost tooth has a minimum height measured in a vertical dimension and an outermost tooth has a maximum height measured in the vertical dimension, the maximum height being greater than the minimum height; and
      a second sidewall extending from the lower surface of the upper wall, the first and second sidewalls defining a stanchion receptacle therebetween;
   a stanchion comprising a body, a first threaded shaft extending from a first end of the body, and a first threaded hole extending through a second end of the body, the first end of the body being opposite the second end of the body;
   a base plate, comprising:
      a body with a first narrow end and a second narrow end opposite to the first narrow end;
      a first surface of the body;
      a second surface of the body opposite to the first surface, the first and second surfaces extending in a longitudinal dimension from the first narrow end to the second narrow end;
      a first flange and a second flange extending from the first surface between the first and second narrow ends, the first flange comprising a first inner surface facing a second inner surface of the second flange, wherein the first inner surface is separated from the second inner surface by a first interior width measured in a lateral dimension that is orthogonal to the longitudinal dimension;
      a third flange and a fourth flange extending from the second surface between the first and second narrow ends, the third flange comprising a third inner surface facing a fourth inner surface of the fourth flange, wherein the third inner surface is separated from the fourth inner surface by a second interior width measured in the lateral dimension that is greater than the first interior width; and
      a plate aperture extending through the first and second surfaces, the plate aperture comprising a diameter sufficient to receive the first threaded shaft of the stanchion;
   a mounting device comprising a second hole configured to receive the first threaded shaft of the stanchion to releasably secure the base plate between the stanchion and the mounting device, the mounting device configured to engage a projection extending from the building surface; and
   a clamping fastener comprising a second threaded shaft configured to threadably engage the first threaded hole of the stanchion, wherein the fastener aperture of the clamp and the first threaded hole of the stanchion are configured to receive the second threaded shaft of the clamping fastener to selectively secure the clamp to the stanchion with at least a portion of the stanchion body extending into the stanchion receptacle.

2. The mounting system of claim 1, wherein a horizontal reference plane contacting a distal point of the innermost tooth extends through the outermost tooth proximate to a base of the outermost tooth, the horizontal reference plane extending in the longitudinal dimension and the lateral dimension.

3. The mounting system of claim 1, wherein the third flange is offset in the lateral dimension from the first flange such that a vertical reference plane defined by the third inner surface does not intersect the first flange, the vertical reference plane extending in the longitudinal dimension and the vertical dimension.

4. The mounting system of claim 1, wherein the base plate further comprises serrations formed on one or more of the first inner surface of the first flange, the second inner surface of the second flange, the third inner surface of the third flange, and the fourth inner surface of the fourth flange.

5. The mounting system of claim 1, further comprising a mounting plate, comprising:
   a top surface oriented toward the photovoltaic module when the photovoltaic module is secured to the building surface;
   a bottom surface opposite the top surface; and
   a mounting aperture with a diameter sufficient to receive the first threaded shaft of the stanchion.

6. The mounting system of claim 1, wherein the lower clamp surface of the first clamping section further comprises a flat portion positioned between the innermost tooth of the teeth and the first sidewall.

7. The mounting system of claim 6, wherein the innermost tooth is spaced from an exterior surface of the first sidewall by a predetermined distance.

8. The mounting system of claim 1, wherein:
   in a first configuration of the mounting system to engage a first photovoltaic module of a first size, the first surface of the base plate is oriented toward the clamp such that the second surface of the base plate is facing the mounting device; and
   in a second configuration of the mounting system to engage a second photovoltaic module of a second size that is different than the first size, the second surface of the base plate is oriented toward the clamp such that the first surface of the base plate is facing the mounting device.

9. A clamp for a mounting system to secure a photovoltaic module to a building surface, comprising:
- an upper wall comprising a fastener aperture, a first long edge on one side of the fastener aperture, and a second long edge approximately parallel to the first long edge, the second long edge on an opposite side of the fastener aperture, the first and second long edges extending in a longitudinal dimension;
- a first sidewall extending from a lower surface of the upper wall, the first sidewall positioned between the fastener aperture and the first long edge to form a first clamping section configured to engage the photovoltaic module, the first clamping section comprising a lower clamp surface;
- a plurality of teeth formed in the lower clamp surface, wherein the teeth increase in size from an inner portion of the lower clamp surface proximate to the first sidewall to a distal end of the lower clamp surface such that:
  - an innermost tooth has a minimum height measured in a vertical dimension between a base and a distal point of the innermost tooth, the vertical dimension being perpendicular to the longitudinal dimension; and
  - an outermost tooth has a maximum height measured in the vertical dimension, the maximum height being greater than the minimum height; and
- a second sidewall extending from the lower surface of the upper wall, the first and second sidewalls defining a stanchion receptacle therebetween.

10. The clamp of claim 9, wherein a horizontal reference plane contacting the distal point of the innermost tooth extends through the outermost tooth, the horizontal reference plane extending in the longitudinal dimension and a lateral dimension perpendicular to the longitudinal dimension.

11. The clamp of claim 9, wherein the fastener aperture is circular and unthreaded, and wherein the fastener aperture is the only aperture through the upper wall.

12. A base plate for a mounting system to secure a photovoltaic module to a building surface, comprising:
- a body with a first narrow end and a second narrow end opposite to the first narrow end;
- a first surface of the body;
- a second surface of the body opposite to the first surface, the first and second surfaces extending in a longitudinal dimension from the first narrow end to the second narrow end;
- a first flange and a second flange extending from the first surface between the first and second narrow ends, the first flange comprising a first inner surface facing a second inner surface of the second flange, wherein the first inner surface is separated from the second inner surface by a first interior width measured in a lateral dimension that is orthogonal to the longitudinal dimension;
- a third flange and a fourth flange extending from the second surface between the first and second narrow ends, the third flange comprising a third inner surface facing a fourth inner surface of the fourth flange, wherein the third inner surface is separated from the fourth inner surface by a second interior width measured in the lateral dimension that is greater than the first interior width, and wherein a portion of one or more of the first inner surface, the second inner surface, the third inner surface, and the fourth inner surface comprises serrations; and
- a plate aperture extending through the first and second surfaces.

13. The base plate of claim 12, wherein the third flange is offset in the lateral dimension from the first flange such that a first vertical reference plane defined by the third inner surface does not intersect the first flange, the first vertical reference plane extending in the longitudinal dimension and a vertical dimension that is orthogonal to the longitudinal dimension, and wherein the fourth flange is offset in the lateral dimension from the second flange such that a second vertical reference plane defined by the fourth inner surface does not intersect the second flange, the second vertical reference plane extending in the longitudinal dimension and the vertical dimension and being approximately parallel to the first vertical reference plane.

14. The base plate of claim 13, wherein the first and second flanges are positioned between the first and second vertical reference planes.

15. The base plate of claim 12, wherein the serrations formed on the inner surface of the first flange extend in the longitudinal dimension and are oriented approximately parallel to the first surface.

16. The base plate of claim 12, wherein the base plate is formed of a single piece of extruded metal.

17. The base plate of claim 12, wherein the first flange extends continuously for an entire length of the base plate from the first narrow end to the second narrow end.

18. The base plate of claim 12, wherein the first inner surface, the second inner surface, the third inner surface, and the fourth inner surface are oriented approximately parallel to one another.

19. The base plate of claim 12, wherein the first surface is substantially planar between the first and second narrow ends and between the first and second inner surfaces.

20. The base plate of claim 12, wherein the plate aperture is circular and unthreaded.

* * * * *